US010737418B2

(12) United States Patent
Hanan et al.

(10) Patent No.: US 10,737,418 B2
(45) Date of Patent: Aug. 11, 2020

(54) GRAPHENE REINFORCED POLYETHYLENE TEREPHTHALATE

(71) Applicant: Niagara Bottling, LLC, Diamond Bar, CA (US)

(72) Inventors: Jay Clarke Hanan, Ontario, CA (US); Sudheer Bandla, Ontario, CA (US)

(73) Assignee: Niagra Bottling, LLC, Diamond Bar, CA (US)

( * ) Notice: Subject to any disclaimer, the term of this patent is extended or adjusted under 35 U.S.C. 154(b) by 331 days.

(21) Appl. No.: 15/203,668

(22) Filed: Jul. 6, 2016

(65) Prior Publication Data

US 2017/0009046 A1 Jan. 12, 2017

Related U.S. Application Data

(60) Provisional application No. 62/190,193, filed on Jul. 8, 2015.

(51) Int. Cl.
| | | |
|---|---|---|
| *C08K 3/00* | (2018.01) | |
| *B29C 45/00* | (2006.01) | |
| *B29B 7/72* | (2006.01) | |
| *B29B 7/00* | (2006.01) | |
| *B29B 7/90* | (2006.01) | |
| *C08J 3/22* | (2006.01) | |
| *C08K 3/04* | (2006.01) | |
| *B29K 67/00* | (2006.01) | |
| *B29K 507/04* | (2006.01) | |
| *B29K 105/16* | (2006.01) | |
| *B29B 7/46* | (2006.01) | |

(52) U.S. Cl.
CPC .......... *B29C 45/0001* (2013.01); *B29B 7/007* (2013.01); *B29B 7/726* (2013.01); *B29B 7/90* (2013.01); *C08J 3/226* (2013.01); *C08K 3/042* (2017.05); *B29B 7/46* (2013.01); *B29K 2067/003* (2013.01); *B29K 2105/162* (2013.01); *B29K 2507/04* (2013.01); *C08J 2367/02* (2013.01); *C08J 2467/02* (2013.01)

(58) Field of Classification Search
CPC .. C08K 3/042; C08J 3/226; C08J 3/22; B29B 7/007; B29B 7/726; B29B 7/90; B29C 45/001; C08L 67/02
USPC ......................................................... 523/300
See application file for complete search history.

(56) References Cited

U.S. PATENT DOCUMENTS

| | | | |
|---|---|---|---|
| 4,244,910 A | 1/1981 | Yui et al. | |
| 6,713,600 B1 | 3/2004 | Isayev et al. | |
| 8,859,668 B2 | 10/2014 | Morishita et al. | |
| 9,636,855 B2 * | 5/2017 | Hanan | B82Y 30/00 |
| 9,890,263 B2 * | 2/2018 | Hanan | C08K 3/04 |
| 9,957,360 B2 * | 5/2018 | Hanan | C08K 3/042 |
| 2006/0148959 A1 | 7/2006 | Isayev et al. | |
| 2007/0216067 A1 * | 9/2007 | Bahr | B29C 67/246 |
| | | | 264/328.1 |
| 2009/0275689 A1 * | 11/2009 | Isayev | B29B 7/36 |
| | | | 524/495 |
| 2010/0233458 A1 | 9/2010 | Sun et al. | |
| 2012/0098163 A1 | 4/2012 | Avila-Orta et al. | |
| 2014/0080962 A1 * | 3/2014 | Hanan | B82Y 30/00 |
| | | | 524/496 |
| 2017/0218166 A1 * | 8/2017 | Hanan | C08K 3/042 |
| 2018/0171099 A1 * | 6/2018 | Hanan | C08K 3/04 |

FOREIGN PATENT DOCUMENTS

| | | |
|---|---|---|
| CN | 103242630 A | 8/2013 |
| WO | 2007145918 A2 | 12/2007 |
| WO | 2012151433 A2 | 11/2012 |
| WO | 2013004718 A1 | 1/2013 |
| WO | WO 2014/144139 A1 | 9/2014 |

OTHER PUBLICATIONS

Li, M. et al., Polyethylene terephthalate)/exfoliated graphite nanocomposites With Improved Thermal Stability, Mechanical and Electrical Properties, Composites Part A: Applied Science and Manufacturing, 2011, vol. 42, No. 5, p. 561.
Aoyama, S. et al., Melt Crystallization of Poly(ethylene terephthalate): Comparing Addition of Graphene vs. Carbon Nanotubes, Polymer. 2014, vol. 55, No. 8, p. 2080.
Extended European Search Report, Application No. 16765786.5, dated Oct. 31, 2018.

* cited by examiner

Primary Examiner — Hannah J Pak
(74) Attorney, Agent, or Firm — Rutan & Tucker LLP; Hani Z. Sayed

(57) ABSTRACT

A composition and a method are provided for graphene reinforced polyethylene terephthalate (PET). Graphene nanoplatelets (GNPs) comprising multi-layer graphene are used to reinforce PET, thereby improving the properties of PET for various new applications. Master-batches comprising polyethylene terephthalate with dispersed graphene nanoplatelets are obtained by way of compounding. The master-batches are used to form PET-GNP nanocomposites at weight fractions ranging between 0.5% and 15%. In some embodiments, PET and GNPs are melt compounded by way of twin-screw extrusion. In some embodiments, ultrasound is coupled with a twin-screw extruder so as to assist with melt compounding. In some embodiments, the PET-GNP nanocomposites are prepared by way of high-speed injection molding. The PET-GNP nanocomposites are compared by way of their mechanical, thermal, and rheological properties so as to contrast different compounding processes.

5 Claims, 40 Drawing Sheets

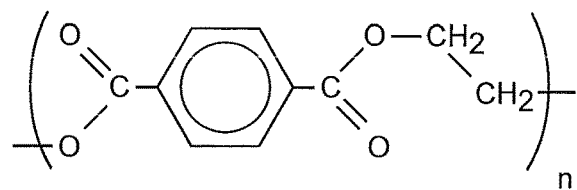
FIG. 1
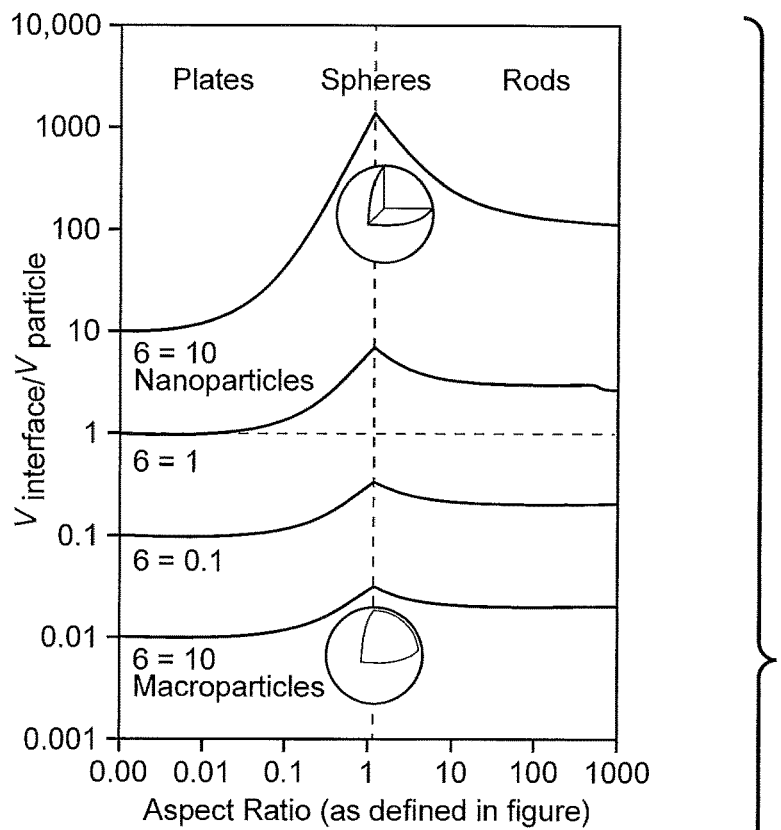
FIG. 2
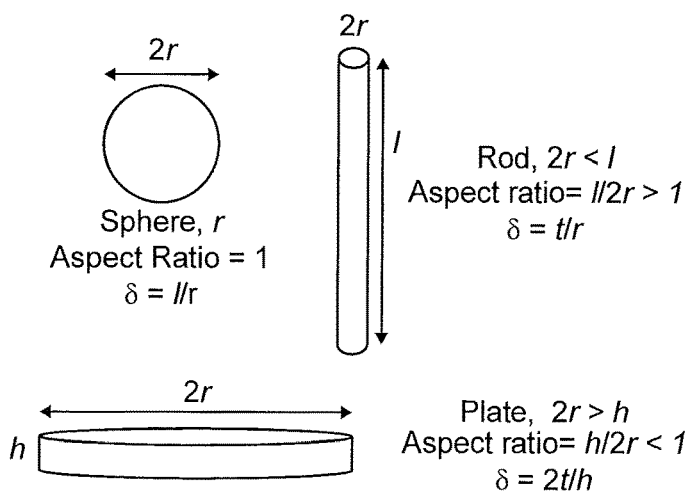

| Method | Crystallite size (μm) | Sample size (mm) | Charge carrier mobility (at ambient temperature) ($cm^2 V^{-1} s^{-1}$) | Applications |
|---|---|---|---|---|
| Mechanical exfoliation | > 1,000 | > 1 | > $2 \times 10^5$ and > $10^6$ (at low temperature) | Research |
| Chemical exfoliation | ≤ 0.1 | Infinite as a layer of overlapping flakes | 100 (for a layer of overlapping flakes) | Coatings, paint/ink, composites, transparent conductive layers, energy storage, bioapplications |
| Chemical exfoliation via graphene oxide | ~100 | Infinite as a layer of overlapping flakes | 1 (for a layer of overlapping flakes) | Coatings, paint/ink, composites, transparent conductive layers, energy storage, bioapplications |
| CVD | 1,000 | ~1,000 | 10,000 | Photonics, nanoelectronics, transparent conductive layers, sensors, bioapplications |
| SiC | 50 | 100 | 10,000 | High-frequency transistors and other electronic devices |

FIG. 3

FIG. 4
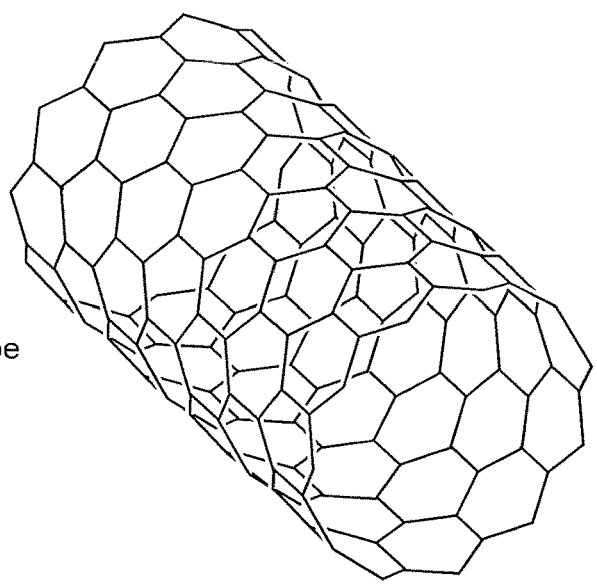
Carbon Nanotube
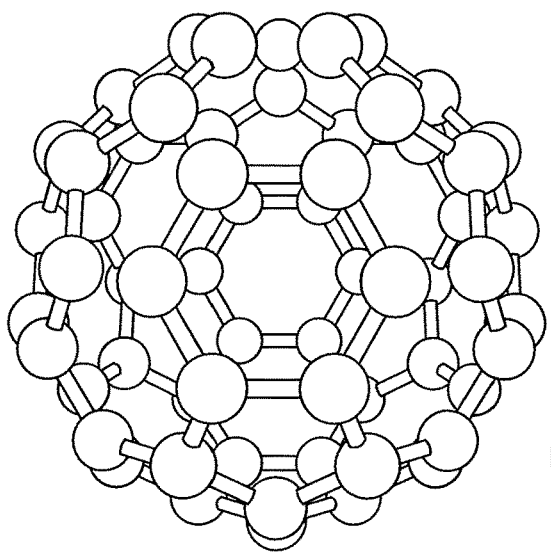
Fullerene
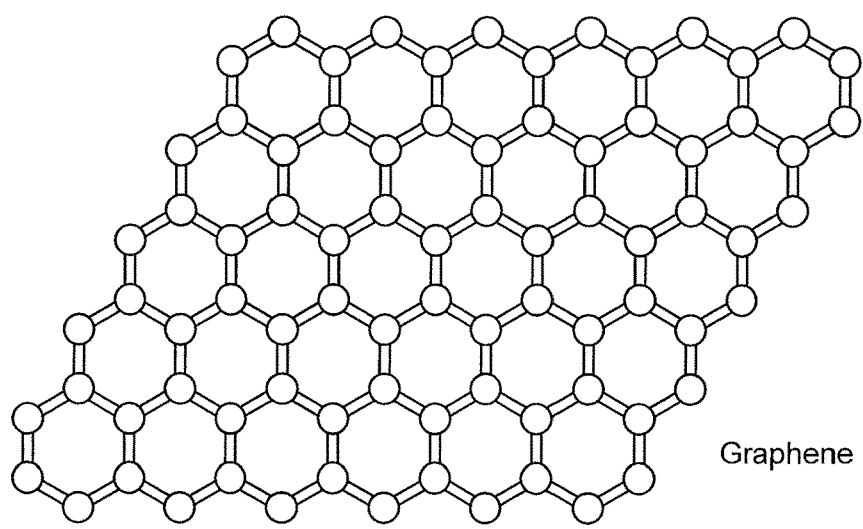
Graphene

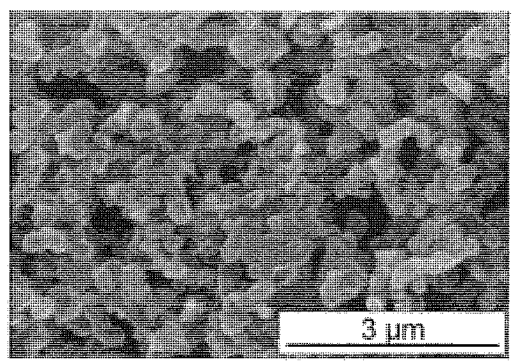
FIG. 5
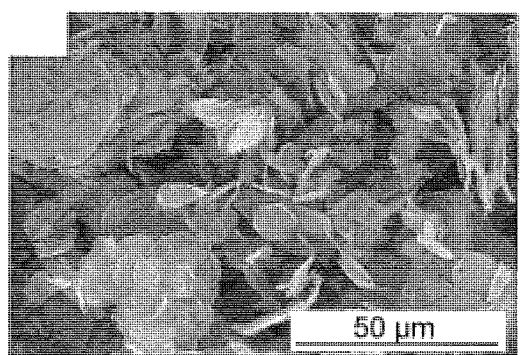
FIG. 6a
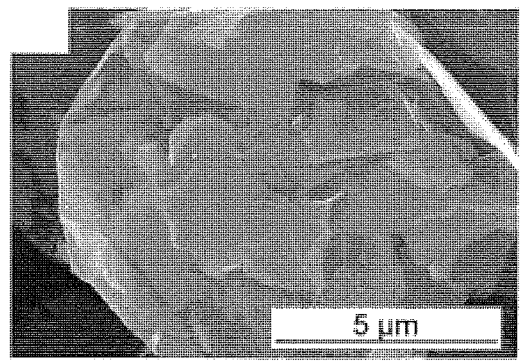
FIG. 6b
FIG. 7
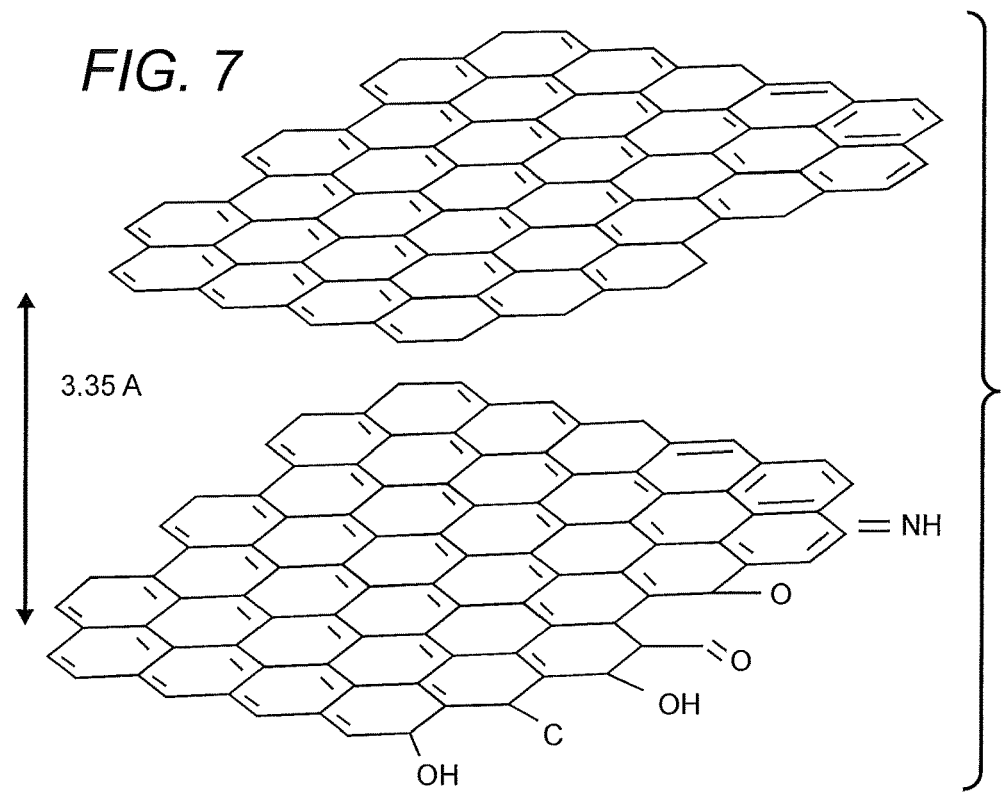

| Pellet Type | Height (mm) | Major Diameter (mm) | Minor Diameter (mm) | Weight (g) |
|---|---|---|---|---|
| PET | 2.35 | 3.42 | 2.64 | 0.02 |
| Twin-screw Processed | 3.17 | 2.46 | 2.15 | 0.015 |
| Ultrasonic Processed | 1.9 | 1.09 | 0.96 | 0.002 |

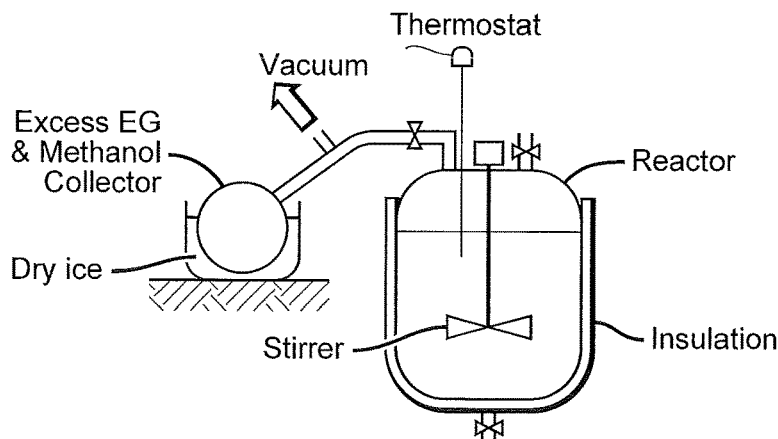
FIG. 13
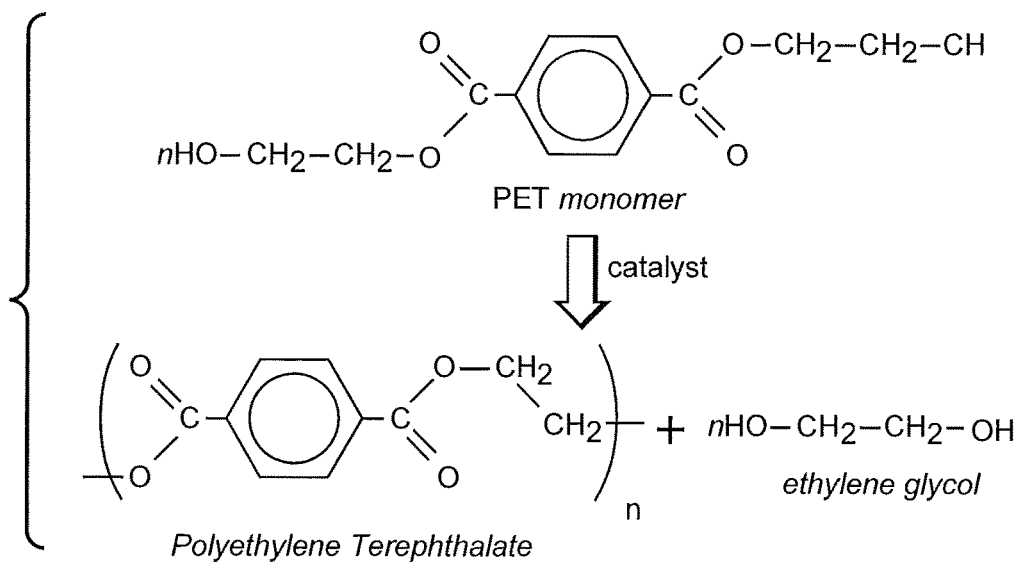
FIG. 14
FIG. 14a
| Material | E.I. Duration (min) | Methanol Yield (ml) | P.C. Duration (min) | Polymer Yield (g) |
|---|---|---|---|---|
| PET | 180 | 310 | 135 | 160 |
| PET+0.1% GNP (750 m²/g) | 188 | 310 | 105 | 380 |
| PET+0.1% GNP (120 m²/g) | 192 | 324 | 112 | 190 |

| Set | Mixing Approach | Cooling Medium | Masterbatch Weight Fraction | Final Weight Fractions | Sample Type |
|---|---|---|---|---|---|
| A | Twin-screw mixing | Oil | 2%, 5%, 10%, & 15% | 2%, 5%, 10%, & 15% | ASTM bar |
| B | Twin-screw mixing | Water | 10% | 0.6% & 1.2% | Tube |
| C | Twin-screw mixing | Water | 2% | 0.5% | Tube |
| C | Twin-screw mixing | Water | 15% | 2% | Tube |
| U | Ultrasonic assisted Twin-screw mixing | Water | 5% | 2% | Tube |

FIG. 16c

| Description | Nanocomposite Weight Fraction | Fill Pressure (PSI) | Hold Pressure (PSI) | Back Pressure (PSI) |
|---|---|---|---|---|
| PET | - | 604 | 580 | 150 |
| 0 USM | 2% | 459 | 580 | 150 |
| 3.5 USM | 2% | 472 | 580 | 150 |
| 5 USM | 2% | 480 | 580 | 150 |
| 7.5 USM | 2% | 482 | 580 | 145 |

FIG. 16d 10 mm

| Mold Temperature | Injection Pressure | Injection Time | Hold Pressure | Hold Time |
|---|---|---|---|---|
| 25 °C | 5 bar | 1 sec | 6 bar | 1 sec |
FIG. 19c
FIG. 20
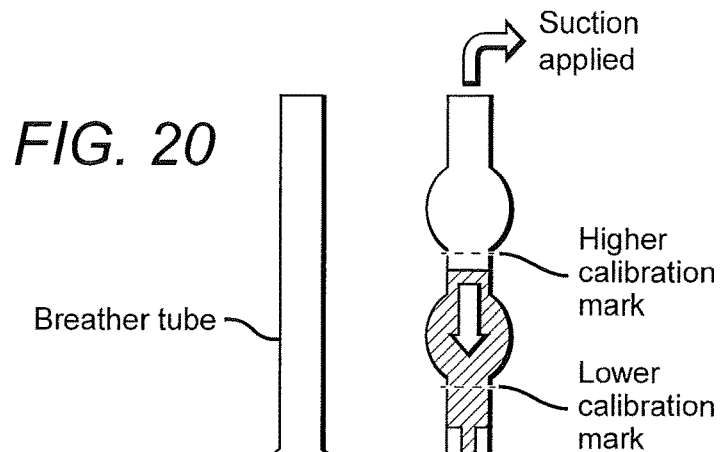
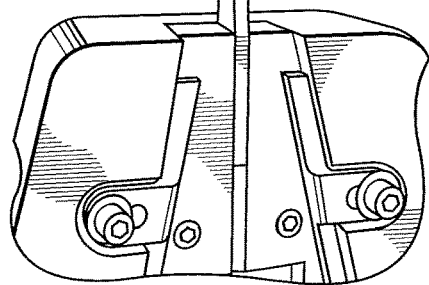
FIG. 21a

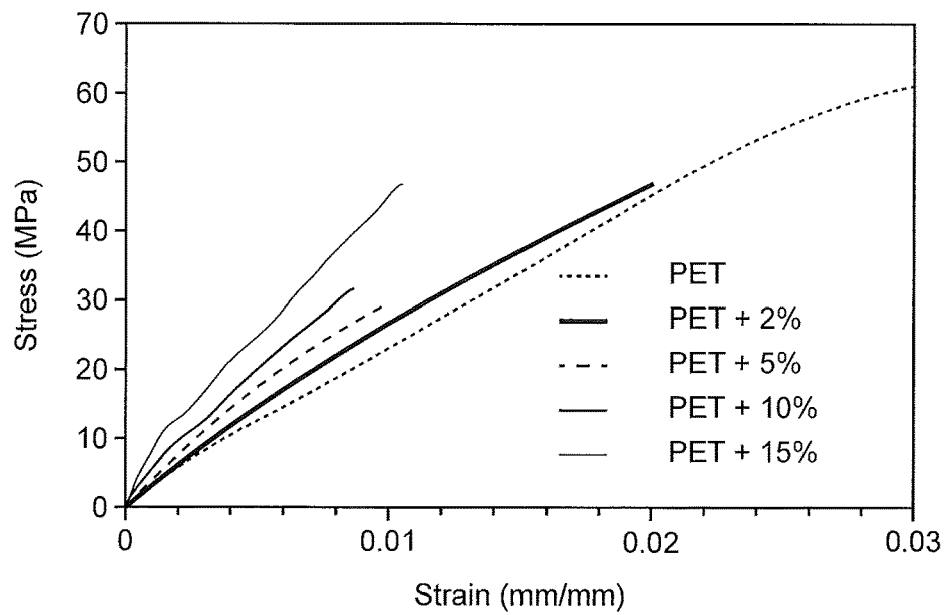
FIG. 30
FIG. 31
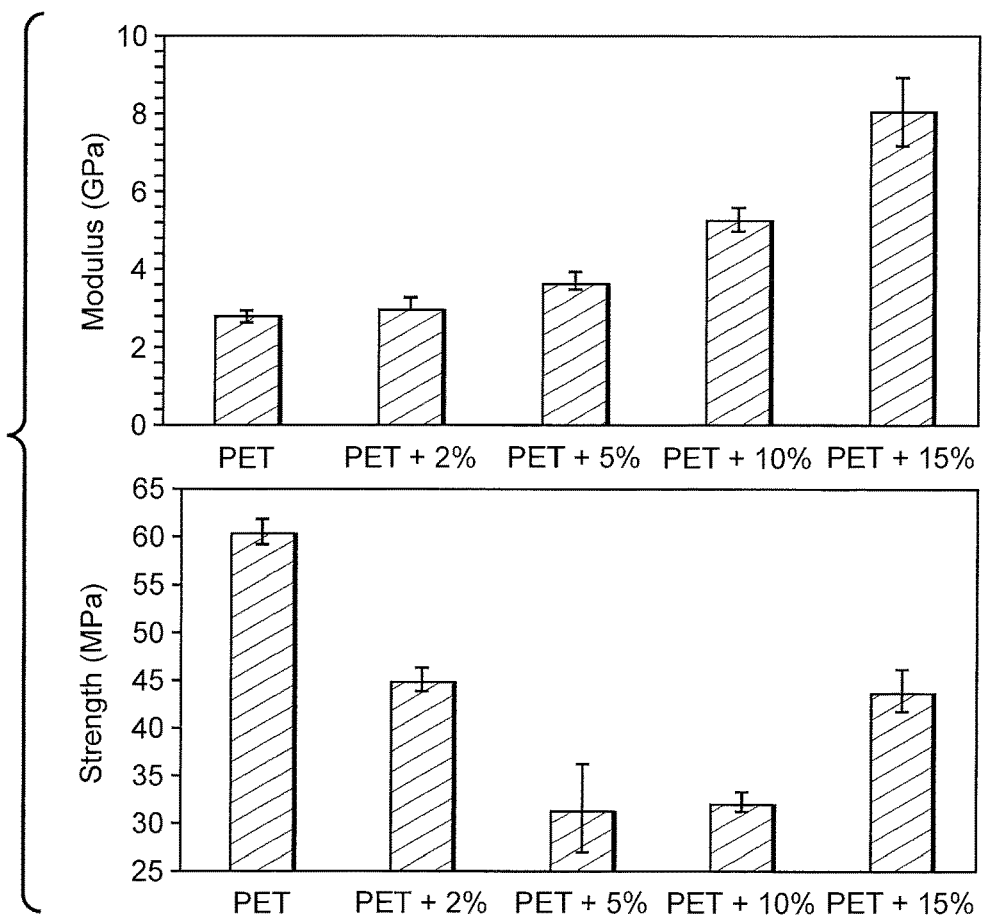

FIG. 32a
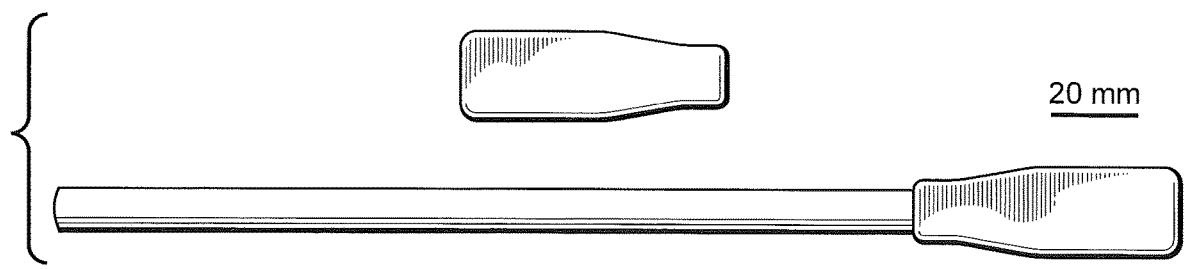
20 mm
FIG. 32b
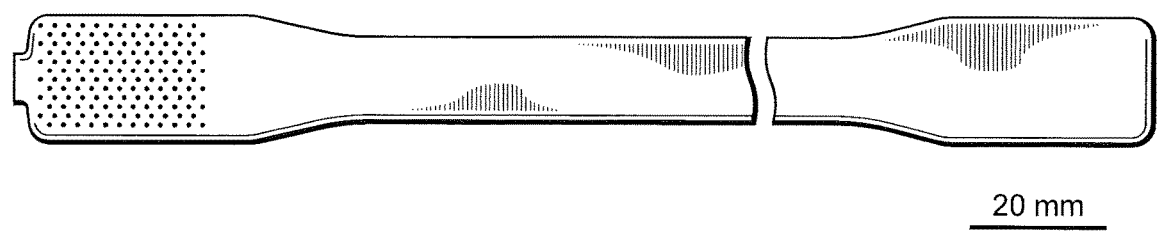
20 mm
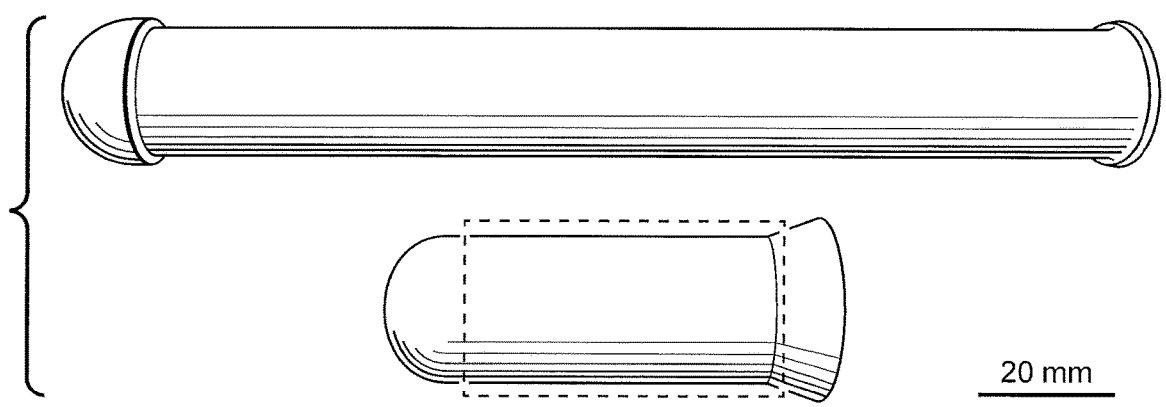
20 mm
FIG. 32c

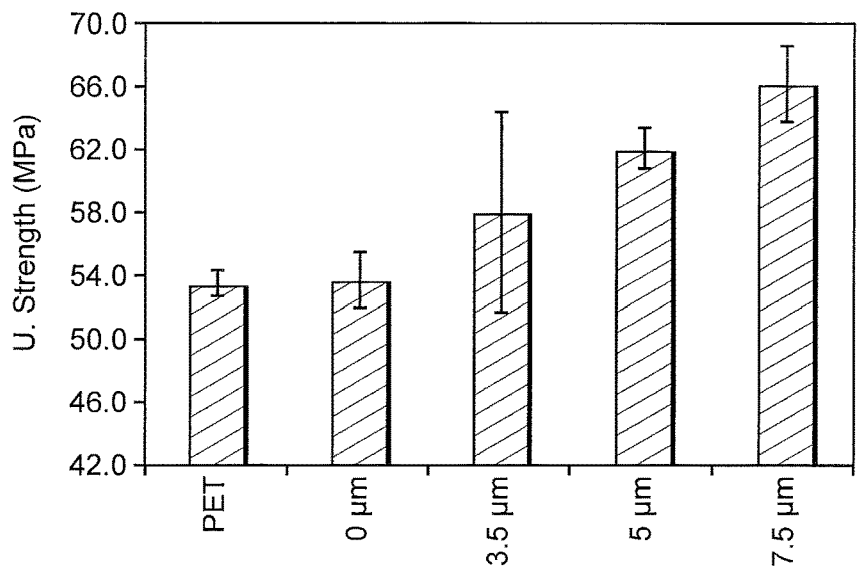
FIG. 36
FIG. 37
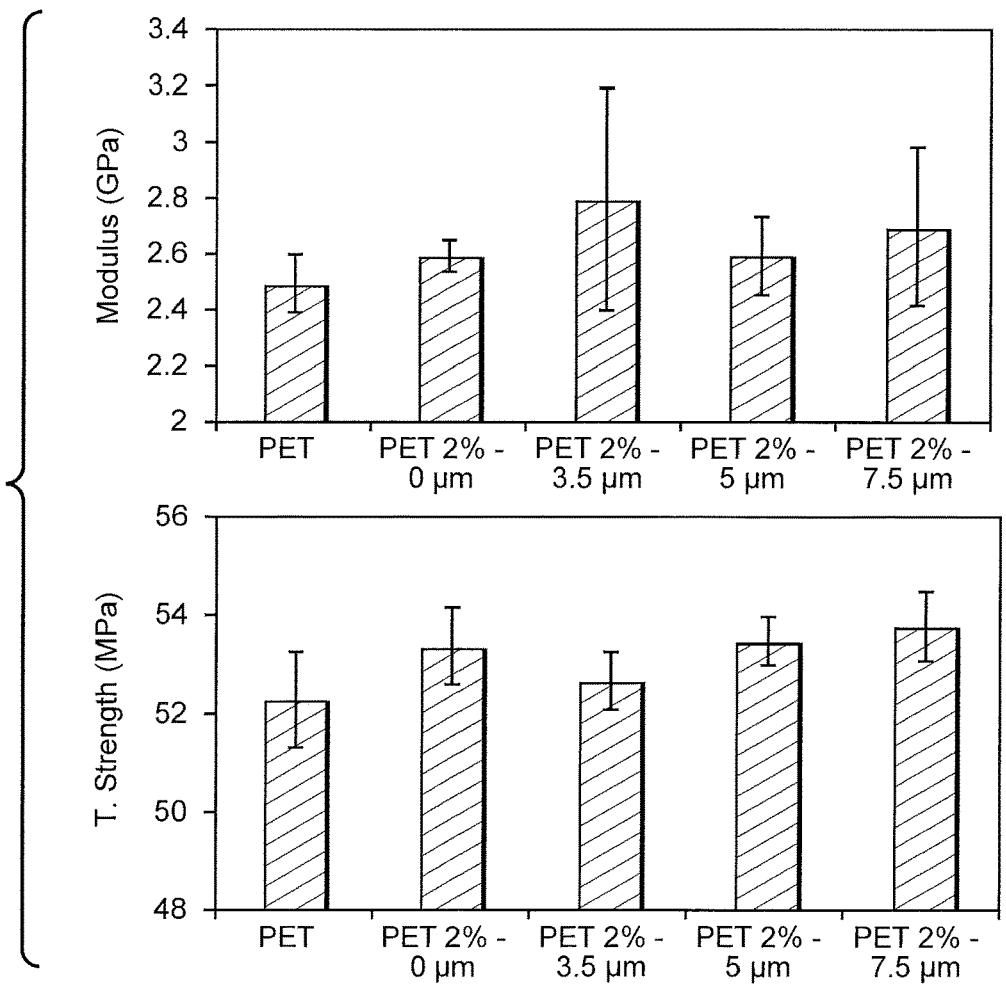

| Sample Type | Tensile Strength (MPa) | Density (kg/m³) | Specific Strength (kN.m/kg) |
|---|---|---|---|
| PET | 64.8 | 1355 | 47.9 |
| PET - 2% | 50.3 | 1359 | 37 |
| PET - 5% | 33.9 | 1376 | 24.6 |
| PET - 10% | 31.7 | 1392 | 22.8 |
| PET - 15% | 43.0 | 1426 | 30.2 |

FIG. 39a

| Sample Type | Tensile Strength (MPa) | Density (kg/m³) | Specific Strength (kN.m/kg) |
|---|---|---|---|
| PET | 53.4 | 1335 | 40 |
| PET + 0.6% | 53.28 | 1331 | 40 |
| PET + 1.2% | 54.14 | 1336 | 40.5 |
| PET + 2% | 39.4 | 1344 | 29.3 |

FIG. 39b

| Sample Type | Tensile Strength (MPa) | Density (kg/m³) | Specific Strength (kN.m/kg) |
|---|---|---|---|
| PET | 52.3 | 1336 | 39.2 |
| 0 USM | 53.4 | 1336 | 40.0 |
| 3.5 USM | 52.7 | 1340 | 39.3 |
| 5 USM | 53.5 | 1338 | 40.0 |
| 7.5 USM | 53.8 | 1345 | 40.0 |

FIG. 39c

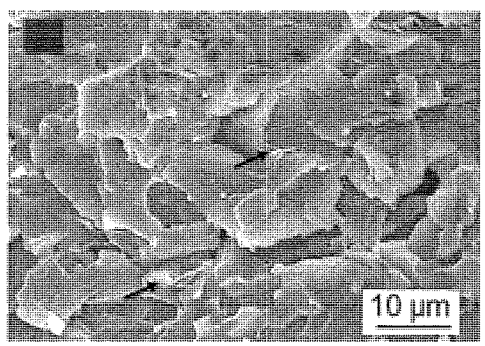
FIG. 42a
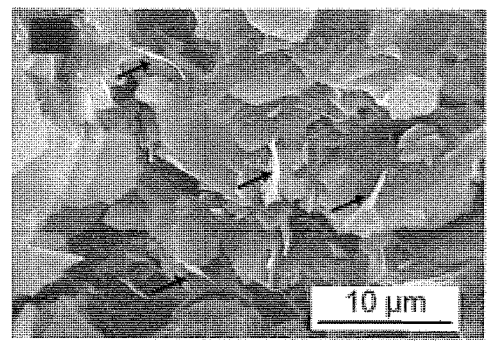
FIG. 42b
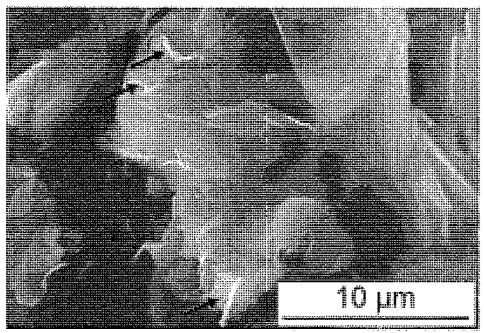
FIG. 42c
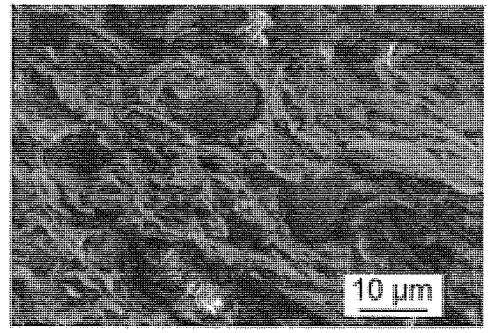
FIG. 42d
FIG. 43
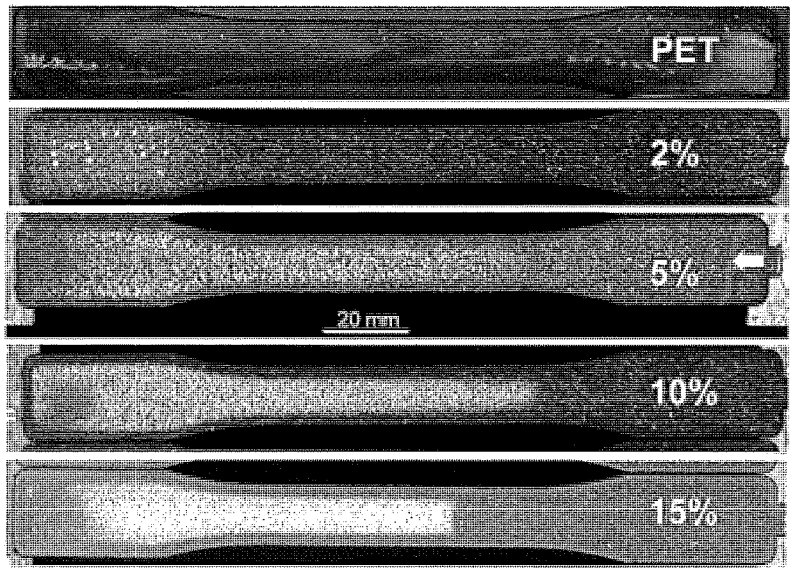

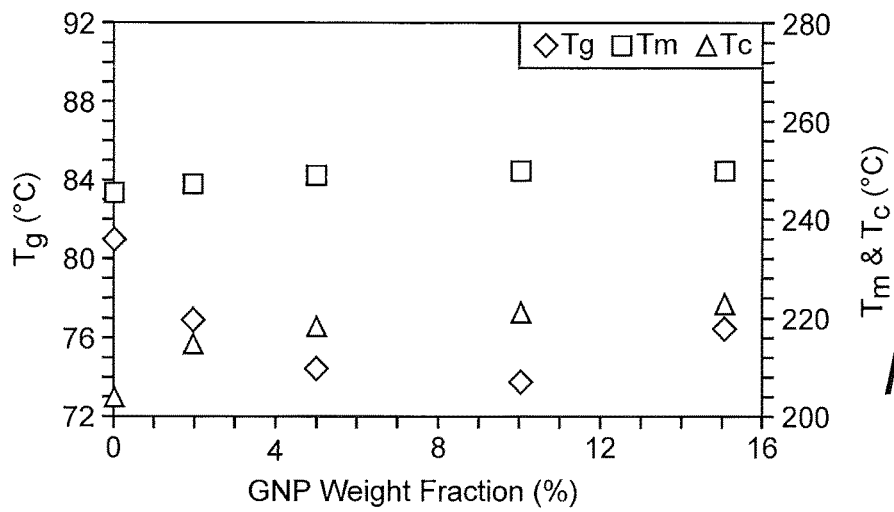
FIG. 44
FIG. 45
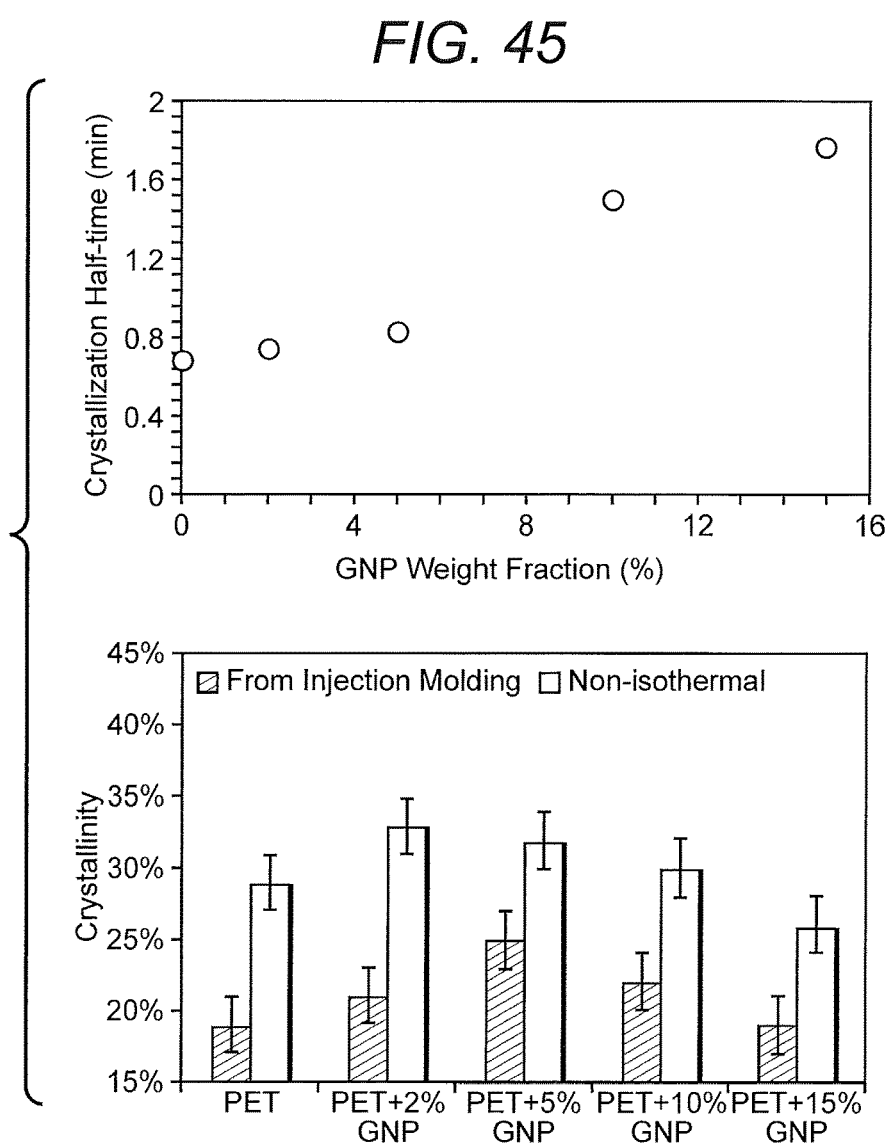

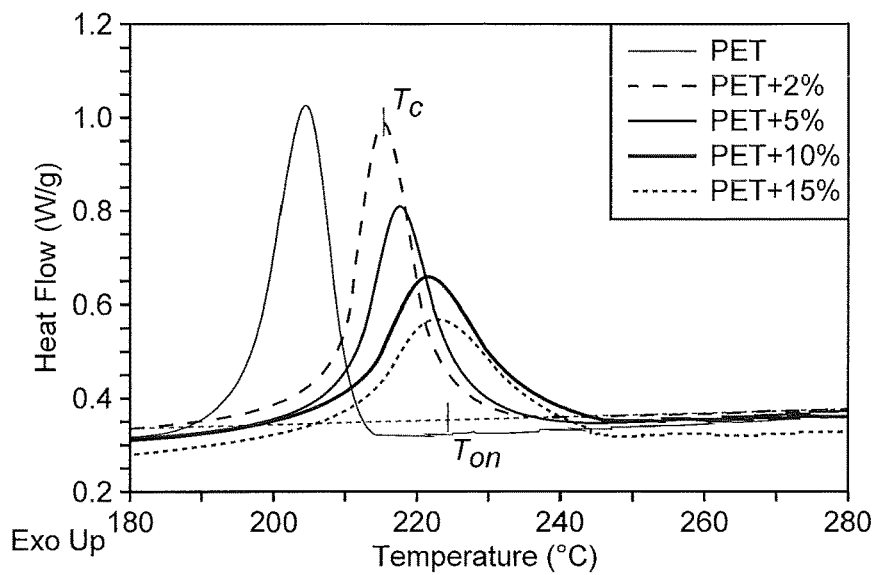
FIG. 46
FIG. 47
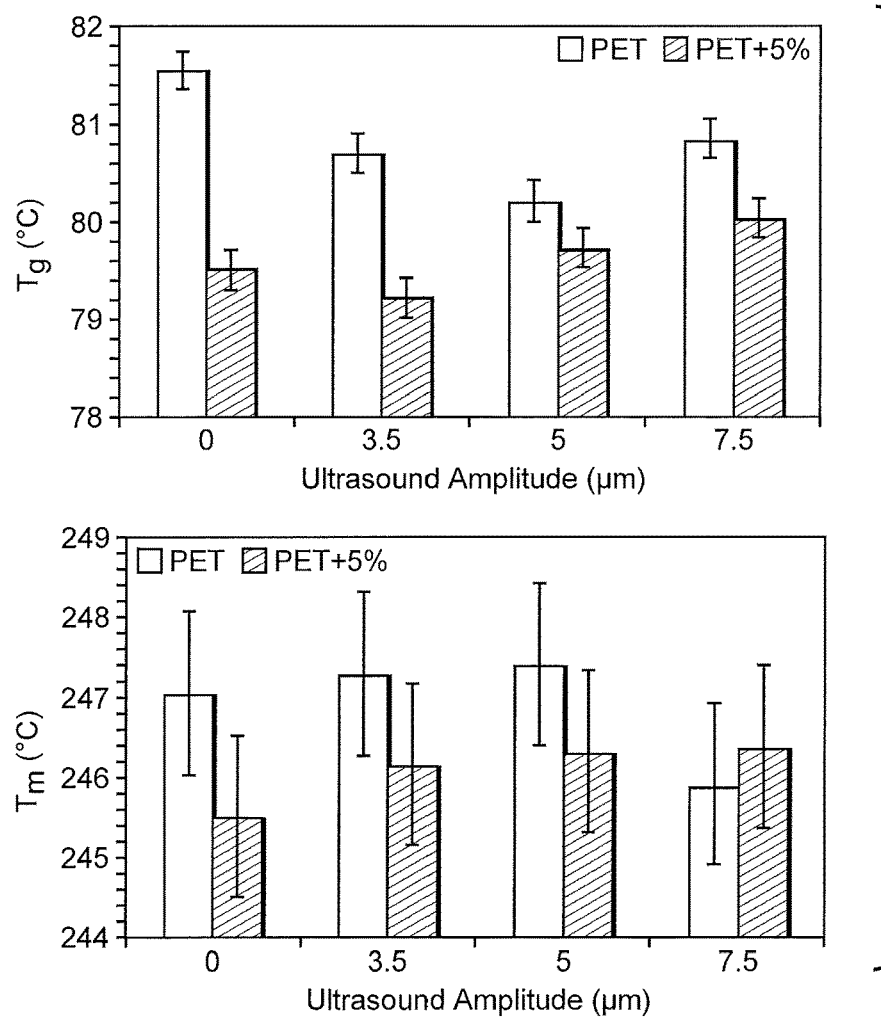

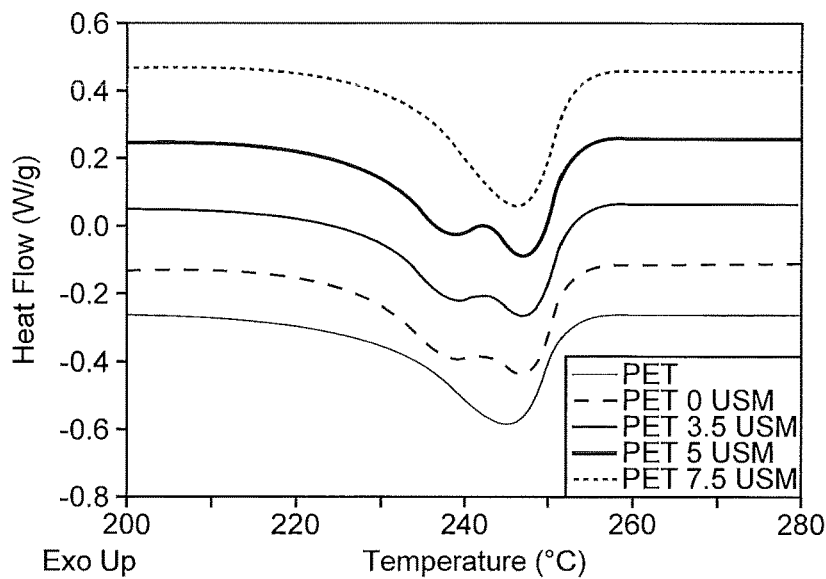
*FIG. 48*
*FIG. 49*
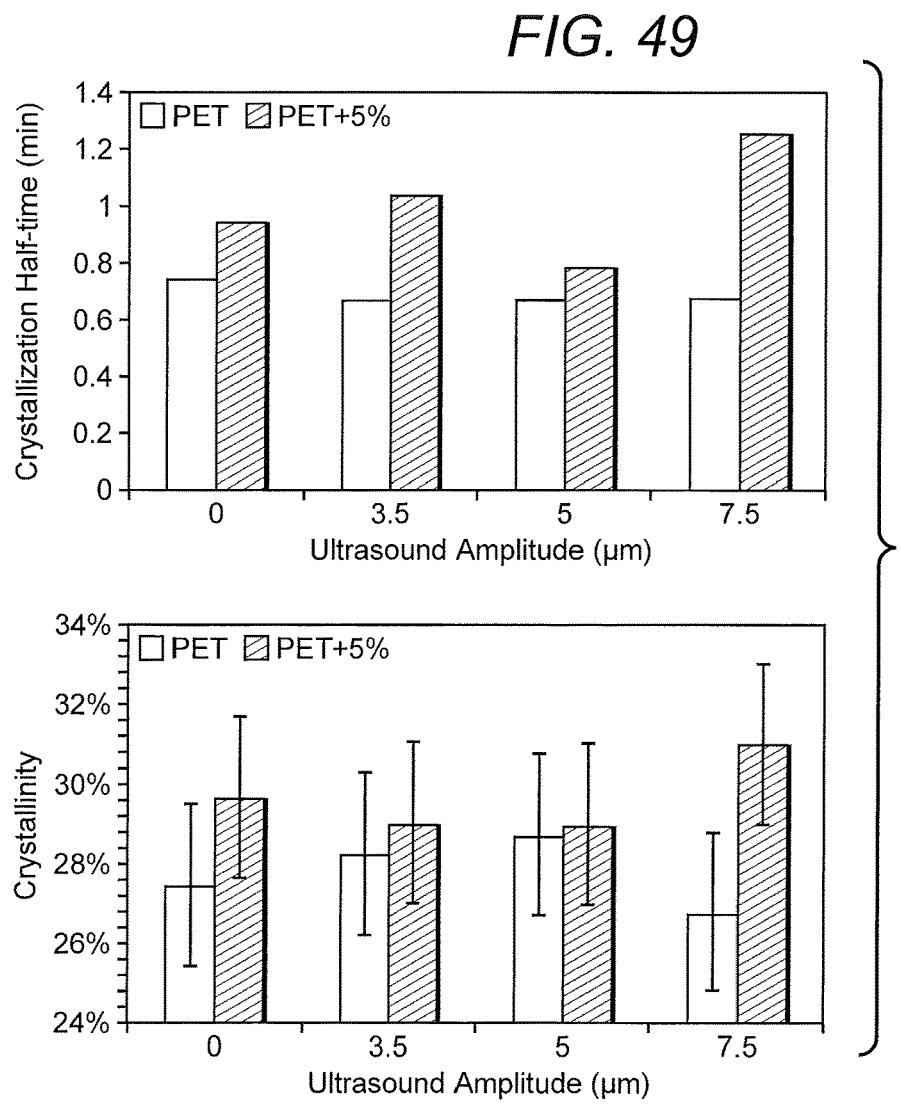

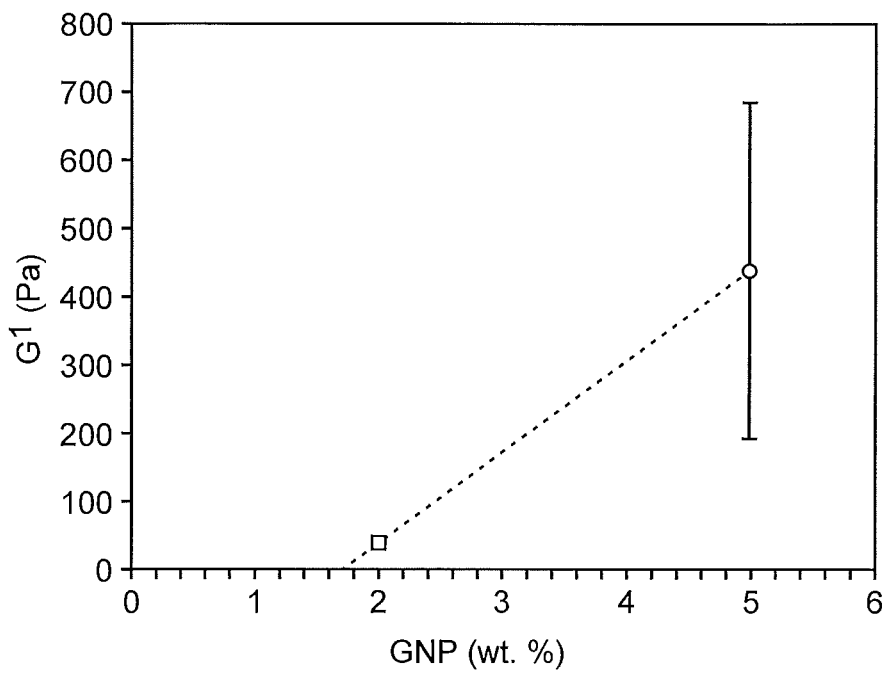
FIG. 52
FIG. 53
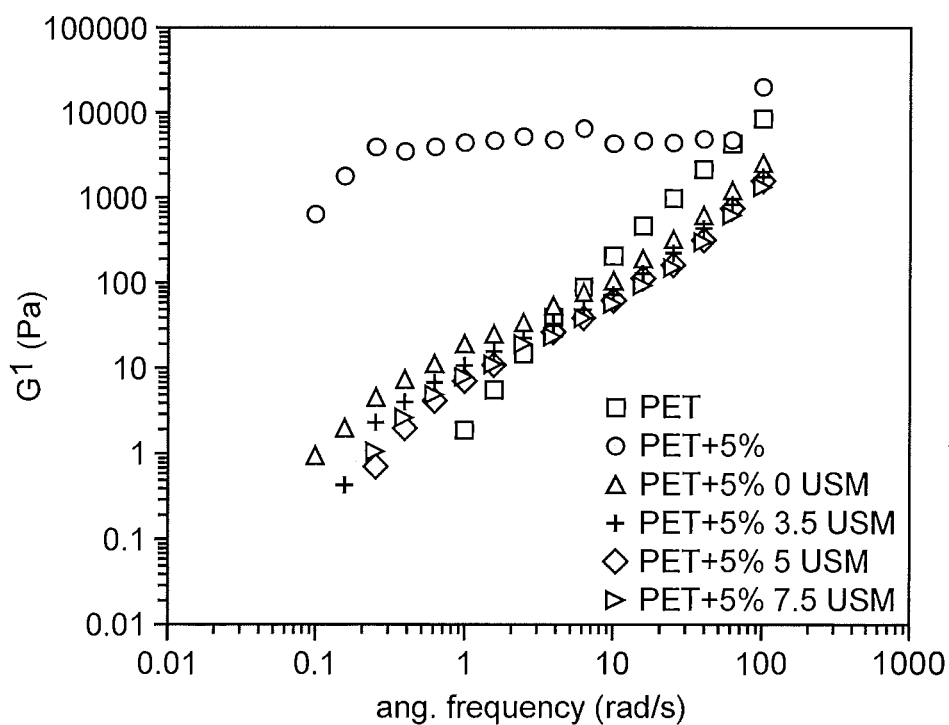

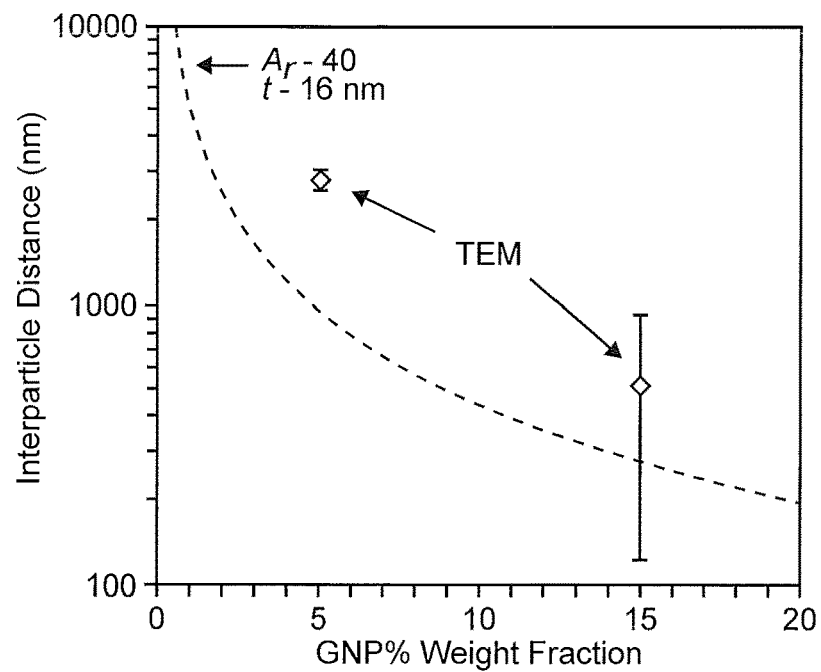
FIG. 58
FIG. 59
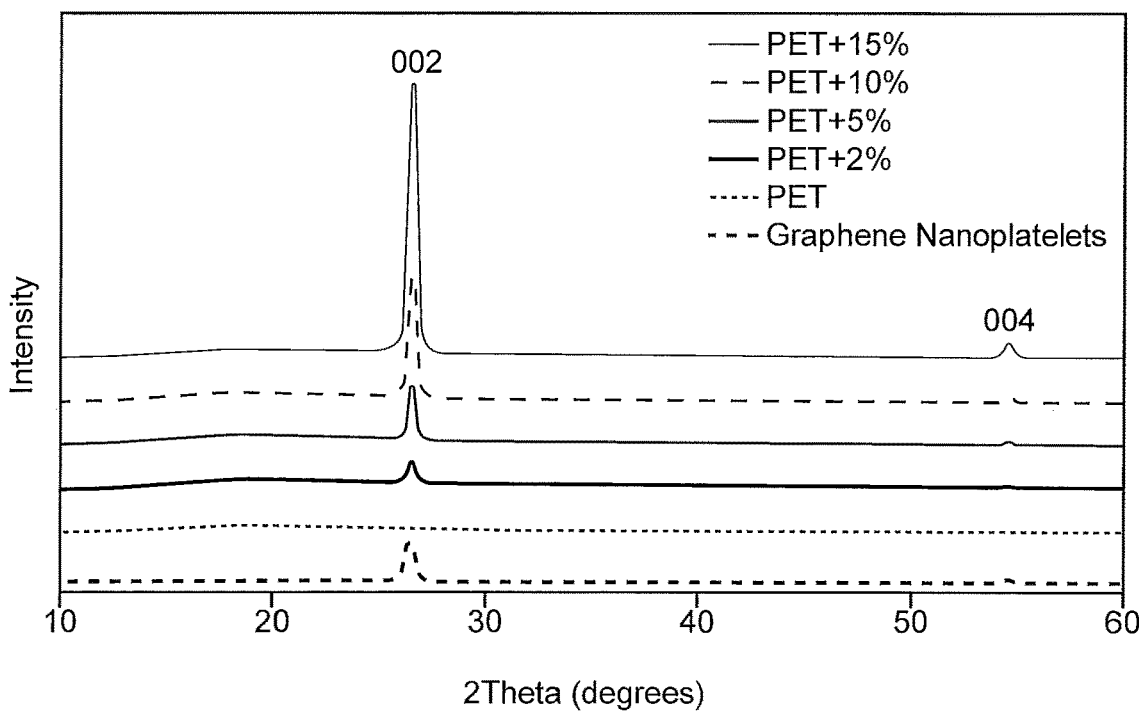

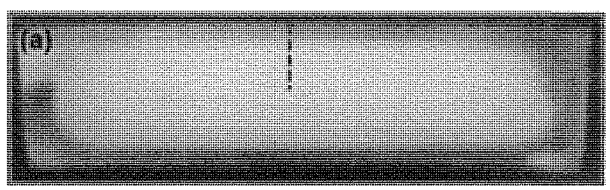
FIG. 60a
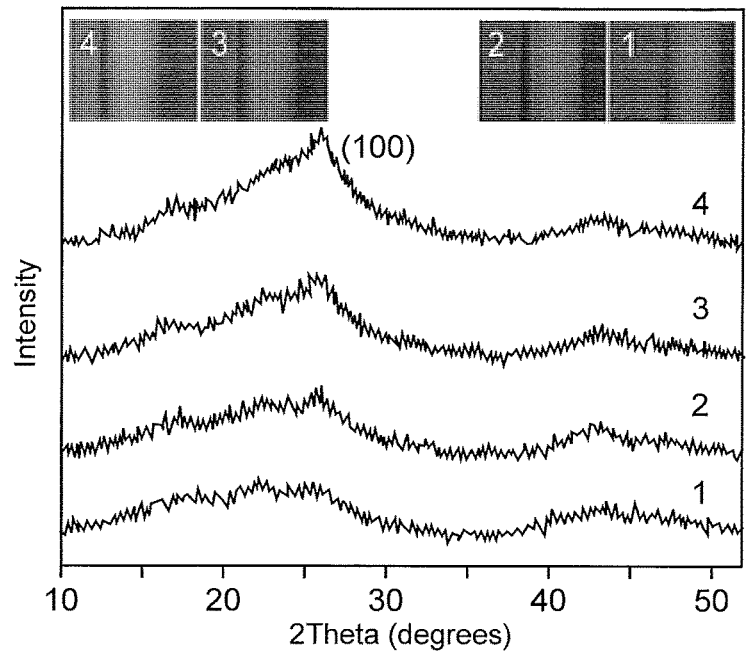
FIG. 60b
FIG. 61
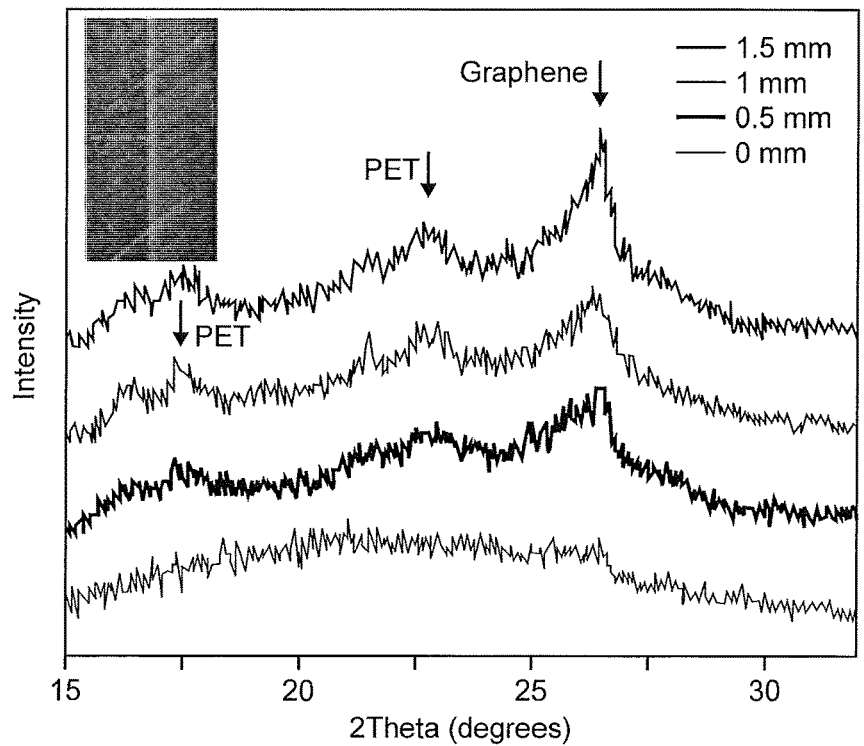

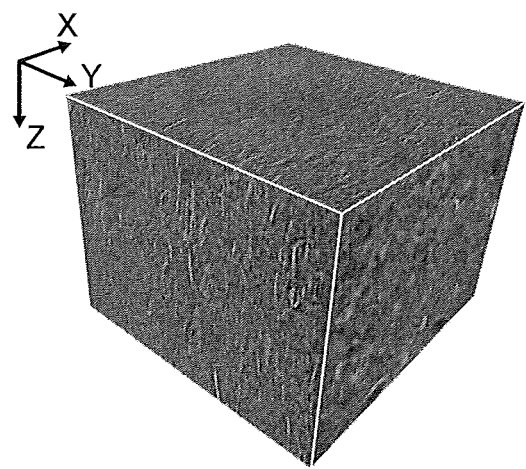
FIG. 62a
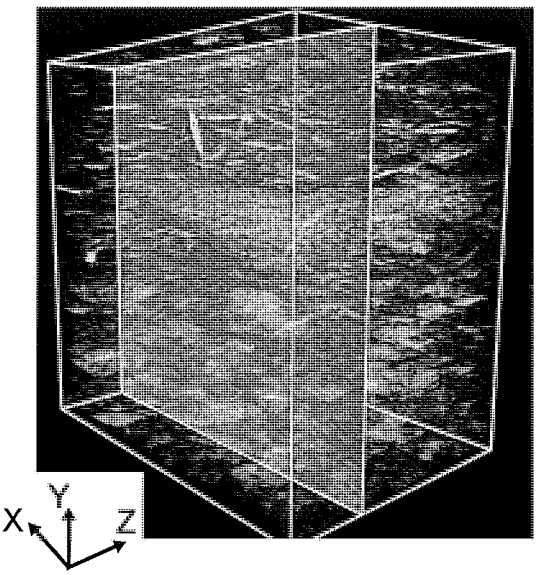
FIG. 62b
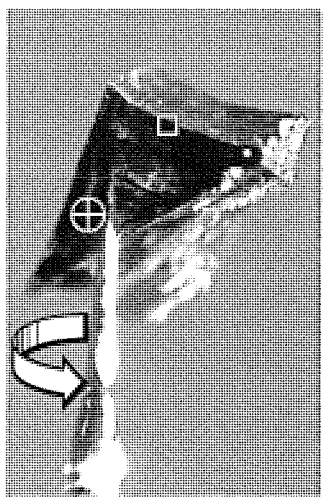
FIG. 63a
FIG. 63b
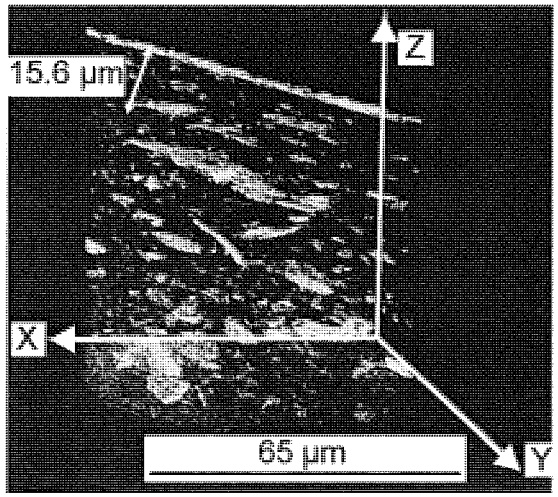

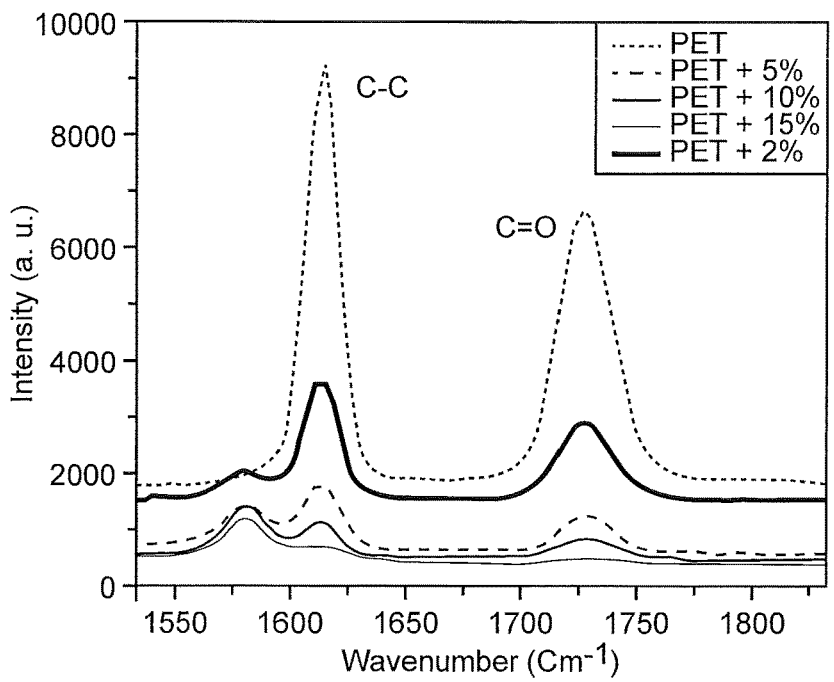
FIG. 64
FIG. 65
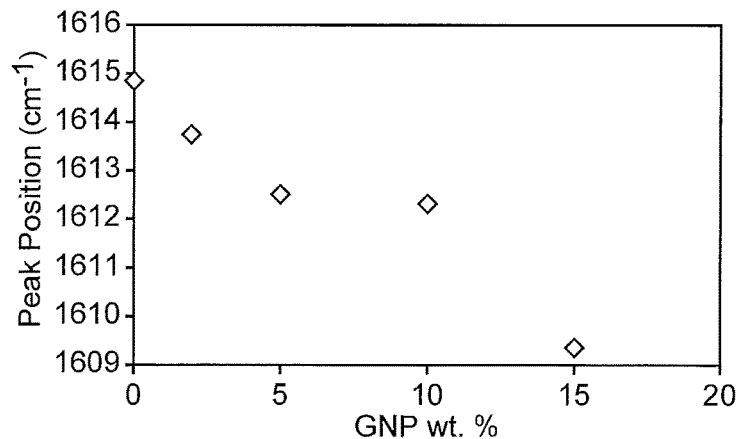
FIG. 66
| Graphene Nanoplatelet | | | | PET |
|---|---|---|---|---|
| Average Length/Diameter (D) nm (min/max) | Average Thickness (t) nm (min/max) | Aspect Ratio (D/t) | Modulus (GPa) Blakslee et. al. | Modulus (GPa) |
| 300 (28/730) | 16 (3/26) | 18.75 | 795 | 2.7 ± 0.2 |

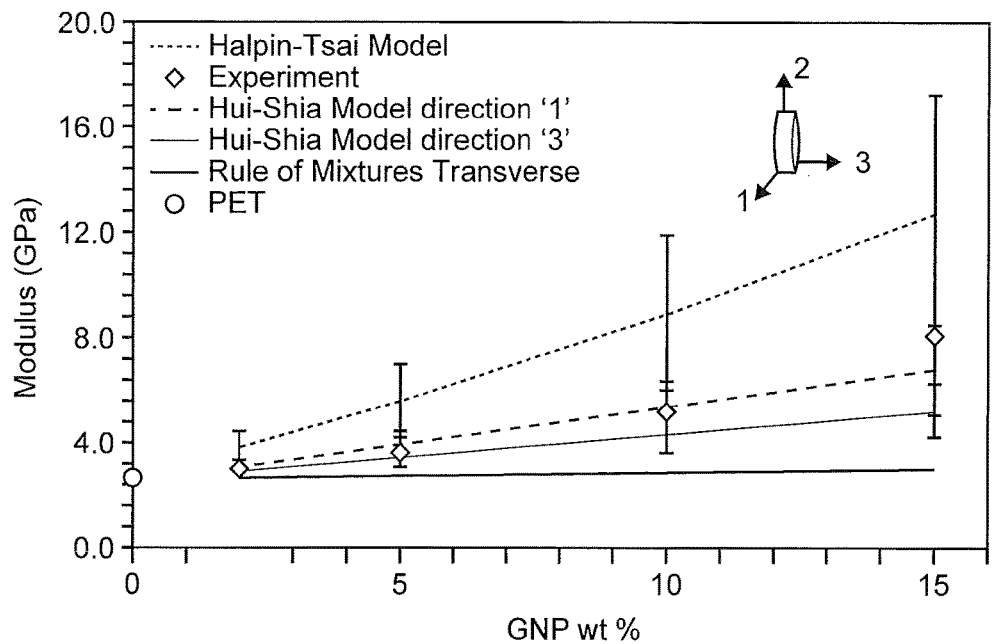
*FIG. 66a*
*FIG. 67*
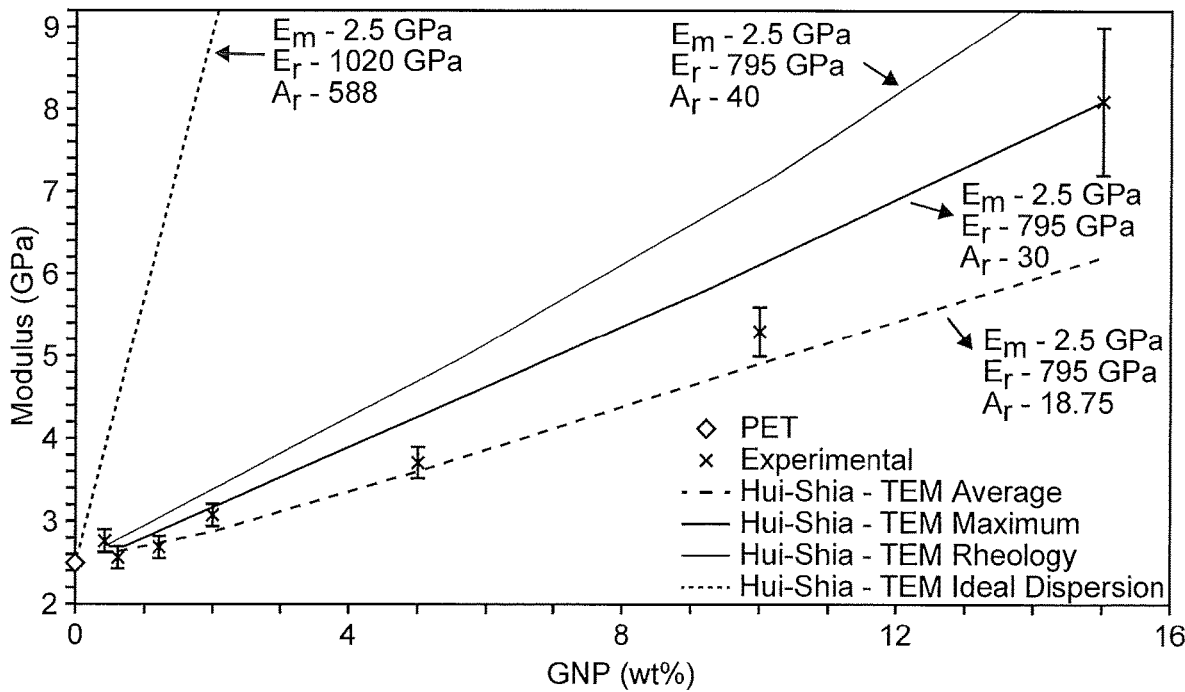

GRAPHENE REINFORCED POLYETHYLENE TEREPHTHALATE

PRIORITY

This application claims the benefit of and priority to U.S. patent application Ser. No. 15/073,477 filed Mar. 17, 2016 and U.S. Provisional Application, entitled "Injected Molded Poly(Ethylene Terephthalate)-Graphene Nanocomposites," filed on Mar. 17, 2015 having application Ser. No. 62/134,482 and U.S. Provisional Application, entitled "Graphene Reinforced Polyethylene Terephthalate," filed on Jul. 8, 2015 having application Ser. No. 62/190,193.

FIELD

The field of the present disclosure generally relates to polymer composites. More particularly, the field of the invention relates to a composition and a method for graphene reinforced polyethylene terephthalate.

BACKGROUND

Composites are defined as multiphase materials, which are found in nature or may be man-made. Man-made composites typically are formulated using one or more materials so as to achieve properties that are not available individually. Composites may be classified based on type of continuous matrix and dispersed phases, such as reinforcement. Composite materials wherein one of the constituent phases, primarily the dispersed phase, has at least one dimension on the order of 1-100 nanometers are referred to as "nanocomposites." Nanocomposites may be further classified based on category (e.g., organic or inorganic), as well as geometry of nanoscale reinforcement. A few well-known examples of naturally occurring nanocomposites include human bone, seashells, spider silk, and armored fish. As will be appreciated, each of these materials comprises a structural hierarchy (structure at multiple length scales) which makes them perform exceptionally well as compared with other materials of a similar chemistry.

Material properties of composites are known to be dependent on interactions between the matrix and the dispersed reinforcement. Large surface areas per unit volume at the nanoscale generally cause nanomaterials to function differently than their bulk counterparts. With increased interactions between the matrix and the dispersed phase, nanocomposites are considered relatively superior to conventional composites, providing advantageously new properties without compromising existing beneficial properties, such as strength or durability.

Polyethylene terephthalate (PET) is an aromatic semi-crystalline thermoplastic polyester, synthesized in the early 1940s. PET is well known for its strength and toughness, high glass transition and melting points, chemical resistance, and optical properties. PET is commonly used for commodity and engineering applications also due to its relatively low cost. PET characterized by a microstructure wherein longitudinal stretching forms strong fibers with high molecular chain orientation, as well as bi-axial stretching forming strong films. Linear PET is naturally semi-crystalline. Thermal and mechanical history, such as rate of cooling and stretching, respectively, can drive PET to be amorphous or more crystalline, and thus influence its mechanical properties. Although PET is utilized in industries such as fiber, packaging, filtration, and thermoforming industries, the use of PET is constrained due to a slow crystallization rate and a limited barrier performance as compared to other polyesters, such as PBT, PTN, and the like.

As will be appreciated, there is a long felt need to develop lightweight materials for use across a range of industries, such as packaging, automotive, and aerospace, thus promoting attempts to improve material properties through better control of material processing and an addition of reinforcements. For example, increasing the crystallinity of PET improves its mechanical and barrier properties. Restrictions with the material, however, such as crystallization rate, and industrial processes in maximizing crystallinity, such as cooling rate, cycle time, and stretching process, have limited attempts to improve the material properties of PET. Progress in the field of nanomaterials, however, has led to a development of PET nanocomposites which have improved the physical properties of PET, thus making PET more effective for applications within the automotive, aerospace, and protective apparel industries. Different types of nanoreinforcements (Clay, CNF, CNT, Graphene, SiO2, etc.) have been found to improve the material properties of PET, such as mechanical, thermal, barrier, electrical, fire retardation, optical, surface properties, crystallization kinetics of PET, and the like.

Exfoliation of nanoreinforcements into individual entities and their uniform dispersion into a polymer matrix is essential for the success of polymer nanocomposites. Uniform dispersion of nanoreinforcements in polymers may be achieved by way of various approaches, including, but not limited to, melt-compounding, in-situ polymerization, surface treatment of the nanoreinforcements, and the like. Carbon nanomaterials, such as carbon nanofibers, carbon nanotubes (CNTs), and graphene generally are advantageous due to their superior material properties and simple chemistry. Multi-fold property improvements can be achieved through the dispersion of carbon nanomaterials into polymers Graphene is a relatively new nanomaterial which comprises a single layer of carbon atoms similar to an unzipped single walled carbon nanotube. Single layer graphene generally is twice as effective as CNTs in reinforcing polymers since graphene has two surface for polymer interaction whereas a CNT comprises only one exterior surface for polymer interaction. It will be appreciated that a development of graphene synthesis methods in conjunction with an introduction of new graphene-based nanomaterials, such as graphene oxide, expanded graphite, and graphene nanoplatelets, has made graphene commercially viable. However, limited information on the effectiveness of graphene-based nanomaterials has limited their application in fabricating polymer nanocomposites. Thus, there is a need for investigating the influence of graphene nanomaterials in reinforcing polymers.

Melt-compounding and in-situ polymerization have been the most studied techniques for preparing PET-Graphene nanocomposites. Although in-situ polymerization is effective in dispersing graphene, the use of in-situ polymerization is limited due to difficulties in attaining a desired molecular weight and a need for expensive reactors. Melt-compounding is a straight-forward approach involving shear mixing, but that alone has not been found to be effective in dispersing graphene in the several polymer systems tested. As will be appreciated, achieving a homogenous dispersion of the nanoplatelets in PET is critical for improving bulk properties. Dispersing graphene in PET is nontrivial, however, as PET generally is highly viscous (500-1000 Pas) with a melting temperature of 260° C.-280° C. Thus, selecting a process that can allow working at high temperatures and with highly viscous materials is necessary.

Another important aspect for the implementation of polymer nanocomposite applications is an ability to predict their material properties so as to provide flexibility in designing manufacturing processes and to reduce developmental costs. Traditional composite models are not accurate in predicting the properties of nanocomposites. Although micromechanical models based on continuum theory have been found to be effective in estimating short fiber composites, few studies have reported an applicability of these models to nanocomposites.

What is needed, therefore, is an effective process whereby graphene nanoplatelets (GNP) may be uniformly dispersed in PET so as to reinforce bulk PET, and micromechanical models whereby the material properties of reinforced bulk PET may be predicted.

BRIEF DESCRIPTION OF THE DRAWINGS

The drawings refer to embodiments of the present disclosure in which:

FIG. 1 is a chemical formula illustrating a molecular structure of polyethylene terephthalate in accordance with the present disclosure;

FIG. 2 is a graph illustrating a relationship between particle interface and size, according to the present disclosure;

FIG. 3 is a table listing properties of graphene obtained through different methods, according to the present disclosure;

FIG. 4 illustrates unique structure of carbon allotropes in accordance with the present disclosure;

FIG. 5 is a micrograph illustrating carbon black nanoparticles used for reheat performance of PET, according to the present disclosure;

FIG. 6(a) is a micrograph of graphene nanoplatelets, according to the present disclosure;

FIG. 6(b) is a micrograph showing a presence of multiple nanoplatelets in an agglomerate in accordance with the present disclosure;

FIG. 7 is a chemical formula illustrating a molecular structure of nanoplatelets (xGnP), according to the present disclosure;

FIG. 13 is a schematic illustrating a reactor setup for a polycondensation step in accordance with the present disclosure;

FIG. 14 is a chemical formula illustrating formation of PET polymer chain from monomer, in accordance with the present disclosure;

FIG. 14(a) is a table listing reaction times and methanol yield for respective polymerization batches, according to the present disclosure;

FIG. 16(c) is a table listing details of PET nanocomposite samples obtained by way of injection molding in accordance with the present disclosure;

FIG. 16(d) is a table illustrating a comparison of process pressures between PET and nanocomposites from ultrasound treated master-batches, according to the present disclosure;

FIG. 19(c) is a table listing process parameters for tensile bars made by way of a micro-injection molding system in accordance with the present disclosure;

FIG. 20 is a schematic illustrating a capillary viscometer in accordance with the present disclosure;

FIG. 21(a) illustrates testing of a nanocomposite tensile bar in accordance with the present disclosure;

FIG. 30 is a graph illustrating engineering stress-strain curves for PET and PET-GNP nanocomposites, according to the present disclosure;

FIG. 31 is a graph illustrating Young's modulus and tensile strength of nanocomposite tensile bars in accordance with the present disclosure;

FIG. 32(a) illustrates a PET tensile bar, according to the present disclosure;

FIG. 32(b) illustrates a PET-15% GNP tensile bar after testing in accordance with the present disclosure;

FIG. 32(c) illustrates PET-GNP tensile tubes stretched and a brittle failure, according to the present disclosure;

FIG. 36 is a graph illustrating ultimate tensile strength of ultrasound treated PET (horizontal axis-ultrasound amplitude) compared with PET control, according to the present disclosure;

FIG. 37 is a graph illustrating modulus and strength of ultrasound processed nanocomposites with 2% GNP, according to the present disclosure;

FIG. 39(a) is a table listing tensile strength and specific strength for nanocomposite tensile bars, in accordance with the present disclosure;

FIG. 39(b) is a table listing tensile strength and specific strength for nanocomposite tensile tubes, according to the present disclosure;

FIG. 39(c) is a table listing tensile strength and specific strength of nanocomposite tubes from an ultrasound masterbatch, according to the present disclosure;

FIG. 42(a) is a micrograph illustrating a nanocomposite tensile bar failure surface at 2% weight fraction, according to the present disclosure;

FIG. 42(b) is a micrograph illustrating a nanocomposite tensile bar failure surface at 5% weight fraction in accordance with the present disclosure;

FIG. 42(c) is a micrograph illustrating a nanocomposite tensile bar failure surface at 10% weight fraction, according to the present disclosure;

FIG. 42(d) is a micrograph illustrating a nanocomposite tensile bar failure surface at 15% weight fraction, according to the present disclosure;

FIG. 43 illustrates ultrasound micrographs of PET and PET nanocomposite tensile bars wherein an arrow indicates an injection flow direction, according to the present disclosure;

FIG. 44 is a graph illustrating GNP weight fraction vs. glass transition temperature ($T_g$), melting temperature ($T_m$), and crystallization temperature ($T_c$), with an error on temperature measurements of 0.5° C. in accordance with the present disclosure;

FIG. 45 comprises a left-hand graph illustrating crystallization half-time of PET nanocomposites, measured within 0.05 min, and a right-hand graph illustrating percent crystallinity of PET nanocomposites, accordance with the present disclosure;

FIG. 46 is a graph illustrating crystallization exotherms for PET and twin-screw compounded PET nanocomposite pellets, in accordance with the present disclosure;

FIG. 47 comprises graphs illustrating glass transition and melting temperatures for ultrasound treated PET and PET nanocomposite pellets in accordance with the present disclosure;

FIG. 48 is a graph illustrating melting curves (second heat) of ultrasound treated PET, according to the present disclosure;

FIG. 49 comprises a left-hand graph illustrating crystallization half-time (measured within 0.05 min) for ultrasound treated PET and PET+5% GNP pellets, and a right-hand graph illustrating crystallinity for ultrasound treated PET and PET+5% GNP pellets in accordance with the present disclosure;

FIG. 52 is a graph illustrating shear modulus vs. GNP weight fraction and a suggested percolation threshold in accordance with the present disclosure;

FIG. 53 is a graph illustrating storage modulus of ultrasound nanocomposites compared with PET and twin-screw nanocomposite in accordance with the present disclosure;

FIG. 58 is a graph illustrating interparticle distance vs. GNP weight fraction with a dashed line representing a comparison of experimental data with theoretical trend in accordance with the present disclosure;

FIG. 59 is a graph illustrating X-ray diffraction patterns for GNPs, PET, and nanocomposite tensile bars in accordance with the present disclosure;

FIG. 60(a) illustrates an X-ray diffraction scan along a cross-section of a PET tensile bar, according to the present disclosure;

FIG. 60(b) is a graph illustrating X-ray diffraction patterns of the line diffraction scan of FIG. 60(a), according to the present disclosure;

FIG. 61 is a graph illustrating X-ray diffraction patterns at a multiplicity of depths within a 3-mm thick 15% nanocomposite tensile bar in accordance with the present disclosure;

FIG. 62(a) illustrates a reconstructed 3D volume of 15% nanocomposite with a boundary size of 240 µm×240 µm×163 µm, according to the present disclosure;

FIG. 62(b) illustrates nanoplatelets within the nanocomposite of FIG. 62(a) indicating an orientation of platelets along an injection flow direction (Z-axis) in accordance with the present disclosure;

FIG. 63(a) illustrates a sample mounted onto a rotating pin wherein a cross mark indicates an injection flow direction, according to the present disclosure;

FIG. 63(b) illustrates a distribution of nanoplatelets from an inside edge of a 2% nanocomposite tensile tube in accordance with the present disclosure;

FIG. 64 is a graph illustrating Raman bands corresponding to C—C stretching for PET and PET nanocomposites, according to the present disclosure;

FIG. 65 is a graph illustrating a shift in the Raman band corresponding to C—C stretching with an increase in GNP weight fraction in accordance with the present disclosure;

FIG. 66 is a graph illustrating predicted modulus of PET-Graphene nanocomposites as compared with experimental results in accordance with the present disclosure;

FIG. 66(a) is a table listing properties of GNP and PET for micromechanical model based predictions in accordance with the present disclosure;

FIG. 67 is a graph illustrating a comparison of nanocomposite experiment behavior with theoretical predictions wherein $E_m$ is a matrix modulus, $E_r$ is a GNP modulus, and $A_f$ is an aspect ratio (diameter/thickness), according to the present disclosure;

Figures 8, 9:
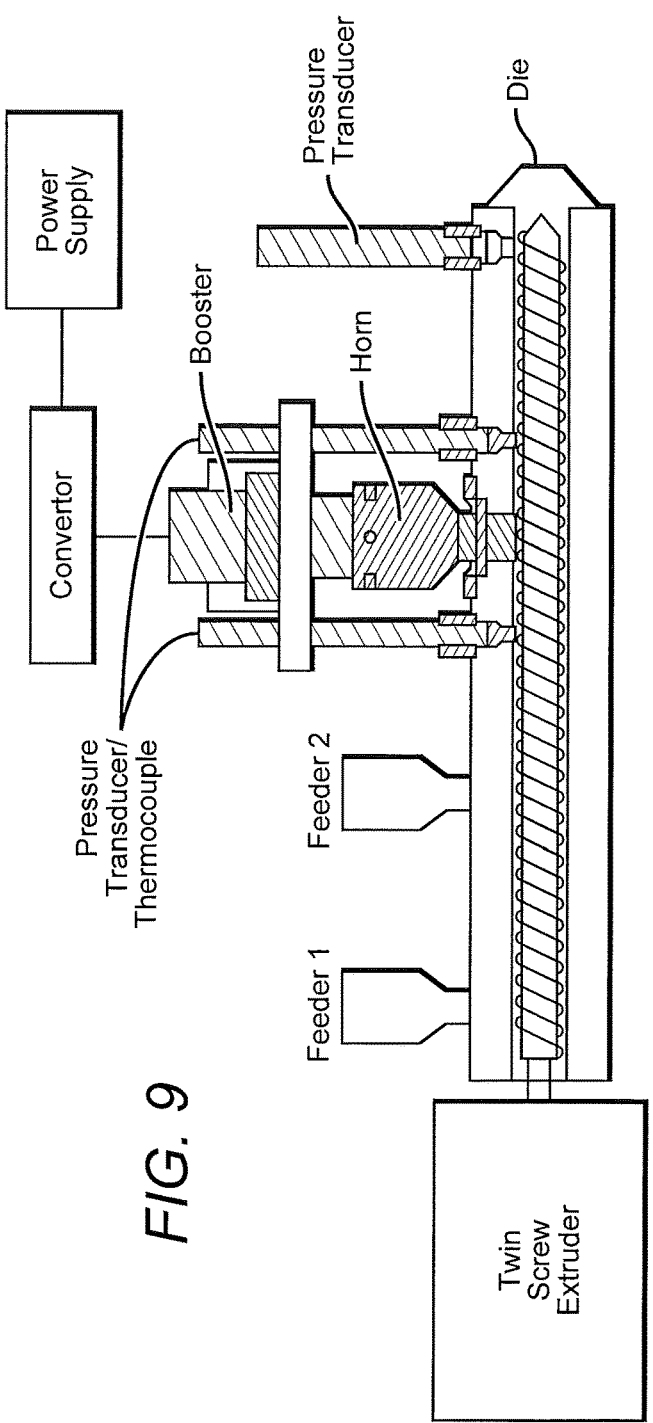
FIG. 8 is a table listing properties of PET and master-batch pellets in accordance with the present disclosure.
FIG. 9 is a schematic illustrating an ultrasound assisted twin-screw extrusion system in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first process," may be made. However, the specific numeric reference should not be interpreted as a literal sequential order but rather interpreted that the "first process" is different than a "second process." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure provides a composition and method for graphene reinforced polyethylene terephthalate (PET). Graphene nanoplatelets (GNPs) comprising multi-layer graphene are used to reinforce PET, thereby improving the properties of PET for various new applications. Master-batches comprising polyethylene terephthalate with dispersed graphene nanoplatelets are obtained by way of compounding. The master-batches are used to form PET-GNP nanocomposites at weight fractions ranging between 0.5% and 15%. In some embodiments, PET and GNPs are melt compounded by way of twin-screw extrusion. In some embodiments, ultrasound is coupled with a twin-screw extruder so as to assist with melt compounding. In some embodiments, the PET-GNP nanocomposites are prepared by way of high-speed injection molding. The PET-GNP nanocomposites are compared by way of their mechanical, thermal, and rheological properties so as to contrast different compounding processes.

Polyethylene terephthalate (PET) is an aromatic semi-crystalline polyester. PET is synthesized through condensation polymerization, using Terephthalic acid (TPA) and Ethylene Glycol (EG), or Dimethyl Terephthalate (DMT) and Ethylene Glycol (EG) as raw materials. A multi-step polymerization process is used in the manufacture of PET so as to achieve a desired molecular weight and to minimize a formation of byproducts (e.g., Acetaldehyde). A molecular structure of PET is shown in FIG. 1. As will be appreciated, a presence of a rigid aromatic ring in the molecular chain gives rise to high melting and glass transition temperatures, as well as stiffening the polymer. Further, the rigid aromatic ring also gives the molecule a nearly planar arrangement in the crystal structure. A combination of physical properties and chemical inertness makes PET suitable for applications such as fibers, packaging, and engineering molding.

Although PET is limited in terms of crystallization rate and barrier performance, PET's relatively low price drives an interest in improving the material properties of PET by way of adding fillers and reinforcements. Nanomaterials provide an advantage of reinforcing PET while minimizing a change in density of the obtained composite material.
Nanoreinforcements Nanoreinforcements generally are categorized into three different groups, based on their geometry, namely: nanoparticles, nanotubes and nanoplatelets. Nanoreinforcements are advantageous over larger reinforcements. It will be recognized that the smaller the particles, the stronger and more effective the particles are in reinforcing the matrix as compared with larger counterparts. Another advantage is the available surface area for a unit volume. In the case of spherical particles, for example, a ratio of the surface area to volume is inversely proportional to the particle radius. FIG. 2 illustrates an increase in interface for different types of reinforcements ranging in size from microscale to nanoscale. As indicated in FIG. 2, a surface energy available per unit area will be high for nanoparticles, thereby making them chemically active.

It will be appreciated that the selection of nanoreinforcements depends on many factors such as the polymer used, an intended application, target properties, a desired form of interaction with the polymer, material handling concerns, a processing method, as well as cost. It will be further appreciated that the shape of the nanoreinforcement influences the characteristics of the polymer nanocomposite.

Nanoparticles may be classified as organic or inorganic, based on their chemistry. A number of nanoparticles have been used in polymer nanocomposites, such as organoclays (MMT), metal nanoparticles (e.g. Al and Ag), metal oxides (e.g. Al2O3, ZnO, and silica), cellulose nanocrystals, and carbon derivatives (CNT's, Fullerenes, Graphite oxide, and Graphene).

Carbon Nanoreinforcement and Graphene

Carbon is an interesting element of the periodic table possessing unique hybridization properties and an ability to manipulate its structure. Carbon finds applications in several industries and processes commonly in the foam of graphite, amorphous carbon, and diamond. At the nanoscale, carbon materials are also interesting, showing unique properties and structures, as shown in FIG. 4, such as fullerene, carbon nanotubes (CNTs), and graphene.

Graphene is defined as a single layer of carbon atoms with a two-dimensional structure ($sp^2$ hybridization, planar hexagonal arrangement with a C—C bond distance of 0.142 nm). A thickness of a single graphene sheet is estimated to be substantially 0.335 nm. One of the first two-dimensional materials available, graphene has a potential to replace many contemporary materials used for different applications. During the course of graphene research, researchers have developed different graphene-based materials, such as single layer graphene sheets (SLGS), few-layer graphene (FLG), multi-layer graphene (MLG), and exfoliated graphene platelets.

Graphene is superior over other carbon-based nanoreinforcements, such as CNTs, CNFs, and expanded graphite (EG), in terms of its aspect ratio, flexibility, transparency, thermal conductivity and low coefficient of thermal expansion (CTE). The density of single layer graphene was calculated at 0.77 mg m$^{-2}$. Graphene is regarded as the strongest material with appreciable size. A Young's modulus of 1.02±0.03 TPa (0.2 TPa for 4130 steel) and a strength of 130±10 GPa (0.7 GPa for 4130 steel) have been measured for a single layer graphene sheet suspended over open holes, by means of an atomic force microscope (AFM) nanoindentation technique. Graphene is found to exhibit a negative coefficient of thermal expansion, $\alpha=-4.8\pm1.0\times10^{-6}$ K$^{-1}$ through the 0-300 K temperature range and a very high thermal conductivity (K) of 3000 W mK$^{-1}$ comparable to that of CNTs. Further, graphene sheets have been found to be hydrophobic and have a surface energy at room temperature of 46.7 mJ m$^{-2}$.

The abovementioned properties are for a high quality single layer graphene sheet. Properties of multi-layer graphene are different than the properties of single layer graphene. Thus, the number of layers ("n") comprising the graphene influences the properties of the graphene. A single layer graphene sheet exhibits up to 97.7% transparency (2.3% absorption) and decreases linearly as the number of layers increases. It is been shown that the thermal conductivity of graphene drops by more than 50% as the number of layers increases from 2 to 4 and is comparable to that of bulk graphite when the number of layer is greater than 8. Further, it has been found that the modulus of graphene sheets decreases with an increase in temperature and with an increase in 13 C isotope density, but increased with an increase in the number of layers. It will be appreciated, however, that structural mechanics based atomistic modeling of multi-layer graphene structures, molecular simulation of covalent and van der Waals interactions between layers, and experimental measurements indicate a decrease in the modulus with an increasing number of layers. Mechanical properties of graphene nanoplatelets such as stiffness and Poisson's ratio have been shown to decrease with an increase in the number of layers, based on molecular dynamics simulations. The stiffness of the nanoplatelets comprising five layers has been estimated to decrease by 15% as compared to single layer graphene, and the properties of the graphene differ based on orientation. It has been shown that an effective Young's modulus of multi-layer graphene comprising 10 layers is substantially 380 GPa, which is less than that of a graphite crystal. The effective Young's modulus is determined based on the stress transfer efficiency between layers for a multi-layer graphene. The effective Young's modulus deviates from the modulus of a single layer graphene when the multi-layer graphene is of more than 3 layers, at which point the core layer(s) will not be in contact with the polymer.

Single layer graphene may be obtained by way of "top down" or "bottom up" approaches. Separation of graphene sheets from graphite through mechanical cleavage is a "top down" approach. Although graphene obtained from this method is pristine and useful for testing purposes, it is not practical for acquiring significant quantities of graphene. Alternatively, graphene may be prepared by way of "bottom up" approaches wherein chemical methods are used, such as chemical vapor deposition (CVD), epitaxial growth, as well as synthesis through colloidal suspension. Further, graphene may also be made from CNTs by way of chemical etching and from flash reduction of graphite oxide. The approach used to obtain graphene influences the physical properties of the graphene, thereby enabling graphene to be targeted for different applications, as shown in FIG. 3.

Processing of Nanocomposites

Composite manufacturing is an extensively studied field with a number of processes available based on the size and application of the final product. Nanocomposite processing involves a process for dispersion of the nanoreinforcement and forming processes for the intended final application. A feasibility of nanocomposites largely depends upon cost, an availability of nanoparticles, and suitable manufacturing processes. Manufacturing techniques such as: injection and compression molding, layer-by-layer (LBL) manufacturing, in-situ micro-emulsion polymerization, and spinning have been used for polymer nanocomposites. As will be appreciated, selection of the manufacturing process depends on the matrix resin and type of the nanoparticles to be used. It will be further appreciated that injection molding is the most important of all plastic processing techniques because of its, speed, scalability, and tolerance to a wide range of materials. Methods attempted for achieving uniform dispersion of nanoreinforcements in a polymer are discussed in the following section.

Dispersion of Nanoreinforcements

Achieving uniform and homogenous dispersion, or an "exfoliated" state, of nanoreinforcements is vital for the success of polymer nanocomposites. Nanomaterials possess a high surface energy per unit area, and thus they tend to form agglomerates so as to minimize this energy. The tendency to agglomerate makes it difficult to maintain the nanomaterials' nanoscale effective dimensions and disperse the nanomaterials into a polymer matrix. Dispersion of nanoreinforcements into the molten polymer depends on factors, such as viscosity of the melt, wetability of the reinforcement, energy imparted through the mixing process, including breaking agglomerates, and efficiency of the mixing process. Dispersion methods can be broadly categorized as mechanical-based and chemical-based. Several dispersion methods have been investigated under the mechanical-based category, such as melt compounding, master-batch processing, ultrasound-assisted compounding, chaotic advection blending, solid-state shear pulverization (SSSP), solid state ball milling (SSBM), and acoustic mixing. These dispersion methods may be further categorized as "melt mixing" or "solid state mixing."

Melt compounding is the most commonly employed technique for dispersing nanoreinforcements in thermoplastic polymers. As described herein, nanoreinforcements were dispersed into a molten polymer by way of a mixing action of a single or twin-screw extruder. Solid state shear pulverization (SSSP) is another mechanical mixing technique, developed for blending immiscible polymers. However, distortion of the nanoplatelets during the screw mixing processes is of concern as that can reduce their effectiveness. Some other techniques mentioned above involving solid state mixing are SSBM and acoustic mixing. In SSBM the nanoparticles and the polymer mixture are milled to fine powders and then used as an input for a secondary process. Acoustic mixing is based on a generation of a uniform shear field throughout the mixing chamber for high efficiency mixing.

A chemical approach to prevent agglomeration is to modify the surface, or functionalize the surface, of the nanoparticle, which reduces the surface energy, changes their polarity, and thereby prevents agglomeration. Through functionalization, the surface of the nanoparticle is covered with ions or molecules (i.e., surfactants) that are compatible with a specific polymer. As every polymer has a different chemistry and structure, choosing a correct functionalization is important.

Moreover, there are solvent mixing techniques such as sol-gel processing, solution mixing, sonication, shear mixing, and high speed mixing. These techniques are mainly useful for working with thermosetting resins and low temperature thermoplastics. They are mainly reserved for batch wise processing and pose handling and consistency issues for large scale processing.

In a twin-screw extruder, the polymer melts between two rotating screws and the housing by undergoing shear deformation. As the nanoplatelets are bound with Van der Waals forces, they can be separated by an application of shear forces during mixing. Shearing and mixing of the reinforcements and the polymer melt can be achieved through mixing screw's possessing a large length-to-diameter ratio (L/D) and by an application of different screw elements. Taking advantage of this, twin-screws have been used for decades in compounding. Since their inception into polymer processing, different types of twin-screw extruders have been developed. Basic differences are based on the shape and direction of screw rotation. There are co-rotating, counter-rotating, and intermeshing screws. In order to increase the efficiency of mixing, segmented screws with different replaceable elements (e.g. kneading elements) have also been developed. It has been found that nanocomposites show similar performance irrespective of the type of screw rotation, but using counter-rotating screws gives rise to better dispersion. Further, it has been found that the flow velocity in a co-rotating screw is higher at the screw tip. This corresponds to a higher shearing rate and is considered good for mixing.

As will be appreciated, the melt compounding method is the most convenient and industrially promising process to produce polymer nanocomposites. Master-batch mixing is a multi-stage approach whereby already mixed polymer-nanoreinforcement pellets are melted again and mixed at the same or reduced loading rate. Those skilled in the art will recognize that master-batch mixing is commonly used during polymer processing for adding specialized additives or dyes during primary processes such as injection molding and extrusion. Master-batch pellets are prepared using the same or a compatible base resin and the additive at high loading rates. Further, it has been found that nanocomposites from the master-batch process are superior to those obtained by way of melt processing. Having the secondary mixing helped in improving the performance of the nanocomposites through increased dispersion.

In case of the ultrasound-assisted extrusion, along with twin-screw mixing, additional energy is applied in the form of ultrasound waves. Ultrasound energy is used for making thermodynamically unstable emulsions and as an initiator for polymerization reactions. As will be appreciated, nanoparticle dispersion may be improved by way of combining ultrasound with twin-screw extrusion. Ultrasound energy applied to the polymer-nanoparticle mixture will lead to cavitation, due to a development of a high temperature zone locally. As the bubbles grow, they help in breaking and separating the nanoparticles into the polymer matrix.

Dispersing single layer graphene into a polymer has intrigued researchers for quite some time. Graphene generally is difficult to wet and exhibits a lower adhesion energy compared to graphite and graphene oxide. In order to improve the adhesion and reactivity of graphene for certain applications, graphene sheets may be functionalized on both surfaces. Functionalized graphene is especially useful for bio-sensing applications. In some studies, an effect of fluorination on graphene sheets has been researched. The resulting fluorographene was found to be an insulator, with similar thermal and mechanical behavior as that of graphene.

Solvent dispersion of graphene gained much attention through successful dispersion of graphene in organic solvent N-Methyl-2-pyrrolidone (NMP). In some studies, an effectiveness of different solvents in exfoliation of graphene through sonication has been researched. It has been shown that graphene can be dispersed in water at high concentrations (0.7 mg/ml) by using surfactants (Triton X-100) and a combination of low power and high power sonication. As graphene is hydrophobic, application of a dispersant with hydrophobic and hydrophilic ends will help in stabilizing the dispersion in an aqueous solvent. Strong $\pi$-$\pi$ interaction between the benzene ring in the surfactant (Triton X-100) and the aromatic structure of graphene sheets aid in the dispersion. Aqueous dispersed graphene obtained through a size selective approach (i.e., selecting uniform diameter graphene through centrifuge) appears to be a promising direction for the preparation of polymer nanocomposites. Nevertheless, the cost and complexity of the approach may limit this route for commercial applications.

It has been found that the wetability and work of adhesion of graphene is higher with ethylene glycol (EG) as compared with water. Furthermore, reduced graphene oxide can be well dispersed in ethylene glycol due to a presence of oxygen-containing functional groups. Ethylene glycol being one of the raw materials for the polymerization of PET makes solution dispersion a reasonable route for the development of nanocomposites.

PET Nanocomposites

As stated earlier, PET nanocomposites are being pursued with an intention of improving their properties and expanding to new applications. Currently, other nanomaterials are already being used and dispersed in the polymerization of PET. For example, as shown in FIG. 5, carbon black nanoparticles, having an average diameter 400 nm, are used at 6 ppm, or 0.0006%, for improving the heat absorption capacity of PET. Carbon black dispersion achieved through in-situ polymerization, offers an energy savings even at this low 6 ppm loading. Investigating nanocomposite preparation through the in-situ approach, at a more significant weight fraction may help in understanding the effectiveness of this approach.

High melting temperature and melt viscosity of PET make melt-compounding a relevant technique for the preparation of nanocomposites. As described herein, the addition of graphene to PET has been found to improve the mechanical, barrier, thermal, and conductive properties of PET. It is envisioned, however, that improving the dispersion of graphene and understanding the strengthening mechanisms at high loadings will lead to new applications, such as by way of non-limiting example, strain monitoring, electromagnetic shielding, lightning strike protection, reduced moisture absorption, and the like.

EXPERIMENTAL DETAILS

In some embodiments, commercially available PET of molecular weight $M_w$—84,100 g/mol (0.81 dl/g intrinsic viscosity (I.V.)) may be obtained in the form of pellets. As received, the PET pellets are semi-crystalline, which may be verified by way of differential scanning calorimetry (DSC). As will be appreciated, PET is hygroscopic, and a presence of moisture in the polymer melt will lead to a loss of molecular weight through chain scission (hydrolysis of ester bonds). Therefore, the PET may be advantageously dried for 4-6 hours at 170° C. before each process so as to minimize polymer degradation.

In some embodiments, commercially available graphene may be obtained in the form of graphene nanoplatelets (GNPs), having two different average surface areas. In some embodiments, graphene nanoplatelets (GNPs) with an average diameter of 5 µm, thickness around 6 to 8 nm and an average surface area of 120-150 $m^2/g$, (xGnP®-M-5 grade) may be used in the preparation of nanocomposites. In some embodiments, nanoplatelets with an average diameter of 2 µm, average surface area of 750 $m^2/g$ (xGnP®-C-750 grade) may be used for in-situ polymerization. In some embodiments, the nanoplatelets are initially in a dry agglomerated powder form, wherein each agglomerated platelet comprises several nanoplatelets, as shown in FIG. 6(a)-(b). As will be appreciated, the nanoplatelets generally are not uniform across their lengths and comprise zig-zag edges. FIG. 7 illustrates a chemical structure of the nanoplatelets. The nanoplatelets are comprised of 99.5% carbon with very low oxygen and hydrogen present in the form of carboxyl and hydroxyl groups on the edges. It will be recognized that the carboxyl and hydroxyl groups are formed due to the exposure of raw carbon during the fracture of the platelets. In some embodiments, the nanoplatelets may be prepared by way of a procedure wherein acid intercalated graphite flakes were expanded by way of microwave processing, as described in a Doctor of Philosophy Dissertation, entitled "Graphite Nanoreinforcements in Polymer Nanocomposites," Chemical Engineering and Materials Science, 2003, by H. Fukushima, the entirety of which is hereby incorporated by reference herein.

Preparation of PET-GNP Nanocomposites

In some embodiments, graphene nanoplatelets may be dispersed into the PET matric without forming agglomerates by compounding PET-Graphene master-batches through twin-screw and ultrasound-assisted twin-screw processes. In one embodiment, graphene nanoplatelets (GNPs) and PET resin were compounded into PET-xGnP master-batch pellets using a Krauss Maffei ZE-25 UTX laboratory extruder having co-rotating screws. Two different sets of master-batch pellets at 2%, 5%, 10% and 15% weight fraction were compounded using this process. In each set, 5.4 kgs (12 lbs) of master-batch was prepared for each of the weight fractions.

In some embodiments, ultrasound may be used to assist twin-screw compounding. In one embodiment, PET-graphene nanoplatelets were processed using an ultrasound-assisted twin-screw extrusion system. The PET pellets were dried overnight in oven at 80° C. to remove moisture and then compounded with graphene nanoplatelets at 5% weight fraction. The PET and graphene nanoplatelets were compounded using a co-rotating twin-screw micro-compounder equipped with an ultrasound horn operating at 40 kHz, as shown in FIG. 9. The ultrasound horn was positioned in the barrel region at a distance of 14.5 cm from the die entrance. The vertical position of the horn tip was adjusted such that it is in contact with the polymer melt. A flow rate of 0.9 kg/hr (2 lbs/hr) was maintained throughout the process, with a set screw speed of 200 RPM, resulting in a residence time of 9.2 seconds in the ultrasound treatment zone.

Combined with the baseline composite master-batch, a total of four sets of master-batches were prepared including different ultrasound amplitudes: no ultrasound (0 USM), 3.5 µm (3.5 USM), 5 µm (5 USM), and 7.5 µm (7.5 USM). Further, to understand the effect of ultrasound treatment on PET alone, pure PET (no reinforcement) was also processed under the same conditions. FIG. 8 illustrates sizes and dimensions of several exemplary embodiments of compounded PET-Graphene in pelletized form.

In-Situ Polymerization

In some embodiments, in-situ polymerization may be employed in the preparation of polymer nanocomposites. As will be appreciated, in-situ polymerization generally comprises two steps. The first step comprises intercalating nanoscale reinforcements in the solution phase using compatible polymer precursors or solvents. In the second step, polymerization is undertaken using the nanoplatelet intercalated solution. Dispersing the nanoplatelets into a chemically compatible and low viscosity material is considered to be more efficient compared to direct mixing with highly viscous polymer melt.

Figure 10:
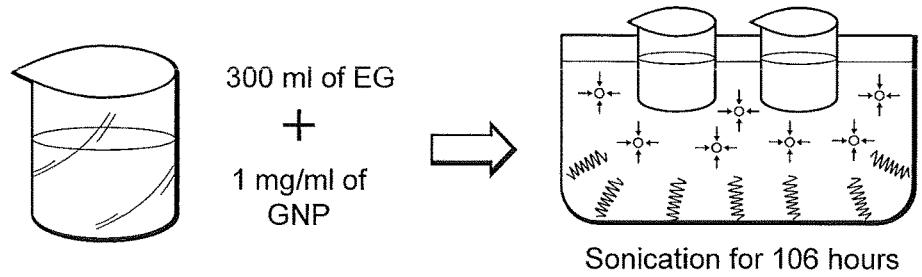
FIG. 10 is a schematic illustrating a process for preparation of ethylene glycol-graphene nanoplatelets in accordance with the present disclosure.

As will be appreciated, since ethylene glycol (EG) is one of the raw materials for the polymerization of PET, EG may be advantageously used as a solvent for dispersing graphene nanoplatelets. In one embodiment, EG of reagent grade, having a 99% purity, was used as a solvent for dispersing graphene nanoplatelets. Graphene nanoplatelets were added to the EG at a concentration of 1 mg/ml (i.e., 0.1% weight fraction) and sonicated using a 40 kHz bath sonicator. EG-GNP solutions were sonicated for 106 hours so as to ensure a homogenous dispersion, as depicted in FIG. 10. During the sonication process, solution beakers were covered with aluminum foil to prevent exposure to atmospheric oxygen. Dispersions were prepared using both low (120 m2/g) and high (750 m2/g) surface area graphene nanoplatelets.

In one embodiment, in-situ polymerization of graphene nanoplatelets dispersed in ethylene glycol and dimethyl terephthalate was attempted using a 1 kg polymerization reactor. PET polymerization was performed through a two-step reaction. The first step is an ester interchange reaction (EI), wherein the monomer is formed. In the second step, the polymer is formed through a polycondensation reaction (PC). Experimental setups used along with the undergoing reaction at each step are described below.

Figure 11:
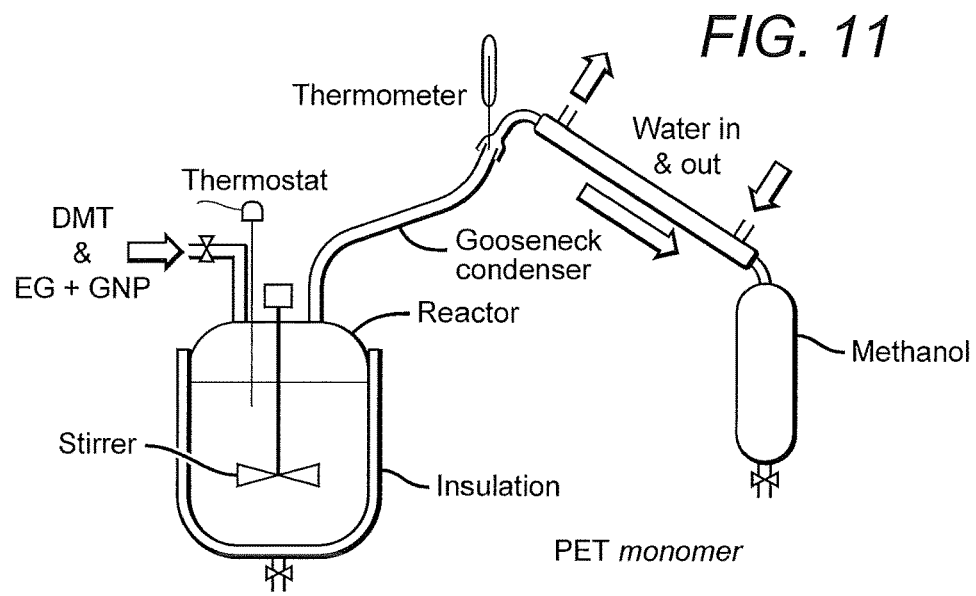
FIG. 11 is a schematic illustrating a reactor setup for an ester interchange step, according to the present disclosure.
Figure 12:
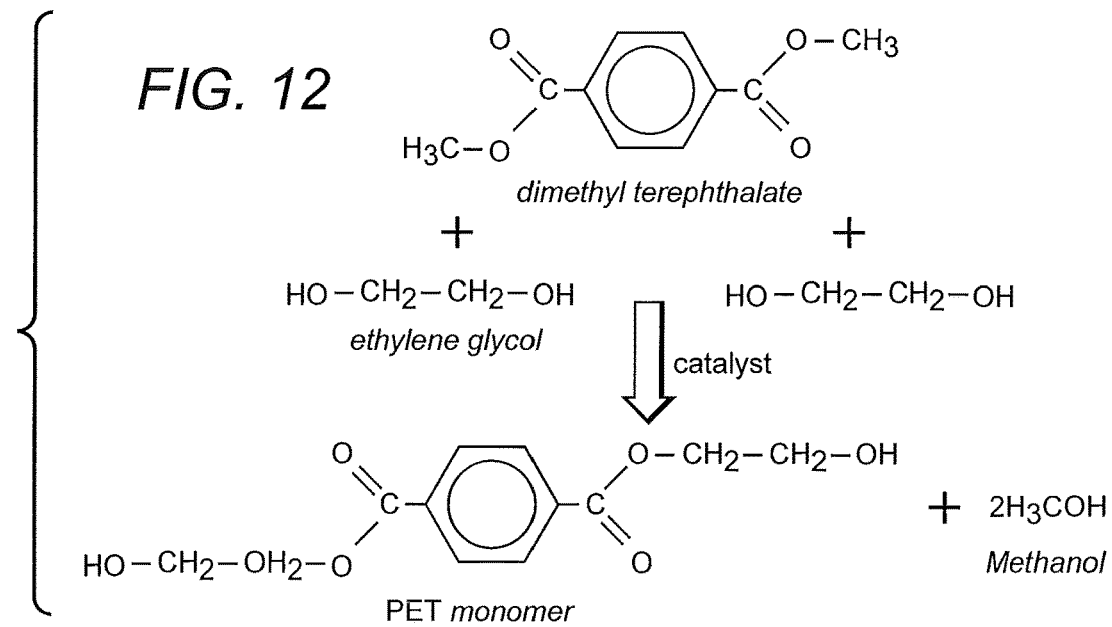
FIG. 12 is a chemical formula illustrating an ester interchange reaction between dimethyl terephthalate (DMT) and ethylene glycol (EG) to form the PET monomer in accordance with the present disclosure.

FIG. 11 is a schematic illustrating an exemplary embodiment of a reactor and methanol collection setup for performing the ester interchange reaction. In the embodiment illustrated in FIG. 11, powdered dimethyl terephthalate (DMT) was used for the polymerization. EG with dispersed GNPs and the powdered DMT were charged into the reactor under nitrogen purge at a 2.3:1 moles ratio, with an excess of EG. The catalysts for the ester interchange reaction, manganese acetate (Mn(CH3COO)2), and for the polycondensation reaction, antimony trioxide (Sb2O3), were added to the batch at 82 ppm and 300 ppm respectively, and heated to 175° C. under constant stirring. As the batch temperature approached about 170° C., methanol collection began indicating that the ester interchange reaction had started and then the nitrogen purge was closed. There onwards the batch temperature was increased in steps of 15° C. until the temperature reached 235° C. As the reaction progressed, the temperature within the gooseneck condenser increased from room temperature to above 60° C. Once the methanol collection reached the theoretical yield, 300 ml in this case, and the gooseneck condenser temperature dropped to below 60° C., the ester interchange was considered finished. The gooseneck condenser was removed and polyphosphoric acid (H3PO4) was added at 38 ppm to the batch so as to terminate the ester interchange reaction. FIG. 12 illustrates a formation of ester interchange through the ester interchange between DMT and EG. The entire ester interchange reaction took around 3 hours to finish.

FIG. 13 is a schematic illustrating an exemplary embodiment of a reactor and an excess EG collection condenser setup for performing the polycondensation reaction. During the polycondensation reaction, the reactor temperature was increased to 285° C. and maintained under vacuum (30 in Hg) until PET of a desired viscosity was obtained. Isophthalic acid (C6H4(COH)2) and stabilized cobalt were added at 20 grams and 65 ppm, respectively, to the batch at a beginning of the polycondensation reaction. It will be appreciated that isophthalic acid limits the crystallinity of PET, thus making the PET easier to process. The stabilized cobalt was added so as to control a final color of the PET. As illustrated in FIG. 14, during the polycondensation reaction, the molecular weight of PET increases and EG is released. During the polycondensation reaction, released EG was collected in a round flask and solidified using dry ice so as to prevent the EG from flowing into a vacuum pump. As will be appreciated, a change in the viscosity of the batch with increasing PET chain length will affect the stirring current. Thus, as the reaction progressed, an electric current passed to the stirrer was monitored for change at 15-minute intervals. Once no change in the electric current passed to the stirrer was detected at two consecutive readings, the reaction was stopped by cutting the vacuum. The resultant polymer melt was then extruded from an opening at the bottom of the reactor into an ice water bath and pelletized using a strand chopper. FIG. 14(a) illustrates reaction times and yields for three batch polymerizations, including one control batch without graphene nanoplatelets that were performed by way of the setups illustrated in FIGS. 11 and 13.

Injection Molding of Nanocomposites

In some embodiments, nanocomposite master-batches may be injection-molded to different final nanoplatelet loading fractions so as to facilitate investigating their microstructural, mechanical and thermal characteristics. In one embodiment, three different injection molding presses were used, comprising an oil cooled molder, a water cooled molder, and a micro injection molder. PET-graphene nanoplatelet master-batches obtained from the compounding processes, described above, were used for molding nanocomposites at different loading fractions. The oil cooled injection molding unit was used for molding nanocomposites at 2%, 5%, 10% and 15% GNP weight fractions from master-batches (compounded pellets were injection molded with no dilution of graphene concentration using pure PET). Tensile bars were molded with barrel temperatures in the range of 260° C. to 280° C. A standard tensile bar mold, following ASTM D 638 type I specifications, was used.

Signs of crystallization, indicated by an opaque core, were observed in the injection molded PET, due to a slow rate of cooling. In another embodiment, a HyPET 90 RS45/38 injection molding system which is designed for PET was utilized. Injection molding was performed offsite at a Niagara Bottling LLC, facility in Ontario, Calif. The HyPET 90 RS45/38 injection molding system has a 90 ton clamping force and comprises a 38 mm screw diameter and a chilled water cooled mold. This enables processing of PET at higher cooling rates so as to retain the amorphous microstructure.

Figure 15:
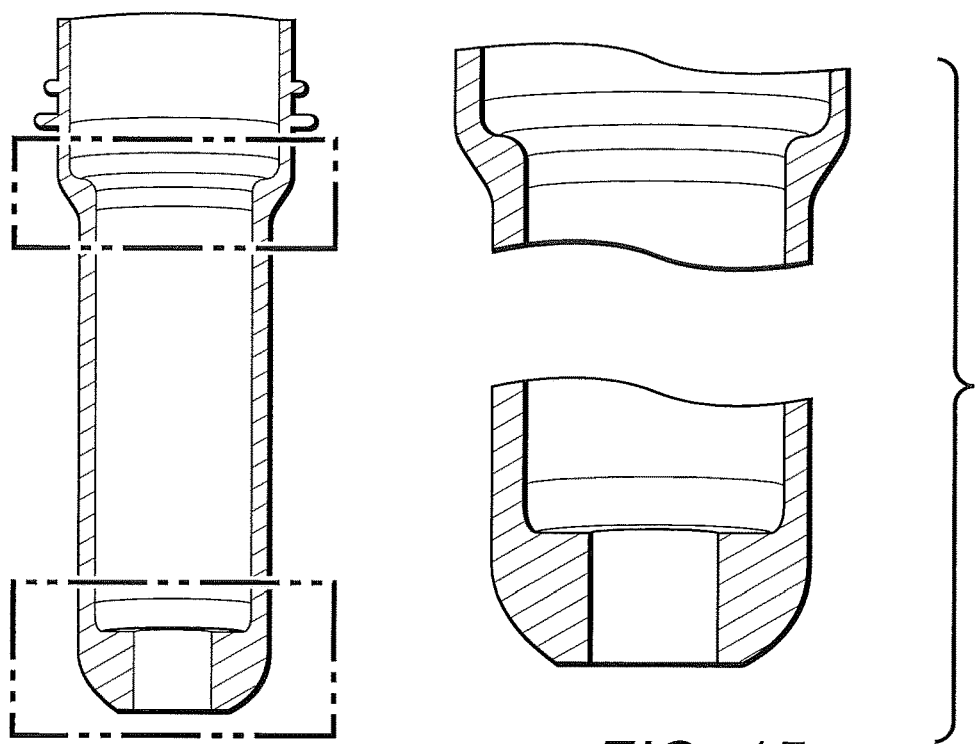
FIG. 15 is a cross-sectional view illustrating an injection molding compatible tensile specimen, according to the present disclosure.

Moreover, a custom mold was developed so as to keep the injection molding of the nanocomposite similar to industry standard for processing PET. A tube specimen prepared using the custom mold, shown in FIG. 15, is designed for ease of mechanical testing. As shown in FIG. 15, the tube specimen comprises a large gauge length with a uniform cross-section. Thus, the custom mold makes parts comprising a relevant size and processing window (i.e., injection pressures and cycle times) that are typical of industrial scale parts.

Figure 16A:
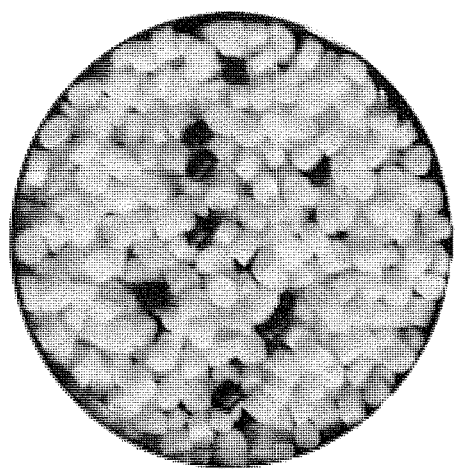
FIG. 16(a) illustrates a PET and master-batch pellet mixture from feed throat 0.6% loading from Set B processing, according to the present disclosure.
Figure 16B:
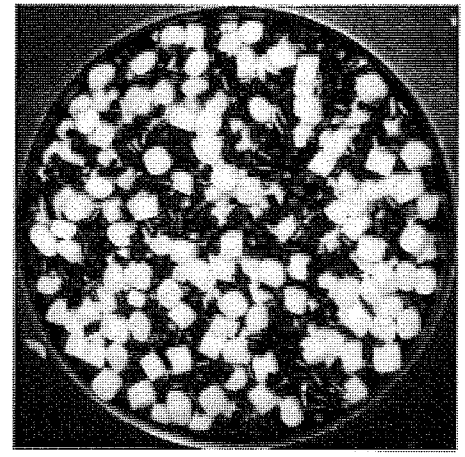
FIG. 16(b) illustrates a PET and master-batch pellet mixture for 0 USM ultrasound treated batch in accordance with the present disclosure.

Using the nanocomposite pellets obtained from the aforementioned methods, samples for mechanical testing were injection molded at different GNP concentrations. For the purpose of testing nanocomposites with low GNP weight fractions, the master-batch was diluted by mixing with PET and injection molded into nanocomposites with as low as 0.5% weight fraction. Final weight fractions of the nanocomposites were verified by measuring the percentage of pellets in the images collected from feed throat, as shown in FIGS. 16(a)-(b). Upon using the dimensions of the pellets, as listed in FIG. 8, the actual weight fractions were calculated. Nanocomposites from each process run were collected for characterization studies, after the process was stabilized. Stabilization occurs when injection pressures and cycle time are steady for more than 10 min. FIG. 16(c) presents the injection molded nanocomposite weight fractions associated with each master-batch.

Process Optimization

Polymer processing through injection molding is dependent on several variables, including barrel temperatures, injection pressure, hold and back pressures, fill time, cooling time, and the like. As will be appreciated, balancing all of these variables is necessary to have a part free of crystallinity and defects, such as voids. At the start of each process run, the barrel was flushed with baseline material to remove any residual material from previous tests. It will be recognized that flushing within baseline material enables starting the processing with known conditions and optimizing them as the PET-master-batch mixture occupies the barrel.

Figure 17A:
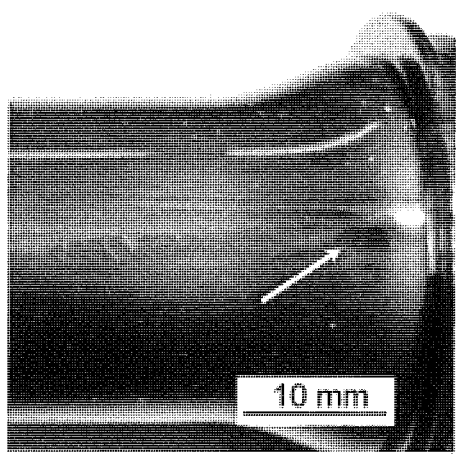
FIG. 17 illustrates visual signs of poor mixing, as observed for 0.5% GNP nanocomposites, in accordance with the present disclosure.
Figure 17B:
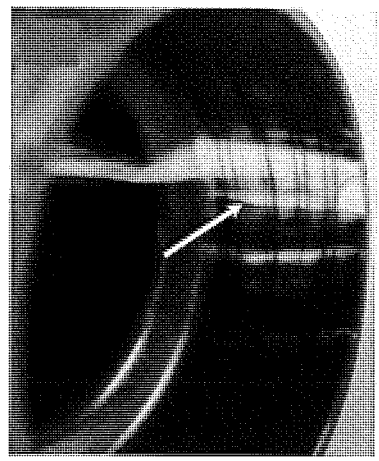

The addition of graphene nanoplatelets affects the melt viscosity of PET, and this will reflect on fill pressures. It was observed that a maximum fill pressure decreased when processing the ultrasound master-batch, as shown in FIG. 16(d), while a hold pressure was the same. As will be appreciated, the hold pressure is important for keeping the mold closed while the material solidifies. Another important process variable is back pressure, which helps homogenize the material and remove voids from the melt. Effectiveness of the process, mixing of PET, and the master-batch inside the barrel can be checked through visual inspection. For samples with lower GNP weight fraction, visual signs of poor mixing include dark spots, marks, and flow streaks, as shown in FIG. 17.

Micro-Injection Molding

Figure 18A:
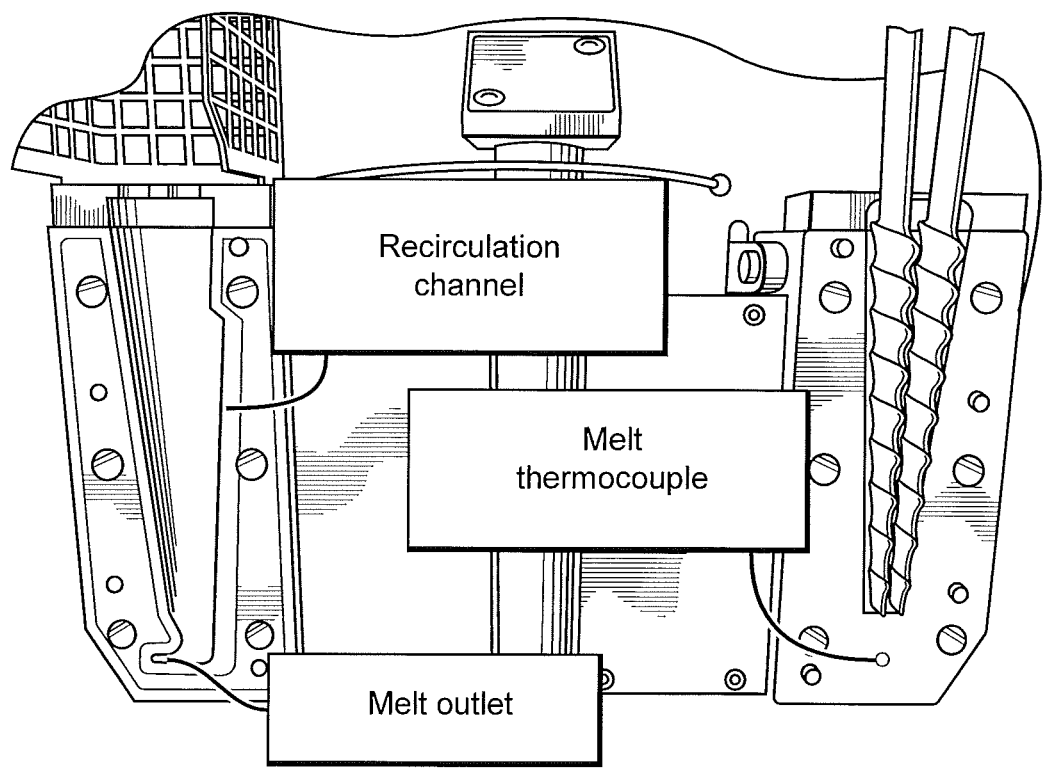
FIG. 18(a) illustrates a micro-compounder with co-rotating twin screws, in accordance with the present disclosure.
Figure 18B:
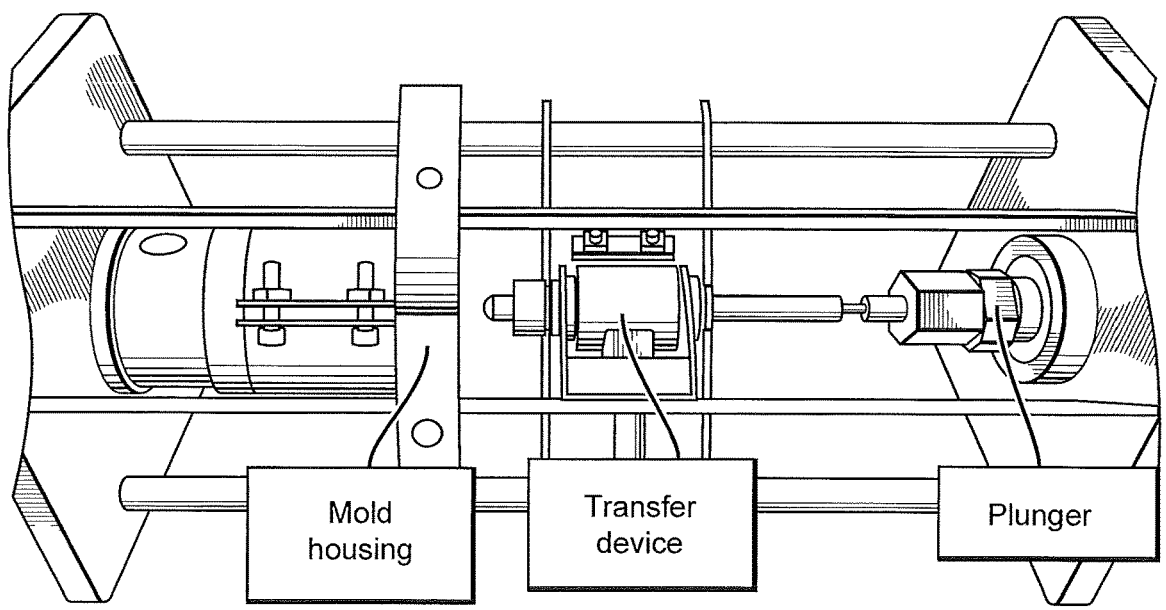
FIG. 18(b) illustrates a micro-injection molding system and transfer device, in accordance with the present disclosure.

In some embodiments, tensile samples may be prepare using a micro-injection system for the purpose of inspecting the effect of ultrasound treatment on PET mechanical properties and evaluating the improvement from graphene dispersion through ultrasound without dilution. In one embodiment, the tensile samples were prepared using a 5.5 cc capacity micro-injection molding unit in combination with a 5 cc micro compounding unit, as shown in FIGS. 18(a)-(b). The micro-injection molding unit of FIGS. 18(a)-(b), comprising a mold shown in FIG. 19(a), was used for the preparation of tensile bars shown in FIG. 19(b). The micro-compounder unit equipped with a co-rotating twin screw was used to melt the pellets and provide a homogenous melt mixture, as described herein. A transfer device shown in FIG. 18(b), was used to transfer the polymer or the nanocomposite melt from the compounder to the injection molder. The injection molder injected the polymer material into a conical mold by way of a plunger connected to high pressure air (13.8 bar). As will be recognized, the micro-injection system provides control of the mold temperature, injection pressure, hold pressure, injection time, and hold time.

Figure 19A:
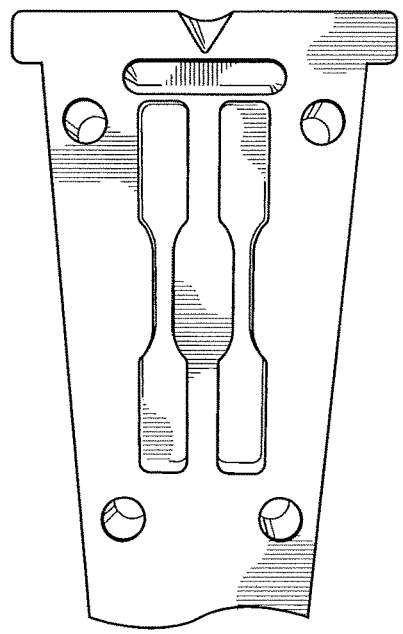
FIG. 19(a) illustrates a dual dog bone mold used for making tensile samples in accordance with the present disclosure.
Figure 19B:
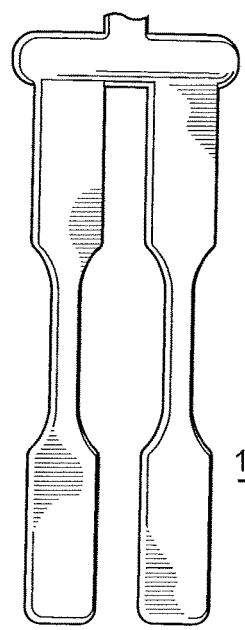
FIG. 19(b) illustrates molded PET tensile bars, according to the present disclosure.

In one embodiment, a dual dog bone mold, shown in FIG. 19(a), was designed according to the ASTM D 638 Type V specimen L/D ratio for the gauge section, with a fill volume of 2.1 cc. During the compounding process, the material was heated to 270° C. and homogenized by opening a recirculation valve for 1 min, after which the melt was collected into the transfer device. The tensile bars were made using an aluminum mold at room temperature. The relatively large volume of the aluminum mold acts as a heat sink and allowed for cooling of the polymer melt during injection. FIG. 19(c) lists the injection process parameters used for making the PET nanocomposite tensile bars.

In total, five different material sets, comprising PET control, ultrasound treated PET, nanocomposites pellets with 5% GNP weight fraction from twin-screw mixing, ultrasound assisted twin-screw mixing, and materials from in-situ polymerization, were processed using the micro-compounding system, and tensile bars were obtained for mechanical testing. In the case of nanocomposites, different mixing time periods were also investigated to understand the effect of mixing time on the nanocomposite properties. All the materials were dried in small quantities (30 grams) at 170° C. for 2 hours in an oven before processing so as to avoid degradation due to the presence of moisture, or a drop in viscosity due to over-drying.

Characterization of Nanocomposites

Comparison of the densities between the injection molded nanocomposites will help in identifying the difference in the samples due to process defects (e.g., voids). Relative densities can be determined based on Archimedes' principle, using the following equation:

$$\rho = \frac{m}{m - \overline{m}} \rho_0 \qquad (1)$$

Where, m is the mass of the sample in air, $\overline{m}$ is the mass of the sample in liquid medium, and $\rho_0$ is the density of the medium used (i.e., water).

Amorphous PET has a density of 1335 kg/m³. PET a semi-crystalline polymer, exhibits a range of densities based on crystallinity. The theoretical density of the amorphous nanocomposite can be calculated using the relative density of PET (1335 kg/m³) and GNPs (2200 kg/m³). Crystallinity of the control (PET) and nanocomposite samples can be evaluated using the equation given below.

$$X_c = \left(\frac{\rho_c}{\rho_{sample}}\right)\left(\frac{\rho_{sample} - \rho_a}{\rho_c - \rho_a}\right) \qquad (2)$$

Where, $X_c$ is the crystallinity of the sample, $\rho_a$ is the density for amorphous PET, $\rho_c$ is the density for crystalline PET (1455 kg/m³), and $\rho_{sample}$ is the density of the composite.

PET is known to undergo chain scission under high shear at melt temperatures. Further, the effects of ultrasound treatment on PET have not been previously investigated. Therefore, to evaluate the change in molecular weight of the ultrasound treated PET and PET nanocomposite, Gel Permeation Chromatography (GPC) was performed. Hexafluoroisopropanol (HFIP) was used as a solvent for dissolving PET at room temperature. For the composite pellets, the nanoplatelets were filtered out after the polymer was dissolved. GPC measurements were performed at Auriga Polymers. Polymer dissolved in the solvent (5 mg/ml) was pumped at a constant flow rate through a GPC column with specific pore sizes. The time taken by the polymer molecules in a swollen state to pass through the column (retention time) is based on the size of the molecules. While the polymer solution passes through the column, the elution volume for the different fractions (same molecular weight), identified using a refractive index detector, was recorded. Comparing this elution volume against Polystyrene standards of known molecular weight, the average molecular weight for PET samples was obtained.

Intrinsic viscosity (I.V.) of PET and ultrasound treated PET pellets was measured at the Auriga Polymer facility, using their proprietary solvents that were calibrated with respect to the solvents recommended in ASTM D4603 standard. After dissolving the polymer pellets in solvent, that solution was passed through a glass capillary viscometer and the flow time for the solution as it drops from the higher to lower calibration mark (as shown in FIG. 20) was recorded. The ratio of the average flow times for solution to the solvent gave the relative viscosity ($\eta_r$) of the polymer. Intrinsic viscosity of the polymer was calculated using the following equations:

$$\eta_r = t/t_0 \quad (3)$$

$$\eta = 0.25(\eta_r - 1 + 3 \ln \eta_r)/C \quad (4)$$

Where, $\eta_r$ is the relative viscosity, t is the average solution flow time (s), $t_0$ is the average solvent flow time (s), $\eta$ is the intrinsic viscosity (dL/g), and C is the polymer solution concentration (g/dL).

Using the intrinsic viscosity (I.V.) data obtained by the abovementioned procedure and weight average molecular weight data from the GPC technique, Mark-Houwink parameters for relating PET I.V. to $M_w$ were refined and used to calculate the viscosities for ultrasound treated nanocomposites:

$$[\eta] = KM^a \quad (5)$$

Where, $\eta$ is polymer intrinsic viscosity (dL/g), M is the average molecular weight (g/mol), 'K' and 'a' are Mark-Houwink constants. While using weight average molecular weight, 'K' and 'a' are respectively taken as 0.00047 and 0.68.

Figure 21D:
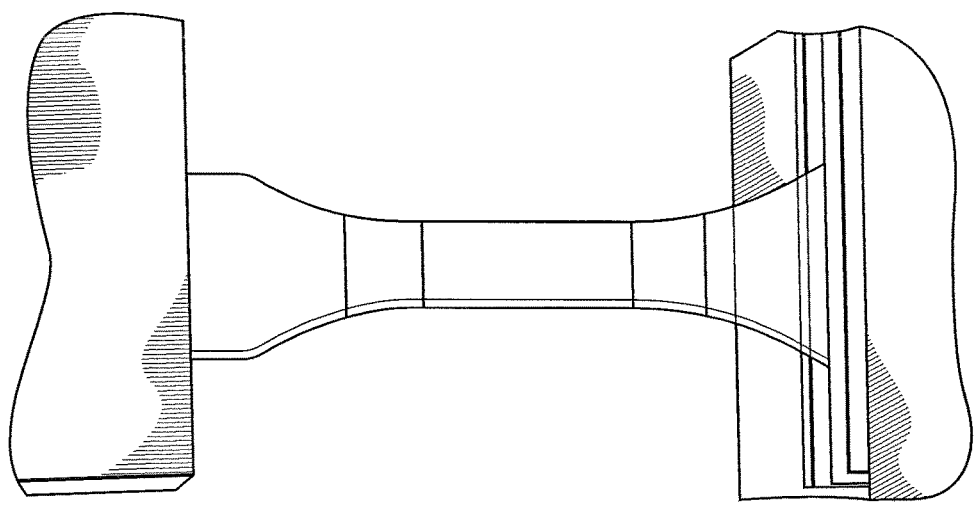
FIG. 21(d) illustrates testing of tensile bar from a micro-injection molding system, in accordance with the present disclosure.
Figure 21C:
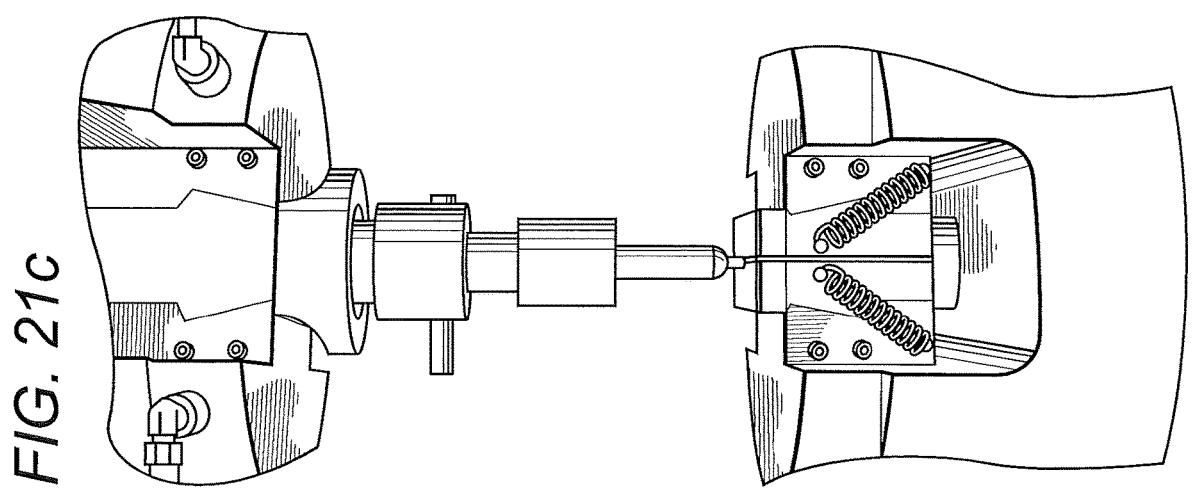
FIG. 21(c) illustrates tube testing, according to the present disclosure.
Figure 21B:
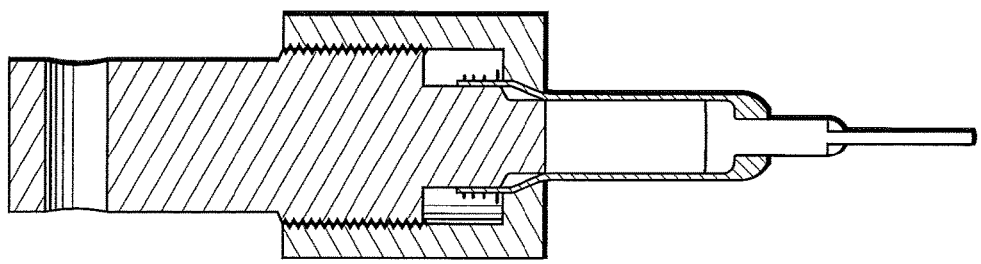
FIG. 21(b) illustrates a tube testing fixture, according to the present disclosure.

Nanocomposite samples with two different geometries were obtained from the injection molding process: tensile bars and tensile tubes. Both the geometries, tensile bars and tubes were tested using a universal materials tester at a cross-head speed of 5 mm/min, following the ASTM D 638 standard. A non-contact laser extensometer was used for recording strain. The laser extensometer records the displacement based on the reflections from self-reflective tape, used to mark the gauge length on the test samples, as shown in FIG. 21(a). Strain values from the laser extensometer and load from the load cell were simultaneously recorded at an interval of 100 ms. For the purpose of testing the nanocomposite tubes, a custom fixture shown in FIGS. 21(b)-21(d), was used. A minimum of 5 samples were tested for each process condition.

Differential scanning calorimetry (DSC) of the PET and nanocomposite samples was performed to understand the effect of graphene on thermal properties (glass transition, crystallization and melt temperatures) of PET. Thermographs of nanocomposites were acquired using a differential scanning calorimeter. Nanocomposite samples were heated from ambient temperature to 300° C. at 10° C./min and held at 300° C. for 1 min (first heating cycle), then cooled to 25° C. at 10° C./min and held at 25° C. for 1 min (first cooling cycle), and then finally reheated to 300° C. at 10° C./min (second heating cycle) under a nitrogen atmosphere. Ultrasound treated PET pellets were also analyzed for a change in thermal properties.

From the first heating cycle, melting parameters (temperature, heat of fusion) and heat of crystallization were obtained for determining the crystallinity ($X_c$). Melt crystallization temperature ($T_c$) and on-set temperature ($T_{on}$) were obtained from the first cooling cycle, to determine the crystallization half-time ($t_{1/2}$). Crystallinity can be calculated using the below equation:

$$X_c = \left[\frac{\Delta H_f - \Delta H_{cc}}{\Delta H_c^0}\right]\left(\frac{1}{1-w_f}\right) \times 100 \quad (6)$$

Where, $\Delta H_f$ is the heat of fusion, $\Delta H_{cc}$ is the heat of crystallization (cold crystallization), $\Delta H_c^0$ is the heat of fusion for 100% crystalline polymer, for PET—140.1 J/g, and $w_f$ is the weight fraction of the reinforcement phase in the nanocomposites.

Crystallization half-time was determined using the following equation:

$$t_{1/2} = \frac{(T_{on} - T_c)}{X} \quad (7)$$

Where, $T_{on}$ is the crystallization on-set temperature, $T_c$ is the crystallization temperature, and X is the rate of cooling (here, 10° C./min).

Figure 22:
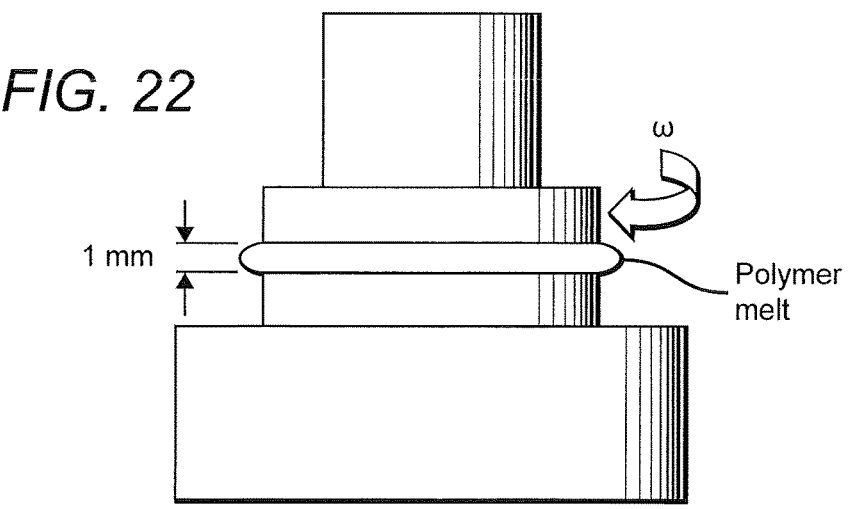
FIG. 22 is a schematic illustrating a parallel plate geometry and a polymer melt in accordance with the present disclosure.

Polymer flow behavior is known to be affected by the addition of reinforcements (micro or nano). Studying the flow properties of the nanocomposites is useful for their processing. Melt rheology was studied to understand the effect of graphene on the flow properties of PET. Rheographs for nanocomposite pellets were acquired using a rotational Rheometer, equipped with a 25 mm diameter parallel plate geometry and electronically controlled heating. Samples were dried in an oven at 170° C. for 12 hours to eliminate moisture. PET and nanocomposite pellets placed between parallel plates were melt-pressed to 1 mm thickness (as shown in FIG. 22) at 260° C., under $N_2$ atmosphere. The linear viscoelastic region (region where material response is independent of the deformation amplitude) of the samples was determined by running a strain sweep at a 1 Hz frequency. Dynamic frequency sweeps from 100 rad/s to 0.1 rad/s were acquired for all the samples at 1% strain rate, within the linear viscoelastic region for PET.

Dispersion of nanoparticles into the polymer matrix increases polymer chain entanglements through polymer-polymer and polymer-reinforcement interactions. An increase in entanglements stiffens the polymer and exhibits a solid like (rigid) deformation behavior, which is independent of the test frequency. Transition of the nanocomposite to a rigid behavior occurs at a critical weight fraction (percolation threshold), when a connecting network of the reinforcement is formed. Dynamic frequency sweeps of moduli provides information from both the polymer and reinforcement phase. Where the high frequency moduli are dominated by the polymer matrix and the low frequency response of the material is dominated by the reinforcement. Therefore, the percolation volume fraction can be obtained based on the low frequency moduli of the nanocomposite. The average aspect ratio of the reinforcement at the percolation volume fraction can be determined using the following equation.

$$A_f = \frac{3\phi_{sphere}}{2\phi_{per}} \quad (8)$$

Where, $\phi_{sphere}$ is the percolation volume fraction for randomly packed overlapping spheres (here, taken to be 0.30) and $\phi_{per}$ is the percolation volume fraction for the nanocomposite.

Raman spectroscopy is the most widely used technique for characterizing the quality of graphene. For nanocomposites, several studies have reported the application of Raman spectroscopy for characterizing the interaction between a polymer-graphene system and the quality of graphene. A characteristic Raman spectrum of single layer graphene will have peaks near 1580 cm$^{-1}$ (G-band) corresponding to the C—C stretching of sp$^2$ carbon materials and near 2680 cm$^{-1}$ (G'-band), is the corresponding higher order mode. The presence of defects in graphene can give rise to a different Raman peak near 1350 cm$^{-1}$ (D-band), which is useful in analyzing the quality of graphene. In the case of multi-layer graphene, number of layers up to n=7 for multi-layer graphene can be estimated based on the intensity of G-band (~1580 cm$^{-1}$) and the shape of 2D-band or G'-band (~2680 cm$^{-1}$) can be used to identify up to n=4 layers. In the current work, Raman spectroscopy was used to evaluate the dispersion of graphene nanoplatelets and also to ascertain the π-π interactions between graphene layers and the phenyl ring in the PET molecular chain. Interaction of PET phenyl ring with graphene is found to show a shift in the Raman band related to C—C stretching (1617 cm$^{-1}$) of the phenyl ring.

Raman spectrum for PET and PET-GNP nanocomposites were collected using a 532 nm (green light) laser excitation, at 2 mW laser power, with a 20 μm spot size. Change in the C—C (1617 cm$^{-1}$) band position was evaluated by doing an individual peak fit (Gaussian fit) on the spectra collected for each GNP weight fraction.

Microstructure Analysis

As will be appreciated, imaging nanocomposites is imperative to understand the role of nanoparticles in improving polymer properties. Nanoreinforcements are considered advantageous because of the large extent of interactions possible with the polymer matrix. Thus, it is necessary to visualize the extent of interactions, which depend on the level of dispersion. In addition, the actual microstructural information is beneficial to model the behavior of nanocomposites and help in engineering materials. Electron microscopy and X-Ray diffraction are the most common techniques used for studying dispersion. Both of these techniques are often used in support of each other.

Graphene nanoplatelets inside the PET matrix were imaged by scanning electron microscopy (SEM). SEM micrographs of the fracture surfaces of the PET, and PET-GNP nanocomposites were obtained. PET control and the nanocomposites with lower graphene content (up to 2%) were Au/Pt coated using a Balzers Union MED 010 coater.

Nanocomposite tensile bars were imaged with ultrasound to evaluate the presence of process defects (e.g. voids). Ultrasound 'Bulk Scans' for the nanocomposites were acquired using an acoustic microscope. Scanning was done at an ultrasound frequency of 30 MHz, with 0.5" focal length and a spot size of 122 μm. During the scanning process a liquid medium, such as water, was used between the probe and sample, to maximize the ultrasound transmission. Ultrasound micrographs were recorded at a pixel pitch of 84 μm.

To analyze the exfoliation of graphene nanoplatelets, transmission electron microscopy (TEM) was performed. Nanocomposite thin sections (thickness of 70 nm) for 5% and 15% GNP weight fraction tensile bars were microtomed and imaged under a transmission electron microscope at an operating voltage of 200 kV. The difference in electron densities between PET and GNP provided a contrast in transmission electron micrographs. Due to the higher density of graphene nanoplatelets compared to PET, they can be recognized as the darker regions in the micrographs. Nanoplatelet parameters, thickness and length (diameter) were obtained, by measuring the number of pixels after calibrating the transmission electron micrographs.

Transmission electron micrographs provide 2D dimensions of the nanoplatelets. However, this information alone is not sufficient to quantify their distribution in the polymer matrix. An 'interparticle distance ($\lambda_d$)' parameter may be used to quantify the exfoliation of platelets, based on the information from TEM micrographs. Developed based on the stereological relations for relating the information from a 2D slice to 3D, interparticle distance is the average distance measured between particles in a straight line. Using the binarized TEM micrographs, the interparticle distance ($\lambda_d$) was determined based on Eq. (9), given below. Interfacial area per unit volume $(S_V)_{P-G}$ can be obtained by measuring the combined perimeter of the nanoplatelets present per unit area of the micrograph.

$$\lambda_d = \frac{4(1 - V_V)}{(S_V)_{P-G}} \quad (9)$$

$$S_V = 4L_A/\pi \quad (10)$$

Where, $V_V$ is the volume fraction of the nanoplatelets, $(S_V)_{P-G}$ is the polymer-nanoplatelet interfacial area per unit volume of specimen, and $L_A$ is the total perimeter of the platelets per unit area of the 2D micrograph.

Considering the nanoplatelets are disk shaped, with known thickness (t) and aspect ratio ($A_f$) dispersed in the polymer, theoretical interparticle distance can be estimated using the following equation, which may be obtained way of Eqs. (9) and (10):

$$t = \lambda_d V_V (A_f + 2)/[2(1 - V_V)A_f] \quad (11)$$

Where, $V_V$ is the volume fraction of the nanoplatelets, $A_f$ is the nanoplatelet aspect ratio, t is the nanoplatelet thickness, and $\lambda_d$ is the interparticle distance. X-ray diffraction helps in understanding the dispersion state of nanoplatelets within the polymer matrix, by measuring the spacing between them. Single layer graphene has a two-dimensional (2D) hexagonal lattice. Graphene nanoplatelets with a 3D structure similar to graphite, exhibit "Graphene-2H" characteristic reflections corresponding to the (002) and (004) planes (26.6° and 54.7° 2θ for Cu $K_\alpha$ X-rays). PET with a triclinic crystal structure, primarily exhibits reflections corresponding to the (010), (110), (100), and (105) (17.5°, 22.5°, 25.6°, and 42.6° 2θ for Cu $K_\alpha$ X-rays) planes [48]. Amorphous PET exhibits a broad halo at about 20° 2θ.

Diffraction patterns of the nanocomposites were collected using a 2D detector and micro diffraction and a 0.5 mm collimator in reflectance for crystallinity measurements. Cu $K_\alpha$ X-ray radiation (μ=1.54184 Å) was used with a scan time of 60 sec. Percent crystallinity can be determined based on the amorphous and crystalline fractions using Eq. (11):

$$X_c\% = \frac{A_c}{A_a + A_c} \times 100\% \quad (12)$$

Where, $A_c$ is the crystalline contribution and $A_a$ is the amorphous contribution.

Figure 23:
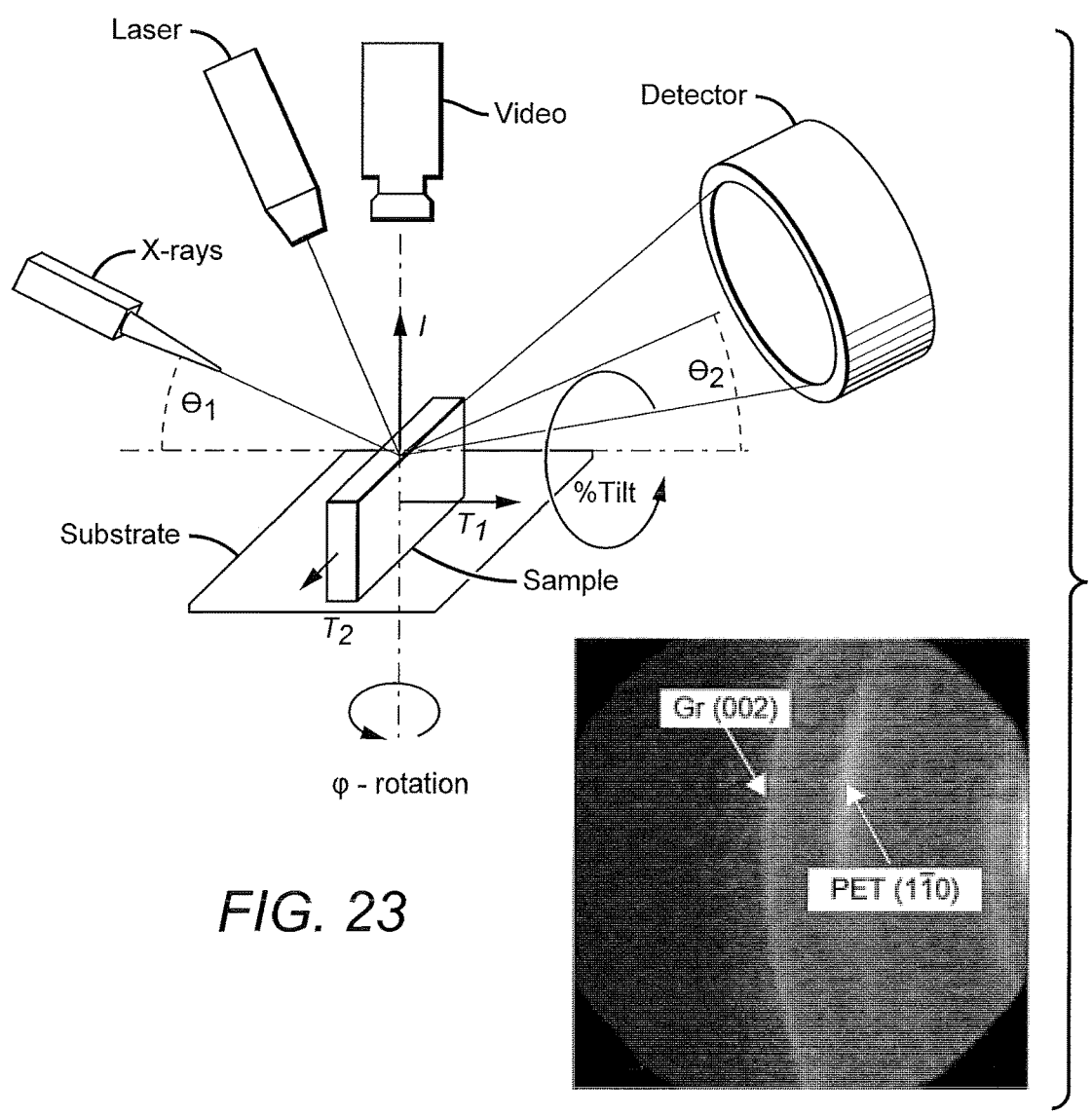
FIG. 23 is a schematic illustrating a sample geometry with respect to an instrument geometry, accompanied by a 2D X-ray diffraction frame, according to the present disclosure.
Figure 24:
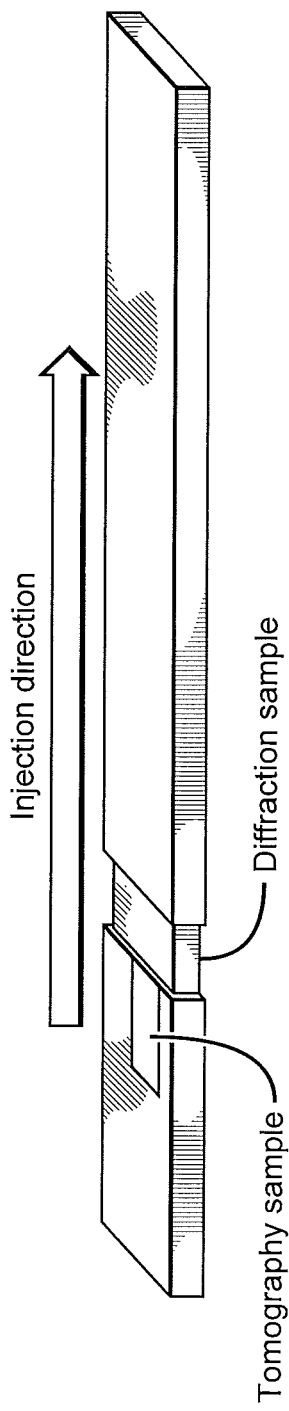
FIG. 24 illustrates a location of samples collected for nano-tomography and diffraction analysis, according to the present disclosure.

Sample geometry (I—injection flow direction, $T_1$—longer dimension of the cross-section, and $T_2$—thickness) with respect to the instrument geometry is shown in FIG. 23. A 2-D diffraction frame showing the partial diffraction rings for PET and graphene, indicating the presence of preferential orientation is shown in FIG. 23. Location of the nanocomposite samples used for diffraction and tomography are shown in FIG. 24.

As will be recognized, electron microscopy provides only two-dimensional microstructure information of the sample from a small area. In case of TEM the sample size is only 500 μm×500 μm in area and 70 nm in thickness. Electron microscopy combined with focused ion beam (FIB) can be useful in attaining microstructure information along the third direction. Nevertheless, X-rays have certain advantages over electrons, in imaging materials. Simplicity with sample preparation, choice of ambient or in-situ environments, and less induced damage to the material are the major advantages. X-ray tomography is a non-destructive imaging technique that allows regenerating the 3D structural details of materials.

Figure 25:
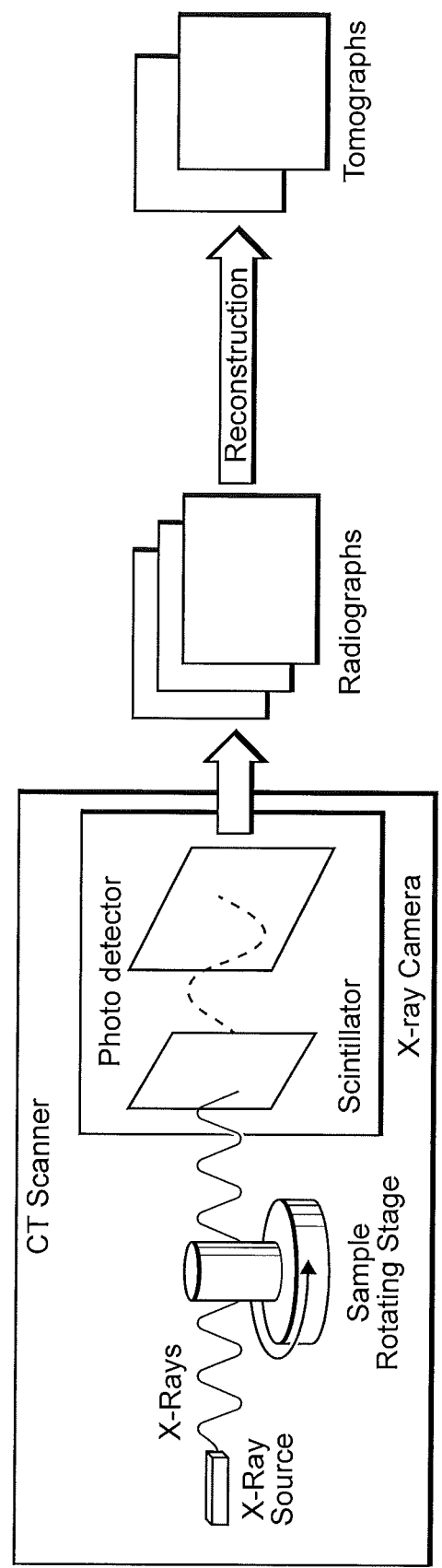
FIG. 25 is a schematic illustrating a CT scanner and a process for X-ray computed tomography in accordance with the present disclosure.

Tomography is the process of collecting cross-sectional information either in transmission or reflection mode, from an illuminated object. Material and geometry information is recorded (radiograph) based on the transmitted intensity of the X-rays, as illustrated in FIG. 25. This transmitted intensity can be related to the material information based on the material's X-ray absorption coefficient and density, according to the following equation:

$$I = I_0 e^{-\mu_m \rho x} \quad (13)$$

Where, I is the transmitted X-ray intensity, $I_0$ is the initial X-ray intensity, $\mu_m$ is mass attenuation coefficient of the material, $\rho$ is the material density, and x is the material thickness. Radiographs are reconstructed into cross-sectional slices (tomographs) using Fourier transform based algorithms. Developments in the field of X-ray and detector optics have allowed focusing the beam on a much smaller area, thereby attaining nanoscale resolution.

In the current work, X-ray nanotomography was attempted on two different samples (nanocomposite tensile bar and tensile tube) with the objective of understanding nanoplatelet distribution in three-dimensions. Nanotomography of the sample collected from 15% tensile bar was performed on a SkyScan 2011 nano-CT instrument at 272 nm/pixel resolution. For the tensile tube sample of 2% weight fraction (ultrasound processed), wedge sections from the inner and outer surfaces were scanned on an Xradia 800 Ultra 3D X-ray Microscope at 150 nm/pixel resolution. Reconstructed tomographs were visualized using 3D visualization software.

Micromechanical Modeling of Nanocomposites

Continuous fiber composites are often designed or assessed based on a simple empirical formula, referred to as the "Rule of Mixtures". In the case of nanoreinforcements, the Rule of Mixtures poorly predicts the final properties. Along with the fact that these are not continuous fiber reinforcements, the differences are influenced by the low volume fractions, significant disparity of properties between the matrix and reinforcement, and aspect ratio. For nanocomposites, the spatial interaction between the nanoplatelets and matrix is important in determining their elastic behavior. High aspect ratios of the nanoplatelets combined with interactions at the matrix-reinforcement interface complicate nanocomposite property estimation. Therefore, traditional micromechanical models have been modified to estimate the mechanical properties for nanoparticles.

With the objective of understanding the effectiveness of graphene nanoplatelets as reinforcement, micromechanical models such as the Halpin-Tsai and the Hui-Shia models were used to determine the theoretical elastic mechanical performance of the PET-GNP nanocomposites. These models were simplified micromechanical relations of continuum based Mori-Tanaka and Hill's methods for predicting composite properties, both of which models being designed for unidirectional composites. Aspect ratio of the nanoplatelets dispersed into the polymer can be determined from the transmission electron micrographs. In the Halpin-Tsai model, the longitudinal modulus ($E_{11}$) of the composite is predicted using the following equations:

$$\frac{E_{11}}{E_m} = \frac{1 + 2A_f \eta \phi}{1 - \eta \phi} \quad (14)$$

$$\eta = \frac{E_r - 1}{E_r + 2A_f} \quad (15)$$

Where $A_f$ is the aspect ratio of the nano-reinforcement (D/t), $\phi$ is the volume fraction of the reinforcement, $E_r$ is the ratio of reinforcement modulus to matrix modulus ($E_m$).

In the case of the Hui-Shia model, modulus predictions are made using the following equations:

$$E_L = E_m \left[ 1 - \frac{\phi}{\xi} \right]^{-1} \quad (16)$$

$$E_T = E_m \left[ 1 - \frac{\phi}{4} \left( \frac{1}{\xi} + \frac{3}{\xi + \Lambda} \right) \right]^{-1} \quad (17)$$

$$\xi = \phi + \frac{E_m}{E_f - E_m} + 3(1 - \phi) \left[ \frac{(1-g)\alpha^2 - g/2}{\alpha^2 - 1} \right] \quad (18)$$

$$\Lambda = (1 - \phi) \left[ \frac{3(\alpha^2 + 0.25)g - 2\alpha^2}{\alpha^2 - 1} \right] \quad (19)$$

$$g = \begin{cases} \frac{\alpha}{(\alpha^2 - 1)^{3/2}} \left[ \alpha \sqrt{\alpha^2 - 1} - \cosh^{-1} \alpha \right] \rightarrow a \geq 1 \\ \frac{\alpha}{(1 - \alpha^2)^{3/2}} \left[ -\alpha \sqrt{1 - \alpha^2} + \cosh^{-1} \alpha \right] \rightarrow a \leq 1 \end{cases} \quad (20)$$

Where, $\phi$ is the volume fraction of the reinforcement, a is the inverse aspect ratio (t/D), $E_m$ is the Young's modulus of the matrix (PET), and $E_f$ is the Young's modulus of the reinforcement phase (graphene nanoplatelets).

Results

With the objective of improving the properties of PET, graphene nanoplatelets were compounded with PET and injection molded into nanocomposites of specific loading rates. Nanocomposites obtained from this process were evaluated for their mechanical, thermal, and rheological properties to understand the effectiveness of graphene nanoplatelets.

Average Molecular Weight

The average molecular weight was obtained from Gel Permeation Chromatography (GPC), for the following samples: control PET, ultrasound treated PET, ultrasound treated nanocomposite master-batch (5% GNP), and twin-screw compounded master-batch with 5% GNP weight fraction. Comparing master-batches with similar GNP weight fraction can be helpful in understanding changes that occurred due to the presence of graphene.

Figure 26:
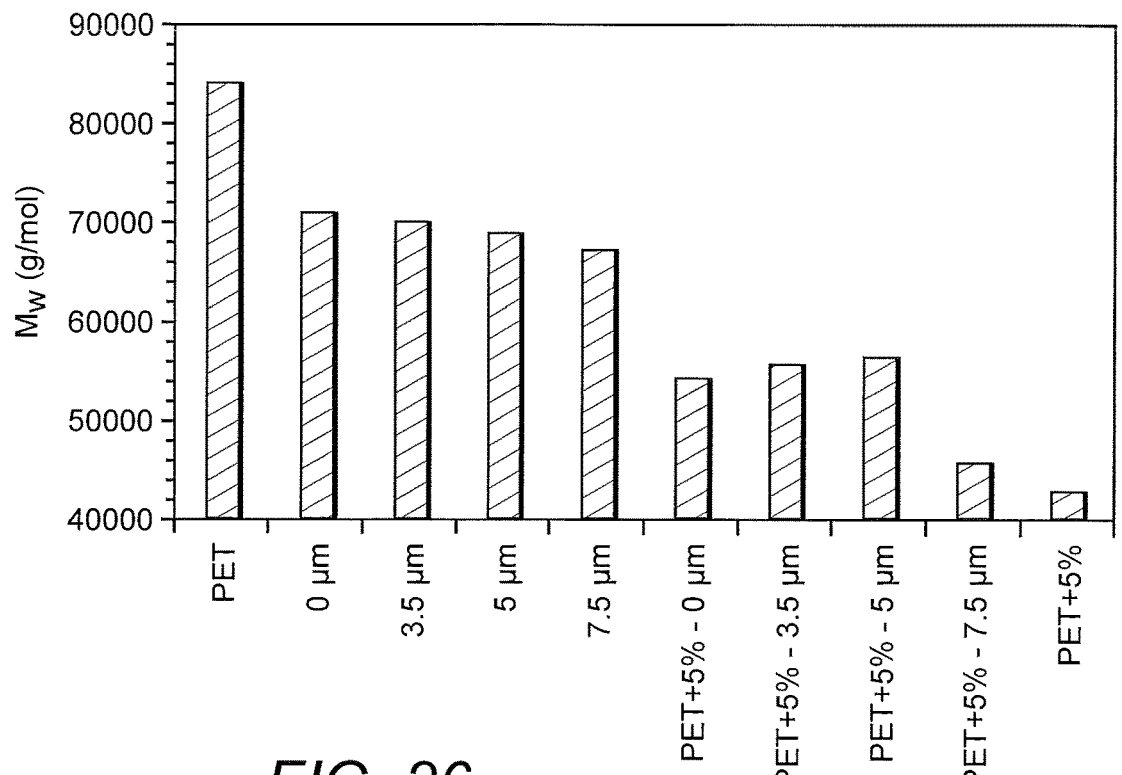
FIG. 26 is a graph illustrating a weight average molecular weight of PET and PET nanocomposite pellets in accordance with the present disclosure.

Based on the weight average molecular weight ($M_w$), shown in FIG. 26, the following observations were made. First, the average molecular weight changes with twin-screw processing, irrespective of ultrasound treatment. A decrease in the molecular weight through ultrasound treatment alone is less significant compared to the drop from twin-screw compounding.

In addition to the above observations, it is also noticed that the drop in molecular weight increased with the presence of graphene. From the molecular weight measurements, ultrasound treated samples have shown a polydispersity index (ratio of weight average to number average molecular weight) of 1.8 and 1.9 for nanocomposites with 5% GNP.

Intrinsic Viscosity

Figure 27:
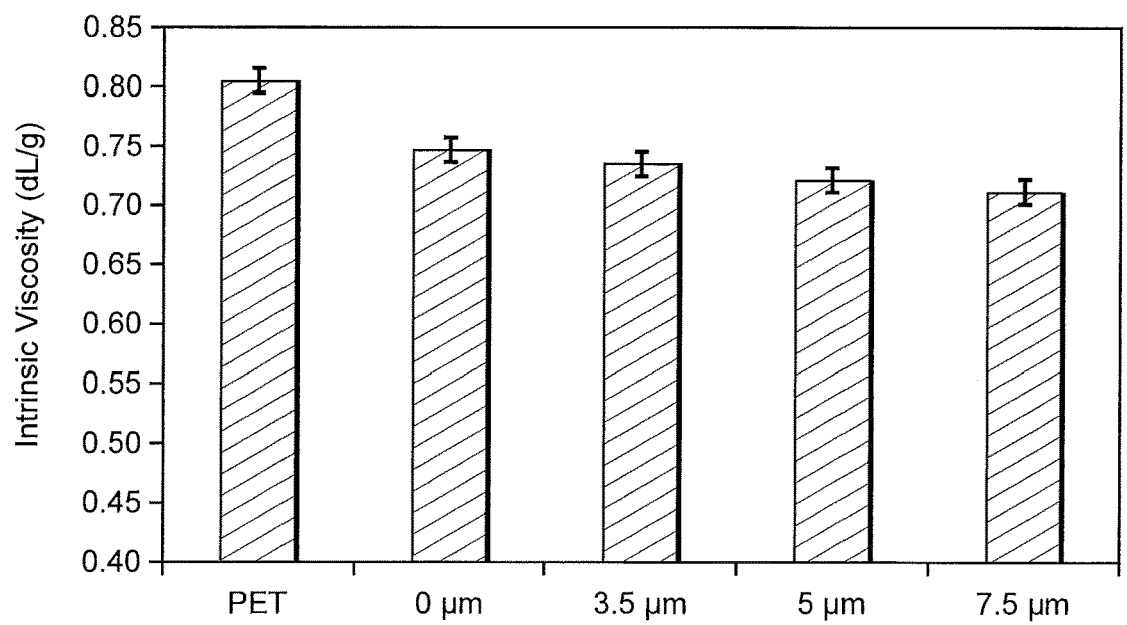
FIG. 27 is a graph illustrating an intrinsic viscosity measured for PET and ultrasound treated PET, according to the present disclosure.

Intrinsic Viscosity (I.V.) is the most commonly denoted number in reference to discussions comparing properties of polyethylene terephthalate. Therefore, the intrinsic viscosity of PET and ultrasound treated PET samples, shown in FIG. 27, were obtained by capillary viscometer using polymer dissolved solvents.

Figure 28:
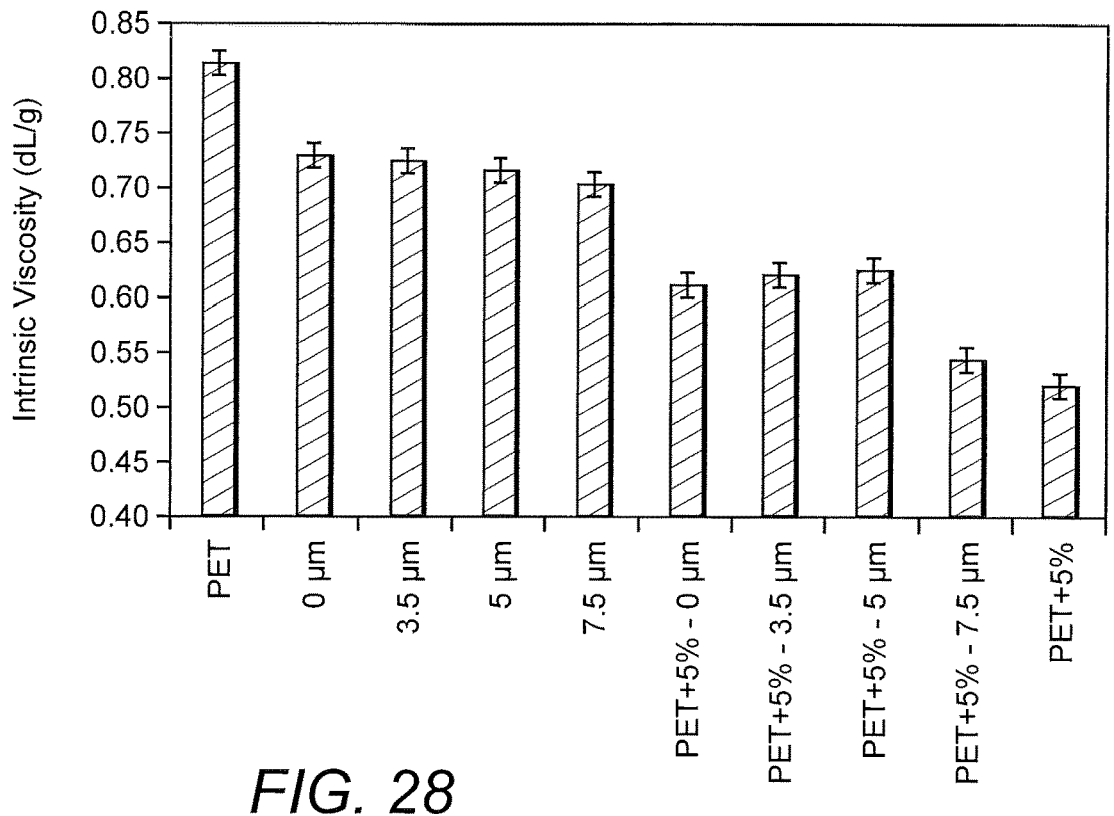
FIG. 28 is a graph illustrating a comparison of intrinsic viscosity for PET and PET nanocomposites, according to the present disclosure.

Correlating the experimentally obtained viscosities with the viscosities calculated by means of the weight average molecular weight, using Equation 5, Mark-Houwink parameters 'K' and 'a' were optimized to the respective values 0.00047 and 0.658. Using the new constants, intrinsic viscosity for the nanocomposite samples was obtained. Calculated viscosity values for both PET and PET nanocomposite samples are presented in FIG. 28.

Figure 29:
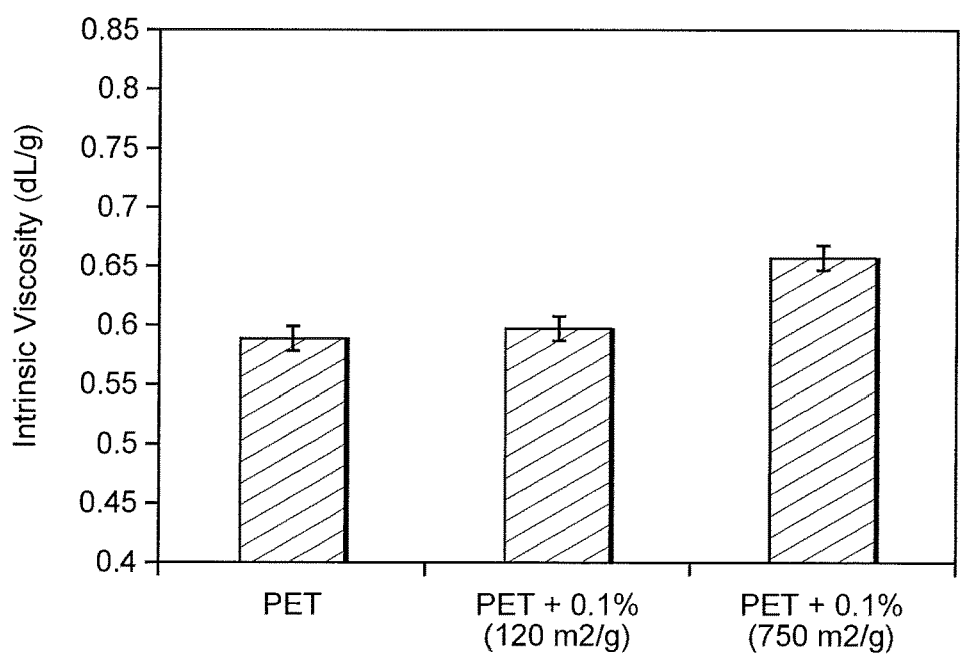
FIG. 29 is a graph illustrating a viscosity of pellets obtained by way of in-situ polymerization in accordance with the present disclosure.

Intrinsic viscosities for the in-situ polymerized PET and nanocomposite pellets, collected experimentally are shown in FIG. 29, all of which are showing viscosities in the range of 0.6 dL/g.

Mechanical Behavior

Stress-strain curves for the tensile bar samples are presented in FIG. 30. Young's modulus was obtained from the initial region of the stress-strain curve. Young's modulus and strength data for the nanocomposite tensile bars (Set-A) are presented in FIG. 31. A decrease in strength of the nanocomposites when compared with the control PET was observed. Further, nanocomposites had a brittle failure with a loss in elongation, compared with the control PET sample.

Figure 33:
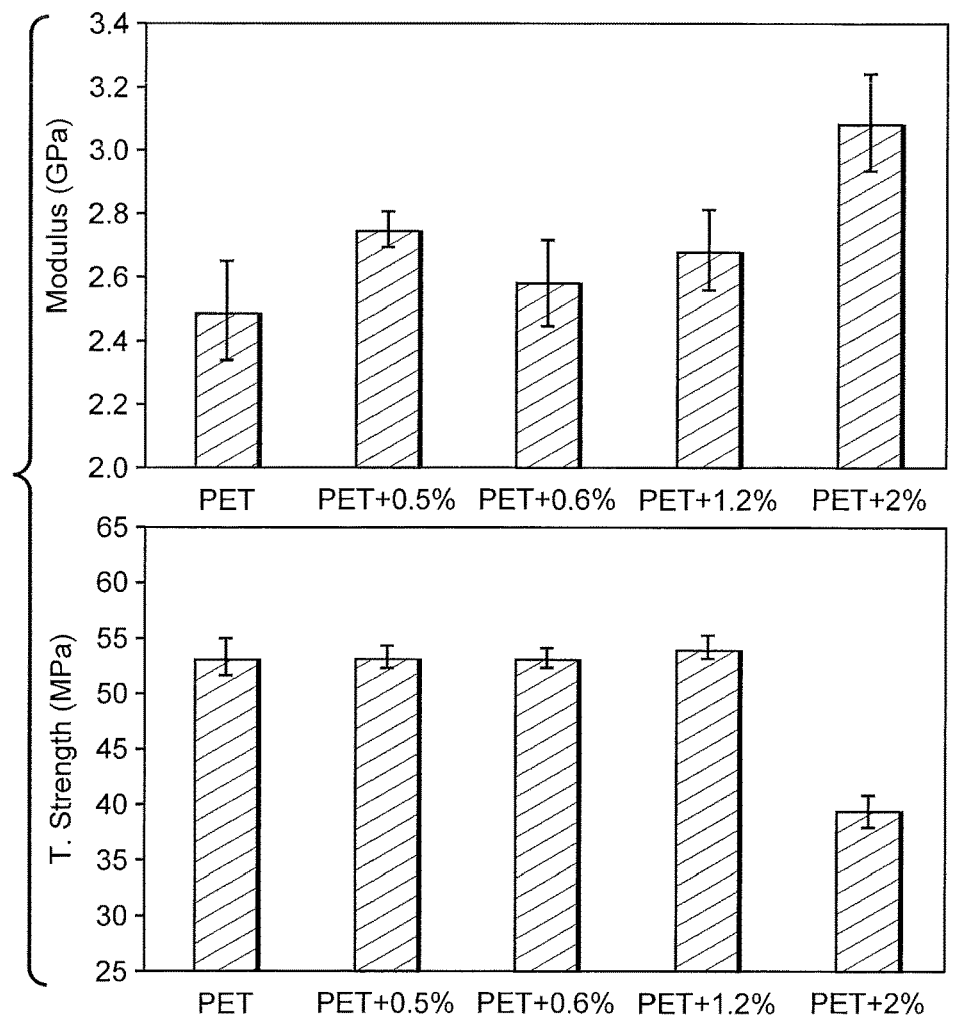
FIG. 33 is a graph illustrating modulus and tensile strength of PET and nanocomposite tensile tubes in accordance with the present disclosure.
Figure 34:
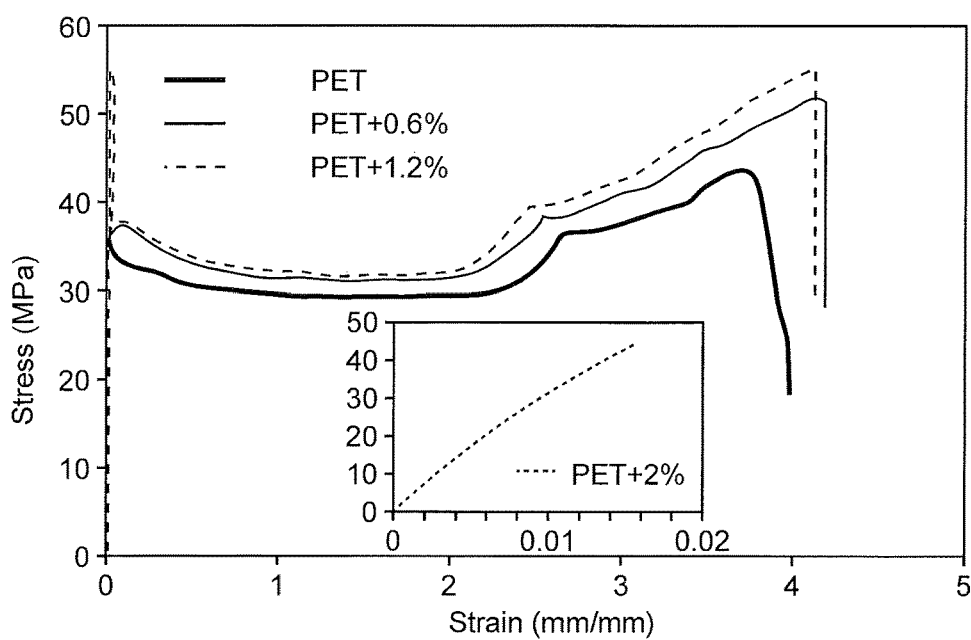
FIG. 34 is a graph illustrating engineering stress-strain curves of nanocomposite tensile tubes compared with tensile bar, according to the present disclosure.

Using a custom fixture, PET and nanocomposite tensile tubes and bars, shown in FIGS. 32(a)-(b), were tested for their mechanical properties. Young's modulus and the tensile strength of PET and nanocomposites are shown in FIG. 33. The PET modulus from the tensile tube was found to be less than the tensile bar samples (difference of 0.2 GPa), as the tensile bars exhibited thermal crystallinity due to slower cooling (19%). The modulus of the nanocomposites increased with increasing GNP content. However, the strength of the nanocomposites remained the same as PET, except in the case of a 2% sample. Stress-strain curves for PET tensile bar (2% GNP) and nanocomposite tensile tubes of low GNP weight fractions (0.6% and 1.2% GNP) are compared in FIG. 34. FIG. 34 shows that the nanocomposites are tougher (area under the stress-strain curve) than PET. The Young's modulus for the 2% nanocomposite was identical from the two different injection molding processes used (3.1 GPa). However, nanocomposite tubes with 2% GNP loading deviated in the type of failure with respect to lower weight fractions. At 2% GNP loading, nanocomposites exhibited only 1% strain which is significantly lower compared to failure strain for 1.2% GNP loading (400%).

Figure 35:
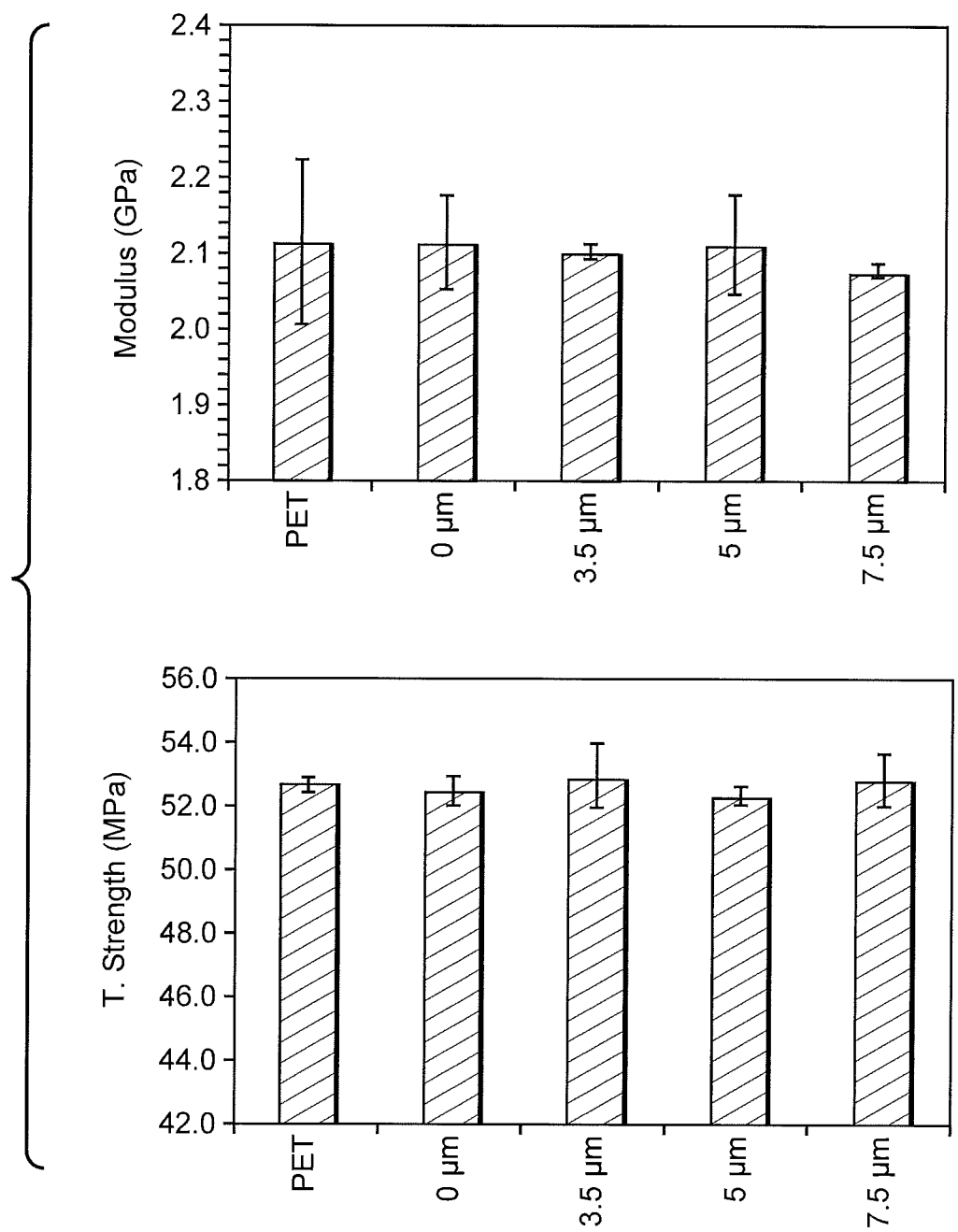
FIG. 35 is a graph illustrating Young's modulus and tensile strength of ultrasound treated PET (horizontal axis-ultrasound amplitude) compared with PET control in accordance with the present disclosure.

Tensile bars of PET and ultrasound treated PET obtained from the micro injection molding process were tested for their mechanical properties. FIG. 35 compares the Young's modulus and strength data for ultrasound treated PET with control PET. It was observed that the ultrasound treatment of PET did not have a significant effect on its modulus and strength. However, the ultimate tensile strength (tensile strength at breaking) for the ultrasound treated PET increased significantly (by 24%), as shown in FIG. 36.

Using the ultrasound treated master-batch pellets; nanocomposite tensile tubes at 2% GNP loading were prepared and tested for comparison with nanocomposites from twin-screw compounding. Nanocomposites prepared from compounded pellets treated with different ultrasound amplitudes show improvement in Young's modulus and tensile strength. Improvement in modulus for nanocomposites with 3.5 µm ultrasound amplitude was higher (2.7 GPa-12% improvement) compared with other ultrasound treatments, as shown in FIG. 37. Nevertheless, the increase in modulus for ultrasound treated 2% nanocomposites is lower compared with the twin-screw compounded nanocomposites at 2% GNP (3.1 GPa-24% improvement). Ultrasound treated nanocomposites displayed yielding behavior similar to PET, but with only 3% maximum improvement in strength.

Figure 38:
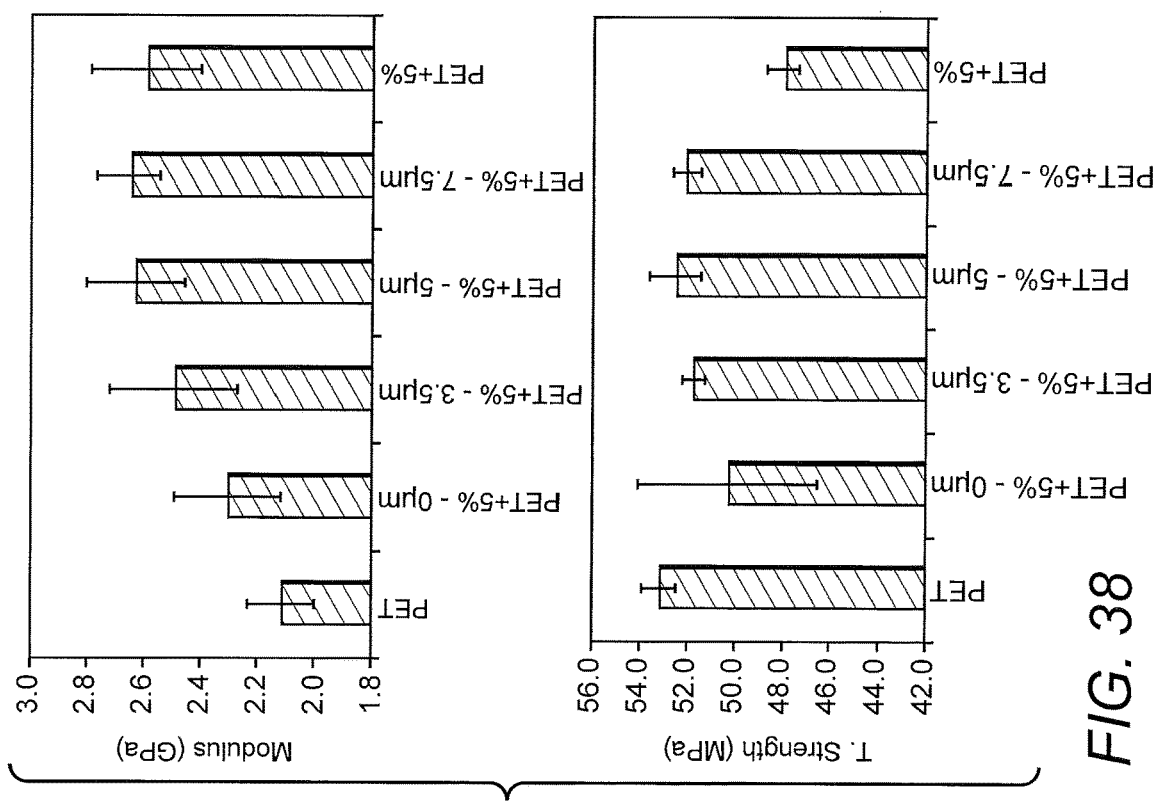
FIG. 38 is a graph illustrating modulus and strength of ultrasound treated nanocomposites with 5% GNP compared with PET control and twin-screw compounded nanocomposite, according to the present disclosure.

Nanocomposites prepared through dilution of ultrasound treated master-batch did not provide conclusive evidence to understand the change in mechanical properties. Therefore, tensile bars with 5% GNP weight fraction were obtained from micro injection molding system, using the ultrasound treated master-batch pellets (with no dilution of GNP weight fraction). The Young's modulus and the tensile strength of the 5% GNP nanocomposite tensile bars were compared with control PET and tensile bars prepared using 5% pellets from twin-screw compounding process, as shown in FIG. 38. While the strength data indicate a recovery in tensile strength with increase in ultrasound amplitude, the modulus data points out that the improvement from ultrasound treatment is not significant compared to the regular twin-screw mixing.

Figure 39:
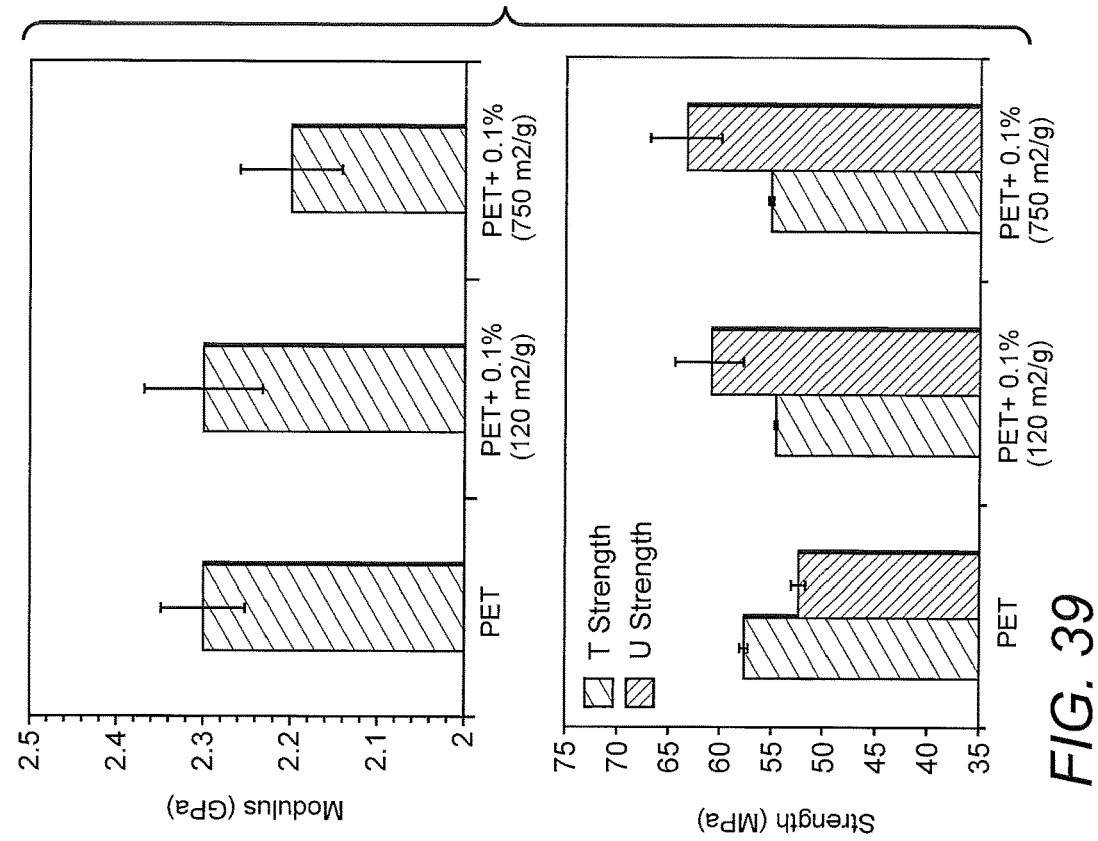
FIG. 39 is a graph illustrating Young's modulus and strength data for in-situ polymerized PET and nanocomposites in accordance with the present disclosure.

Tensile bars of PET control and nanocomposites with 0.1% GNP weight fraction obtained from the polymerization process were tested for their mechanical properties. FIG. 39 compares the Young's modulus and strength data for PET and nanocomposites with 0.1% GNP of different surface areas. While there is no significant difference in the modulus of the nanocomposites, strength exhibited two different trends. Ultimate strength of the nanocomposites shows significant (minimum 16%) improvement over the PET control. On the contrary, tensile strength of the nanocomposites decreased slightly (by 5%) over PET.

Density Measurements

Densities for the nanocomposites were measured using Archimedes' principle. The densities of the nanocomposites were different from the theoretical values estimated based on amorphous PET and graphene. Comparison of densities between the molded PET tensile bars and tensile tubes, indicate that the tensile bars were semi-crystalline (19% crystallinity), based on Eq. 2. Density measurements from the nanocomposite samples deviate from theoretical values, based on the Rule of Mixtures. In order to make a better comparison of the strength of nanocomposites, densities were collected for samples before testing and used to estimate their specific strength, as presented in FIGS. 39(a)-(c). Specific strength values presented in FIGS. 39(a)-(c) show no significant loss or improvement in strength of PET with GNPs, except for the nanocomposite tensile tubes with 2% GNP weight fraction.

Scanning Electron Microscopy

Figure 40B:
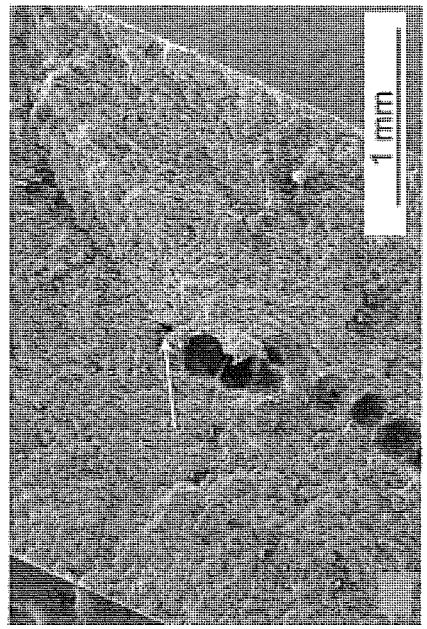
FIG. 40(b) is a micrograph illustrating voids and a crack initiation point on a fracture surface of nanocomposite tensile bars with 10% GNP weight fraction, according to the present disclosure.
Figure 40A:
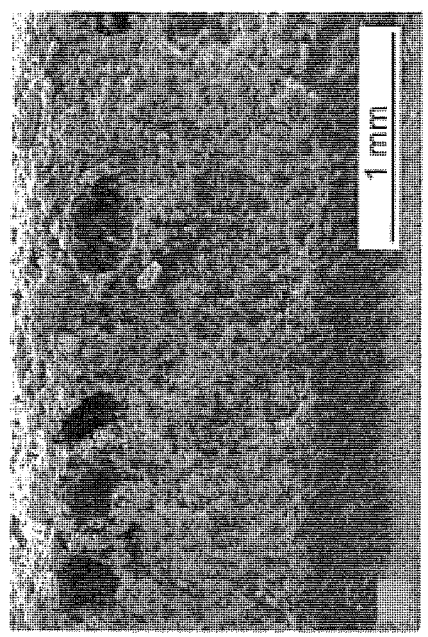
FIG. 40(a) is a micrograph illustrating voids on a fracture surface of nanocomposite tensile bars with 5% GNP weight fraction, according to the present disclosure.

Comparing the stress-strain curves of nanocomposites with PET shows that the failure strain (elongation) of the nanocomposite tensile bars decreased. To understand the type and reasons for the failure of nanocomposites, scanning electron micrographs were collected. Fracture surface micrographs show the presence of micro voids, as shown in FIGS. 40(a) and 40(b). Moisture present in the pellets can give rise to voids during their processing. Therefore, the increase in the stress concentration near the voids contributed in lowering the strength of the nanocomposite tensile bars. Initiation of the crack from the void, as shown in the fracture surface micrographs, FIG. 40(b), confirms this observation.

Figure 41B:
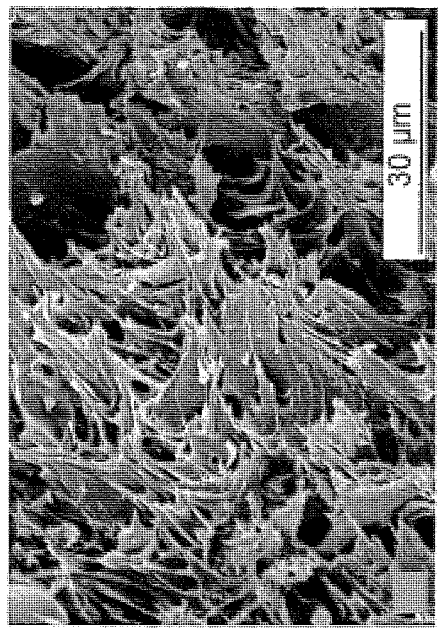
FIG. 41(b) is a micrograph illustrating a failure of the micro fibril formed from elongation within the highlighted area of FIG. 41(a), according to the present disclosure.
Figure 41A:
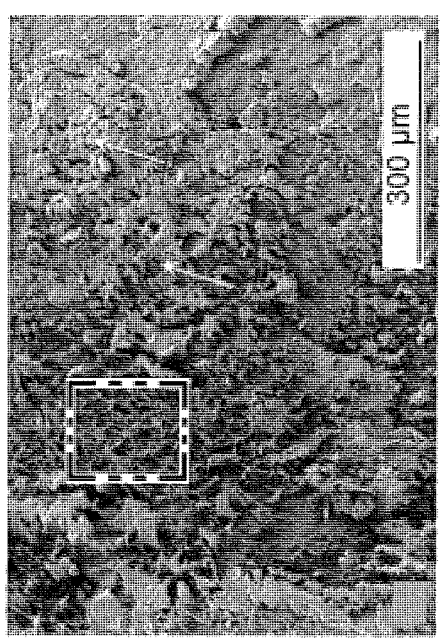
FIG. 41(a) is a micrograph illustrating a fracture surface of 2% nanocomposite tensile tube with a highlighted area showing signs of "ductile fracture," in accordance with the present disclosure.

Similar observations were made from the micrographs of the fracture surface of nanocomposite tensile tubes with 2% GNP weight fraction. Nanocomposite tensile tube showed signs of "ductile fracture", as shown in FIGS. 41(a) and 41(b). Voids observed in this set of samples are very small <10 µm in size, pointed with arrows in FIG. 41(a). Localized ductile deformation of the polymer matrix through fibril stretching, surrounding the micro voids can increase the local stress concentration. This increase in the stress concentration can initiate cracks, which lead to the brittle fracture of the nanocomposite.

At higher magnification, graphene nanoplatelets were observed on the fracture surfaces. Nanoplatelets, as pointed out in the SEM micrographs shown in FIGS. 42(a)-(d), are projecting out of plane to indicate they were exposed during the failure and were part of load sharing. At higher nanoplatelets content (15%), the microstructure of the nanocomposite is different from others with more local fractures. One difficulty with the nanocomposite is the ability to make clear amorphous samples. Having clear PET tensile bars helps eliminate defects caused by poor processing, such as voids. Since these nanocomposites are dark the voids must generally wait to be visually observed by destructive methods.

Ultrasound Imaging

A nondestructive alternative to imaging voids is ultrasound imaging. Ultrasound micrographs of the tensile bars from the ultrasound "Bulk Scan" are shown in FIG. 43. These micrographs show the presence of voids along the length of the tensile bar. Based on the micrographs, it was inferred that the voids are a result of processing. Further, densities of the ultrasound imaged samples were compared with the mechanical tests to confirm that the deviation in the densities is due to the presence of voids.

Thermal Analysis

The melt and crystallization behavior of the nanocomposites was analyzed through DSC measurements. FIG. 44 presents the glass transition ($T_g$) and melting temperatures ($T_m$) from the second heating cycle and crystallization temperature ($T_c$) from the first cooling cycle, plotted with respect to the GNP weight fractions for twin-screw compounded pellets. While the melting temperature shifted to higher values with increasing GNPs, the glass transition showed a decreased trend except for at 15% weight fraction. A decrease in the glass transition temperature as shown in FIG. 44 can be due to the agglomeration of nanoplatelets inside the PET matrix. Agglomerated platelets can act as plasticizers and affect the glass-transition temperature.

Both crystallization and melt temperatures increased with increasing GNP content. The melting temperature of PET is dependent on the crystal shape and size. As shown in FIG. 44, the addition of GNPs increases the melting temperature. This can be due to the formation of larger and more perfect crystals indicated by the higher (10° C. to 18° C.) crystallization temperature and expected with the presence of nucleation sites (i.e., nanoplatelets). While the change in melting temperature is small, the crystallization temperature increased with increasing GNP content. Increases in the crystallization temperature are due to a nucleation effect from the presence of GNPs which become stronger with the increasing GNP weight fraction. The change in crystallization temperature and shape of the exothermic peak with GNP weight fraction is shown in FIG. 46.

Using the crystallization exotherms for nanocomposite pellets, presented in FIG. 46, on-set temperatures ($T_{on}$) were obtained to determine the crystallization half-time ($t_{1/2}$) by way of Eq. (7). It was observed that with an increase in the GNP content, the crystallization half-time (inverse of crystallization rate) increased. A decrease in the crystallization rate indicates that with an increase in the GNP content, PET chain mobility is affected. As a result, the crystallinity of the nanocomposites decreased at higher graphene loadings, as shown in FIG. 45.

The percentage crystallinity presented in FIG. 45 (right), for the as received injection molded tensile bars was measured through Differential Scanning calorimetry (DSC). The crystallinity measured for the injection molded nanocomposites shows a similar trend to the non-isothermal crystallinity obtained through DSC. This confirms the above observation that an increase in GNP allows early nucleation of PET, but restricts chain mobility.

Ultrasound treated PET and PET-5% GNP nanocomposite pellets were analyzed for their change in thermal properties. Glass transition and melting temperatures are presented in FIG. 47. The glass transition temperature of PET decreased with the addition of GNPs for the no ultrasound condition (0 USM). Ultrasound treatment was observed to have an effect on the glass transition temperature ($T_g$) of both PET and PET nanocomposites. For PET, the glass transition followed a decreasing trend except for at the 7.5 µm amplitude. The change in '$T_g$' for PET points towards polymer softening with increase in ultrasound amplitude. The glass transition temperature for nano composites increased with the ultrasound amplitude. However, the '$T_g$' of the nanocomposite was still lower than PET. Crystallization temperatures for PET and PET-5% GNP pellets remained constant regardless of the ultrasound amplitude, at 194° C. and 214° C. respectively.

Multiple melting peaks were observed in the melting endotherm for ultrasound treated PET, as demonstrated in FIG. 48. Multiple melting peaks indicate the presence of different crystals sizes, potentially indicating at a broader molecular weight distribution.

The crystallization half-time ($t_{1/2}$) for PET decreased with ultrasound treatment. With the addition of GNPs the '$t_{1/2}$' increased for all the ultrasound amplitudes, as shown in FIG. 49. The increase in the crystallization half-time for the 5 µm amplitude condition nanocomposite was less compared to other ultrasound amplitudes. Non-isothermal crystallinity for the ultrasound treated PET increased with the increase in amplitude, except for the case of 7.5 µm amplitude. Presence of graphene increased the crystallinity, however maximum change in crystallinity was observed only in the case of 7.5 µm amplitude.

Tensile bars of ultrasound treated PET and PET nanocomposites obtained from micro injection molding were evaluated for percentage crystallinity. Under similar conditions, ultrasound treated PET samples have 8% crystallinity and ultrasound treated nanocomposites have 11 to 13% crystallinity.

Figure 50:
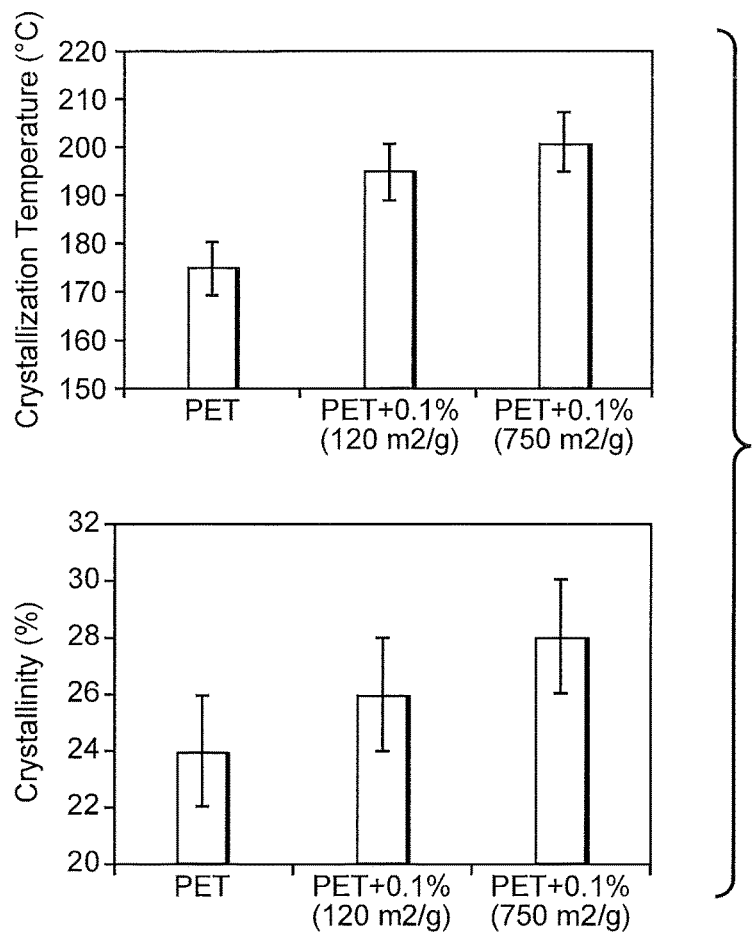
FIG. 50 comprises graphs illustrating crystallization temperature and percent crystallinity for in-situ polymerized samples, according to the present disclosure.

PET control and nanocomposites obtained from in-situ polymerization were evaluated for their crystallization behavior. At 0.1% loading, graphene nanoplatelets with a higher average surface area (750 m²/g) had a stronger nucleation effect compared to nanoplatelets with lower average surface area (120 m²/g). Crystallization temperature and the non-isothermal crystallinity are higher for high surface area graphene, as shown in FIG. 50.

Dispersion Studies

Figure 51:
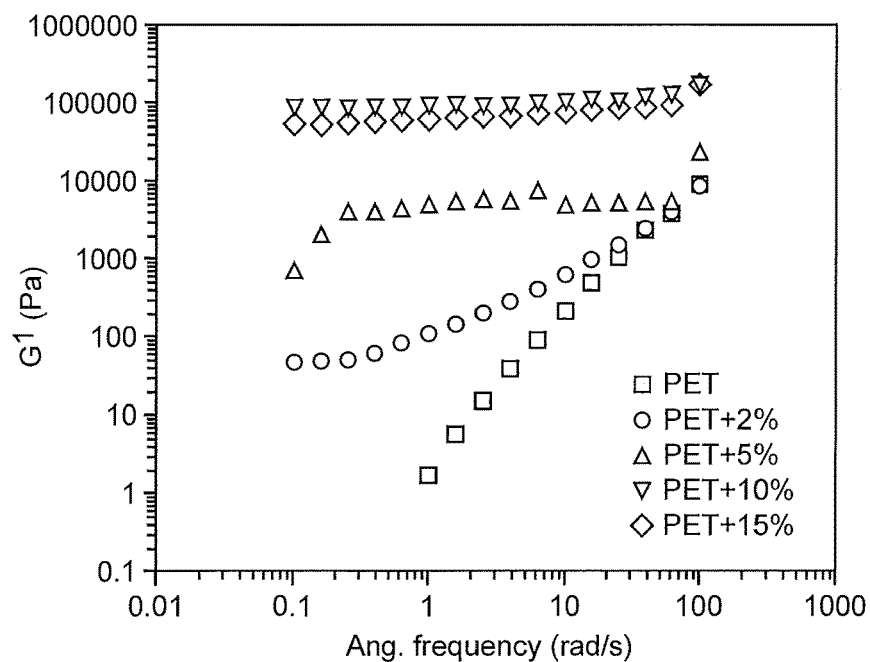
FIG. 51 is a graph illustrating storage modulus of PET and PET nanocomposites with respect to angular frequency in accordance with the present disclosure.

Melt rheology of the nanocomposites was studied to understand the extent of nanoplatelet dispersion in PET. Dynamic frequency sweeps for the nanocomposite pellets from twin-screw compounding along with control PET are presented in FIG. 51. The shear storage modulus (G') of PET decreased linearly with frequency. The addition of graphene nanoplatelets to PET improved its modulus (G'). In the case of PET-2% GNP nanocomposite pellets, the modulus (G')

transitioned from a linear region (dependent) to a plateau (independent of the angular frequency) below 0.3 rad/s. This transition point for 5% nanocomposite moved up to 64 rad/s frequency. Nanocomposites with 10% and 15% GNP weight fractions, exhibited rigid behavior even when tested at 320° C. with a gap of 1.6 mm (melt thickness between parallel plates). The percolation threshold ($\phi_{per}$) for twin-screw compounded PET-GNP nanocomposites was determined to be 1.75% wt. (1.1% vol.), based on the linear regression of the G' values at 0.1 rad/s for 2% and 5% samples, as illustrated in FIG. 52. The nanoplatelet aspect ratio at the percolation threshold was evaluated as 40, based on Eq. (8).

Figure 54:
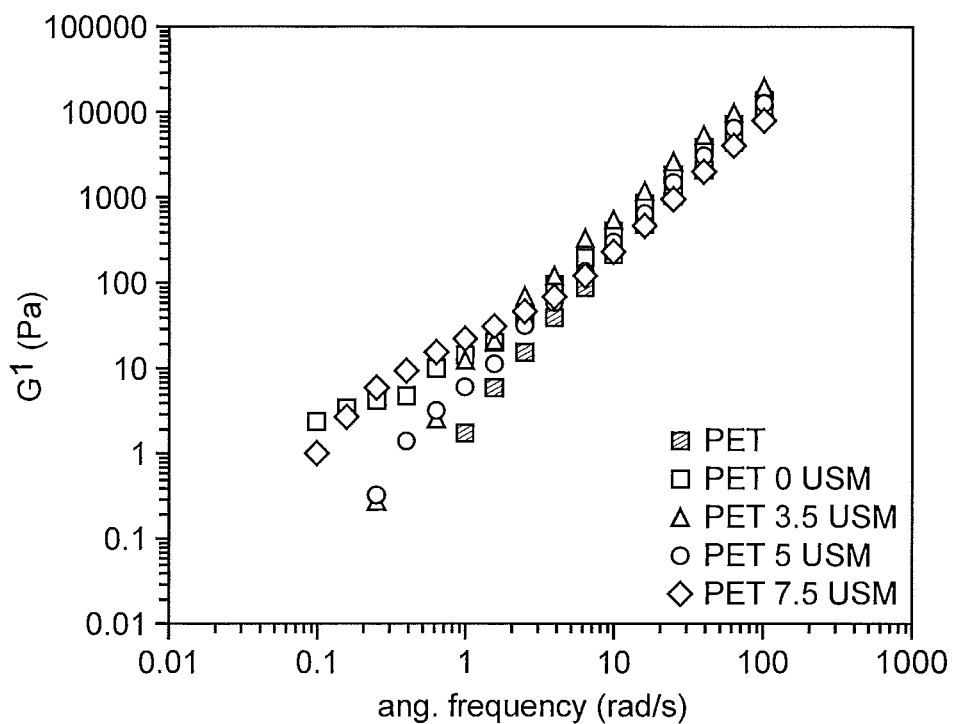
FIG. 54 is a graph illustrating a dynamic sweep of storage moduli for different PET samples, according to the present disclosure.

Ultrasound assisted compounding of PET and graphene nanoplatelets showed more linear response compared to twin-screw compounding for the same weight fraction (5%), as demonstrated in FIG. 53. At low frequencies, nanocomposites with a lower ultrasound amplitude exhibited higher storage moduli. This indicates that increasing the ultrasound amplitude has an effect on nanoplatelet dispersion. As the moduli at higher frequencies are an indication of the polymer behavior, a decrease in the moduli compared to the PET control hints at change in the polymer structure. Comparing the ultrasound processed PET with the PET control, as shown in FIG. 54, indicates that the shear modulus of PET at higher frequencies increased for lower (3.5 µm and 5 µm) ultrasound amplitudes. Additionally, the modulus at lower frequencies increased for samples without (0 µm) and at 7.5 µm ultrasound amplitude conditions. Based on the data shown in FIGS. 53 and 54, the ultrasound amplitude of 5 µm was found to have less effect on PET, while also indicating an improvement in the dispersion of graphene nanoplatelets.

Figure 55A:
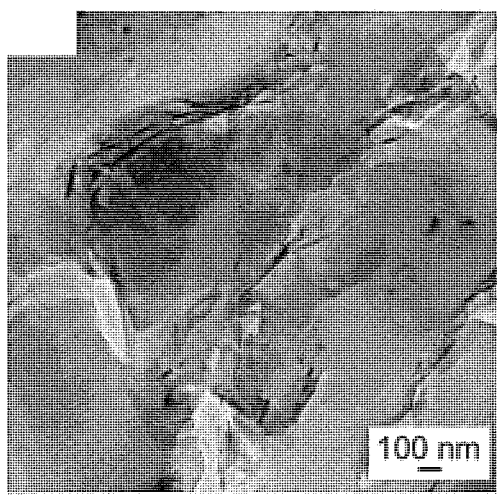
FIG. 55(a) illustrates a transmission micrograph of 15% nanocomposite in accordance with the present disclosure.
Figure 55B:
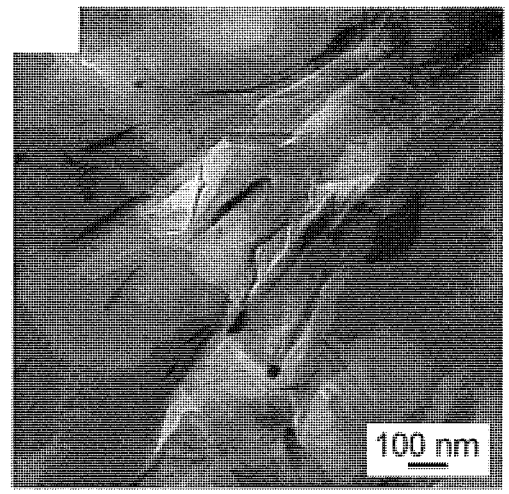
FIG. 55(b) illustrates a transmission micrograph of 15% nanocomposite in accordance with the present disclosure.
Figure 56A:
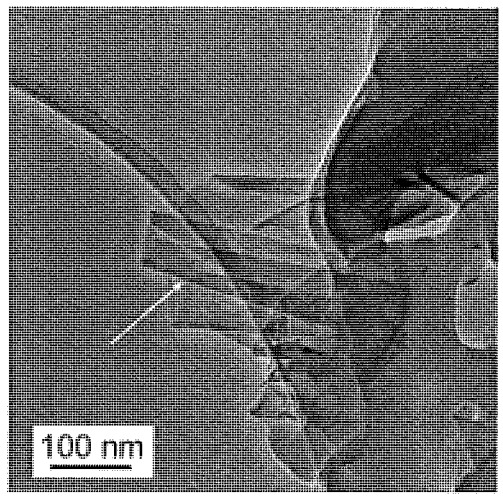
FIG. 56(a) illustrates a transmission micrograph of 5% nanocomposite, showing few layer graphene, in accordance with the present disclosure.
Figure 56B:
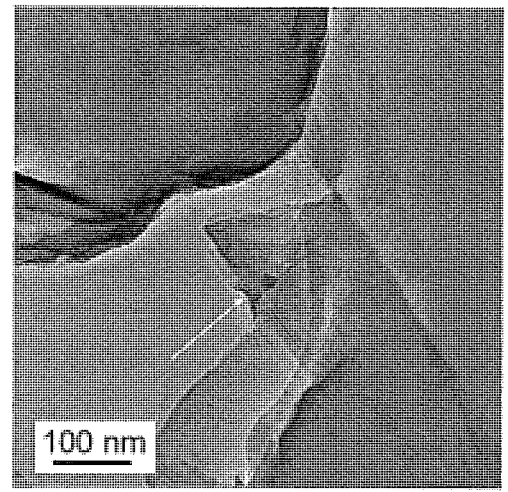
FIG. 56(b) illustrates a transmission micrograph of 5% nanocomposite, showing few layer graphene, in accordance with the present disclosure.

Transmission micrographs were collected for nanocomposite tensile bars of 5% and 15% weight fraction. Even though there are few layered graphene, as shown in FIGS. 56(a) and (b), transmission micrographs of the nanocomposites indicate that the graphene nanoplatelets are not completely exfoliated in the PET matrix. Micrographs shown in FIGS. 55(a) and (b) indicate that the nanoplatelets are distributed in the matrix, with regions of high concentration.

Figure 57A:
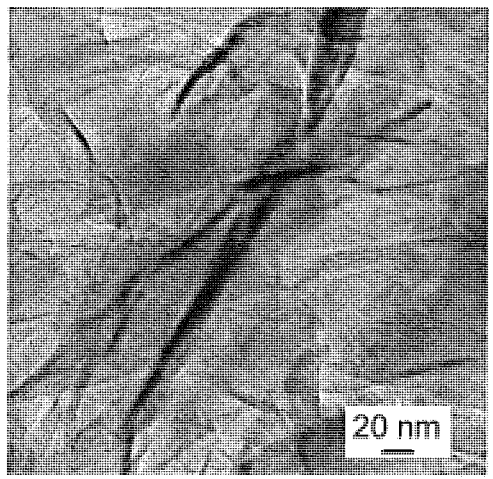
FIG. 57(a) illustrates a transmission electron micrograph of 15% PET-GNP nanocomposite, according to the present disclosure.
Figure 57B:
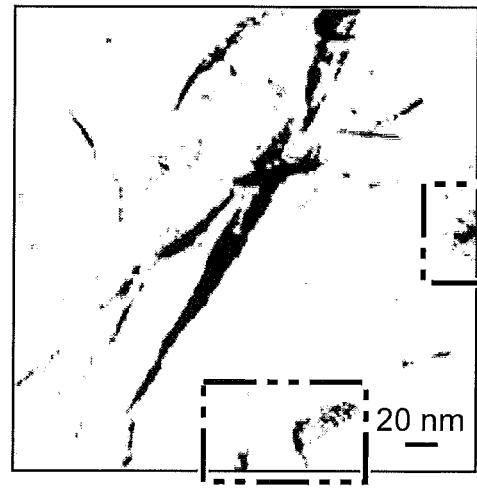
FIG. 57(b) is a binarized micrograph suitable for analyzing interparticle distances, according to the present disclosure.

Average dimensions (thickness and length) of the nanoplatelets obtained from TEM micrographs were used as input parameters to evaluate micromechanical models. The interparticle distance for graphene nanoplatelets inside the PET matrix was determined using binarized TEM images. Converting the micrographs to binary images allowed separating the nanoplatelets (darker regions) from the polymer matrix, as shown in FIG. 57. Interparticle distance for 5% and 15% nanocomposites were determined as 2800 nm and 520 nm respectively, as shown in FIG. 58. This change in the interparticle distance can be because of the increase in concentration of graphene nanoplatelets, which can affect the dispersion. Theoretical interparticle distance for graphene nanoplatelets of known aspect ratio 40 (obtained from rheological measurements), were plotted against the calculated values based on TEM, as shown in FIG. 58.

Diffraction patterns acquired from the graphene nanoplatelets, PET, and PET-GNP nanocomposite tensile bars are shown in FIG. 59. Peak broadening observed for the graphene peak at 26.6° 2θ is indicative of the presence of platelets with different d-spacing. The intensity of the graphene peak at 26.6° 2θ increased with weight fraction of the nanoplatelets. However, no peak shift was observed as in the case of an exfoliated nanocomposite. PET and nanocomposite tensile bars exhibit a broad amorphous halo around 19.2° 2θ.

Diffraction scans indicate that the PET tensile bar is amorphous. However, density measurements and visual observations contradict this. Therefore, diffraction scans were collected across the cross-section of the PET tensile bar, to confirm the presence of a crystalline core with an amorphous outer layer. Slower cooling rates during the oil cooled injection molding process result in the formation of a significantly different skin and core microstructure. Data from the diffraction line scan along the thickness are presented in FIGS. 60(a)-(b). In order to have a better understanding on the microstructure of the nanocomposites, a similar line scan was performed along the thickness of the 15% tensile bar, presented in FIG. 61. It was observed that intensity of the graphene peak changes along the thickness of the sample, with higher intensity at the center. Further, crystallization of PET was also observed towards the core of the sample, as denoted by arrows labeled "PET" in FIG. 61.

Diffraction analysis on the nanocomposite tensile tubes indicate a completely amorphous microstructure and addition of GNPs did not increase the crystallization of PET. 2D diffraction frames indicate that the GNPs are oriented at the surface due to the injection flow stresses.

Using the reconstructed tomographs for the sample collected from the 15% nanocomposite tensile bar, the distribution of nanoplatelets inside the PET matrix was visualized as shown in FIGS. 62(a)-(b). Based on observations from the reconstructed volume, nanoplatelets were found to be oriented along the flow direction about 200 µm in depth from surface (along the Y-axis direction). Nanoplatelets with random orientation and curved platelets as well were observed from this data.

3D X-ray microscopy of the samples (wedge shape) collected from the nanocomposite tensile tube has shown that the extent of nanoplatelet orientation was smaller than in the tensile bar. FIGS. 63(a)-(b) shows the 3D distribution of the nanoplatelets on the inside surface of the tensile tube. As seen from the picture, nanoplatelets are oriented in the flow direction, parallel to the surface only up to 15.6 µm in thickness. For the outside surface, alignment with the flow was limited to a 7.5 µm thickness.

Raman spectrum for PET and PET nanocomposites were collected to analyze the dispersion of graphene nanoplatelets. The Raman spectrums indicate that the nanoplatelets dispersed in to the PET matrix are multi layered. As stated earlier, Raman spectroscopy can also be used to determine the presence of π-π interactions between PET and graphene layers. FIG. 64 shows the Raman bands (~1617 cm$^{-1}$) corresponding to C—C stretching for PET and nanocomposites with increasing GNP content. A change in the band positions determined from peak fits can be observed in FIG. 65. This shift in the Raman band (~1617 cm$^{-1}$) corresponding to C—C stretching in the phenyl ring of PET is an indication of the interaction with graphene. Further, the full width at half maximum for the Raman band corresponding to C=O stretching (~1730 cm$^{-1}$) was evaluated to understand the effect graphene has on PET chain mobility. Peak broadening for the 1730 cm$^{-1}$ Raman band (C=O stretching), perceived to be an indicator for chain mobility in amorphous PET was not observed here. This can be due to the highly oriented structure at the surface of the tensile bars obtained from injection molding. Even though the surface is amorphous for these nanocomposites, the highly oriented structure will reduce the probability of having multiple chain rotations thereby limiting the band width. In accordance therewith, FIG. 66(a) shows a table listing properties of GNP and PET for micromechanical model based predictions in accordance with the present disclosure.

Micromechanical Modeling

Single layer graphene is known for its high strength and stiffness. Nevertheless, dispersing graphene nanoplatelets solely into single layer graphene was not realized here. Some fraction of the mixture is likely single layer, but a majority was not. Studies on multi-layer graphene have shown that when the number of layers is less than 10, properties are similar to that of a single layer. In the case of nanoplatelets with more than a few layers, its mechanical behavior has been found to be similar to a graphite flake. For that reason, the modulus of the graphene nanoplatelet was considered to be 0.795 TPa, similar to highly oriented graphite.

Improvement in the properties of a nanocomposite depends on the extent of nanoplatelet dispersion. Based on the measurements from TEM micrographs, graphene nanoplatelets with different length (diameter of the platelets) and thickness were observed. FIG. 66 shows the average size of the platelets with minimum and maximum values. Predicted moduli of the nanocomposite from Halpin-Tsai and Hui-Shia micromechanical models are plotted against the experimental results, as shown in FIG. 66. In order to compare with the moduli from nanocomposite tensile bars, modulus of semi-crystalline PET obtained from PET tensile bars was used as the model input properties. Using the average platelet properties and their standard deviations, modulus limits for the nanocomposites were calculated. Upper and lower limits for the predicted modulus are presented in FIG. 66 by means of error bars. Comparison of the modulus data from with experimental data indicate that Hui-Shia model predictions are close to the experimental values.

Using the Hui-Shia model for nanoplatelets loaded along the length (i.e., in direction '1 or 2') of the nanoplatelets, the nanocomposite modulus with respect to platelet aspect ratios may be plotted as shown in FIG. 67. Modulus data for nanoplatelet aspect ratios from TEM measurements (average and the upper limit), melt rheology, and for an ideal dispersion condition (single layer graphene) were plotted. Based on the micromechanical model, it was observed that the predicted properties are more sensitive to nanoplatelets aspect ratio than their properties. For ideal dispersion condition, modulus of graphene single layer 1.02 TPa was used. Modulus of amorphous PET obtained from injection molded tensile tubes was used for the model data shown in FIG. 67.

Comparing the experimental modulus with the predicted modulus indicate that the nanocomposites with lower GNP weight fractions have higher aspect ratios. For nanocomposites (0.5%, 0.6%, and 1.2%) prepared through a dilution of the master-batch (as mentioned in FIG. 16(c)), it was observed that master-batches with low GNP content yielded higher aspect ratios. This can be explained by considering the gentler processing seen when diluting a master-batch which was done with a single screw rather than a twin screw.

Discussion

Polyethylene terephthalate-graphene nanoplatelet nanocomposites were prepared through injection molding. Master-batch pellets from twin-screw compounding and ultrasound-assisted twin-screw compounding were characterized for their mechanical and thermal properties. In this chapter, the effect of ultrasound on PET properties, the type of interaction between graphene and PET, the mechanics behind the property change, the effect of compounding and injection molding, and the applicability of micromechanical models in evaluating the nanocomposites are discussed.

Effect of Ultrasound Treatment on PET

Ultrasound-assisted extrusion was used in the current study to disperse graphene nanoplatelets in the PET matrix. With no literature available to understand the effect of ultrasound on PET, ultrasound treated PET was also analyzed here. During ultrasound-assisted extrusion, energy applied (in the form of ultrasound waves) to the polymer can increase the melt temperature locally as a result of acoustic cavitation. Cavitation will not only aid in exfoliating the nanoplatelets, but can also potentially change the polymer. The average molecular weight from the GPC measurements on ultrasound treated PET indicates that the molecular weight decreased with increasing ultrasound amplitude.

Nevertheless, the molecular weight for PET with no ultrasound treatment also decreased. Based on the data, it is understood that the decrease in molecular weight is primarily from the extrusion process (15%) and ultrasound treatment has a minimal (5% drop) effect on the molecular weight.

Figure 68:
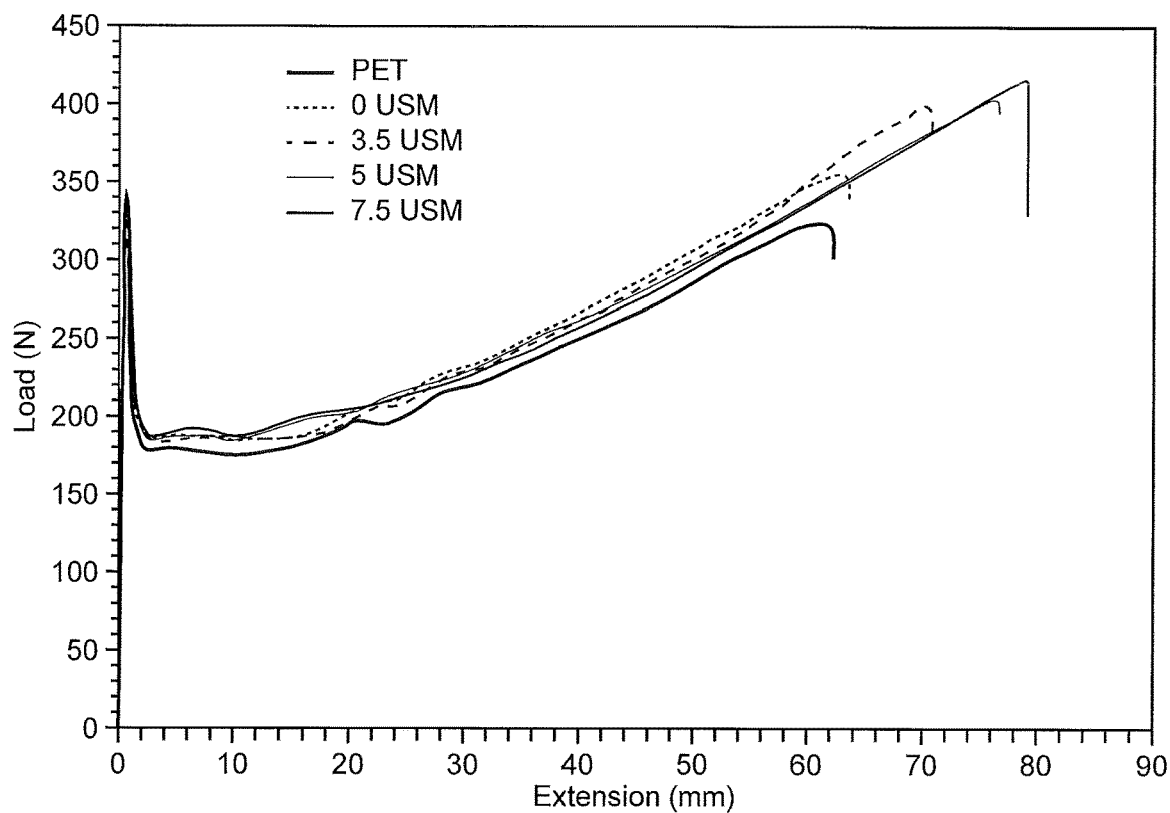
FIG. 68 is a graph illustrating load extension curves for ultrasound treated PET compared with a PET control in accordance with the present disclosure.

Mechanical testing of the ultrasound treated PET did not show a significant difference in Young's modulus and tensile strength. Nevertheless, ultrasound treated specimens did show an improvement in ultimate strength (strength at break) and exhibited higher toughness compared to PET control, as may be seen by way of FIGS. 36 and 68.

PET degradation involves three different processes; they are: hydrolysis, thermal degradation and oxidation. During the extrusion process, polymer degradation can take place through one or more abovementioned processes and result in chain scission. Some condensation reaction can also occur, which lengthens the chain. An increase in the toughness of PET from ultrasound treatment indicates ultrasound indeed altered the PET molecular chains. Thermal analysis (DSC and Rheology) of the ultrasound treated PET hint at entanglement through branching of PET. Entanglement of polymer chains results in an increase in the shear modulus (G') at lower frequencies as observed in FIG. 54. This also explains the increase in the '$T_g$' for PET treated at 7.5 µm amplitude. Polymer with lower molecular weight (shorter chain length) exhibits a lower glass transition temperature, when compared with a high molecular weight grade. Then again, presence of entanglements (cross-linking or chain branching) will restrict the chain mobility, therefore increases the glass transition temperature. With the drop in the molecular weight at 7.5 mm amplitude is less significant compared to other amplitudes; increase in the glass transition temperature can be primarily due to the presence of entanglements in PET molecular chain.

Similar observations of an increase in the breaking strength has been reported for PET polymerized with low levels of branching agent trimethyl trimellitate (TMT). At low levels (>0.4%) of branching agent, there is a significant increase (25%) in the break strength even with no signs of crosslinking from GPC measurements.

Wetability and Interaction of Graphene with PET

In the selection of nanoreinforcements, compatibility with the polymer is one important factor. Two polymers are considered compatible (or miscible to form homogenous mixtures) when the difference in their surface energies is small. An increase in the difference in surface energies can lead to phase separation. Likewise, similar surface energies between the polymer and its nanoreinforcement aids in dispersion. PET is slightly polar, due to the presence of the C=O bond in the molecular chain. PET's surface energy is 41.1 mJ/m². Graphene's surface energy is similar at 46.7 mJ/m². Though higher than PET and hydrophobic, graphene is much closer than graphene oxide (62.1 mJ/m²) and graphite (54.8 mJ/m$^2$). This places graphene as a more compatible nanoreinforcement for PET. In general, graphene is considered difficult to disperse as individual sheets into any polymer matrix. It shows a tendency to agglomerate in order to minimize surface energy. Therefore, applying external energy through different mixing techniques is necessary to disrupt agglomerates and to distribute them into the polymer matrix. As mentioned earlier, PET is a highly viscous polymer with a high melting temperature. This drove the selection of twin-screw and ultrasound-assisted twin-screw mixing techniques for the dispersion of graphene nanoplatelets.

As stated previously, PET is chemically inert except for strong alkali solvents. Therefore, PET does not react with pristine graphene. Nevertheless, graphene (similar to CNTs) is known to have non-covalent interactions with aromatic compounds due to π-π stacking of benzene with graphene. While graphene sheets inside graphite have similar aromatic-aromatic (π-π) interactions, their energy is estimated (~8×1011 eV/cm$^2$) to be lower than that of a graphene and benzene system (~8.4×1014 eV/cm$^2$). Those skilled in the art will recognize that the magnitude of the π-π interaction increases with an increase in the density of hydrogen atoms in the graphene-aromatic molecule system (i.e., stronger dipoles). This explains the difference in binding energy for the graphene-benzene interaction compared to a graphene-graphene interaction.

PET is an aromatic polyester with a nearly planar molecular chain configuration. This makes it more favorable for the π-π interaction with graphene nanoplatelets. The presence of the π-π interaction between PET and graphene nanoplatelets is detected in the form of a shift in the Raman peak corresponding to C—C stretching in phenyl ring (FIG. 65). In addition, graphene nanoplatelets used in this work have a low concentration of polar functional groups such as, hydroxyl, carboxyl and ether on the edges (FIG. 7). Polar groups available with the nanoplatelets are likely to interact with polar groups of PET. The aforementioned interactions between PET and graphene are advantageous in influencing the properties of the nanocomposite.

Stress Transfer Between PET and Graphene

PET-GNP nanocomposites showed an improvement in Young's modulus, as demonstrated in FIG. 31. This increase in modulus of the nanocomposites takes place because of the effective transfer of stresses from PET to GNPs. For such a stiff reinforcement, load transfer between the polymer and reinforcement is governed by the strength of its interface, which is directly proportional to the thermodynamic work of adhesion ($W_a$). Adhesion energy between PET and graphene was determined to be 84.6 mJ/m$^2$ by way of Eq. (21) below. The total surface energy for graphene is 46.7 mJ/m$^2$. The polar and non-polar components of PET surface energy were found to be 2.7 mJ/m$^2$ and 38.4 mJ/m$^2$.

$$W_a = 2\sqrt{\gamma_p^{LW}\gamma_g^{LW}} + 2\sqrt{\gamma_p^{AB}\gamma_g^{AB}} \quad (21)$$

Where, $\gamma^{LW}$ is the Lifshitz-van der Waals (non-polar or dispersion) component of surface energy, $\gamma^{AB}$ is the Lewis acid-base (polar) component of surface energy, for polymer and graphene, and $\gamma=\gamma^{LW}+\gamma^{AB}$.

Those skilled in the art will recognized that the interfacial shear strength has been quantified to be 0.46 to 0.69 MPa, for a pristine single layer graphene in contact with a PET substrate (other surface of graphene in contact with air). As this value is for contact between pristine surfaces with no-polar group interactions, interfacial strength for the nanocomposites in this study will likely be higher than 0.69 MPa. Moreover, it has been found that even though graphene nanoplatelets have less interfacial adhesion with PET, compared to clay, nanoplatelets dispersed well in PET.

An increase in weight fraction of GNPs resulted in a decrease of the interparticle distance, as quantified from TEM micrographs shown in FIG. 58. For nanocomposite pellets with 15% loading, the interparticle distance was determined as 520 nm, which is larger than the interparticle distance of 200 nm, which has been reported for 2% graphene (with higher surface area, 750 m$^2$/g).

Figure 69A:
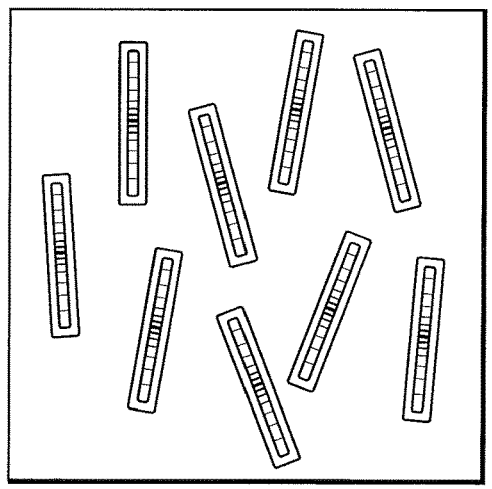
FIG. 69 is a schematic illustrating a doubling of nanoplatelets of the same size affecting a polymer matrix, according to the present disclosure.
Figure 69B:
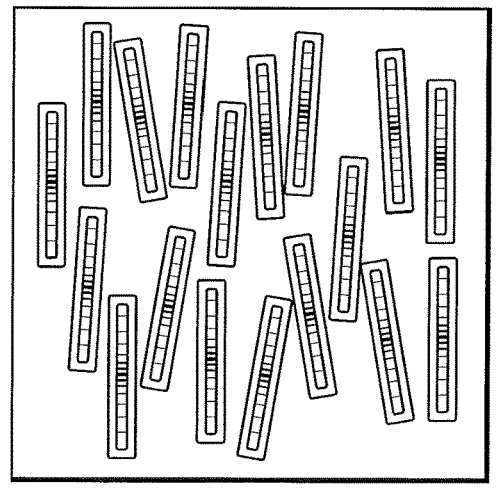
Figure 70:
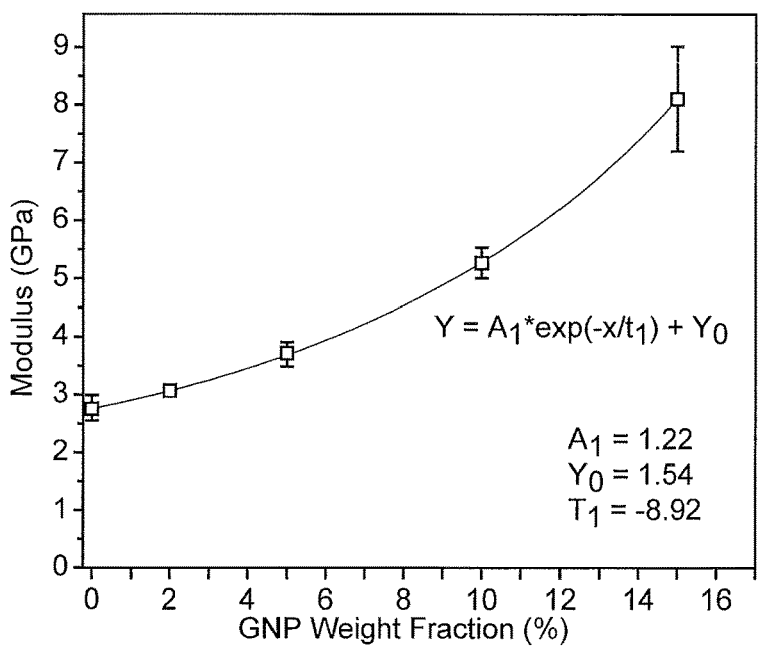
FIG. 70 is a graph illustrating an increase in elastic tensile modulus with respect to GNP weight fraction in accordance with the present disclosure.

As nanoplatelets get closer to each other, the number of polymer chains influenced by the presence of nanoplatelets will increase, as shown in FIG. 69. An increase in the volume of nanoplatelet affected polymers will stiffen the polymer. As may be observed by way of FIG. 70, with an increase in GNP weight fraction, the nanocomposite modulus increases exponentially. This behavior clearly depicts that load sharing of GNPs increases with increase in weight fraction.

Figure 71:
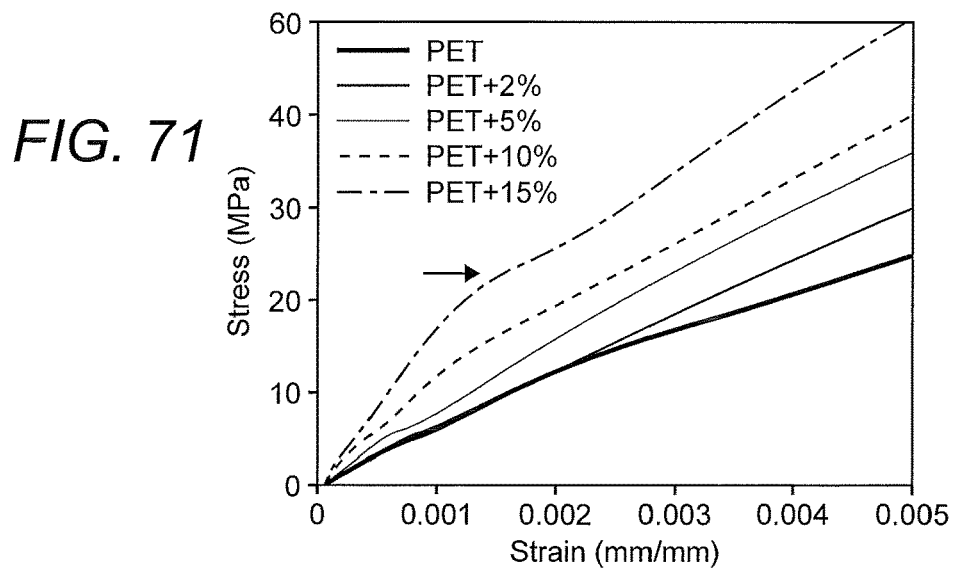
FIG. 71 is a graph illustrating an elastic region of stress-strain curves for nanocomposite tensile bars, according to the present disclosure.

At higher weight fractions of GNPs, the stress-strain curves indicate a more complex yielding behavior, as indicated in FIG. 71. Platelet-platelet interaction is not likely at low fractions. Not only is the platelet volume fraction important, the platelet surface area at that volume fraction is important. At higher volume fractions a low surface area platelet is expected to have a similar benefit as a high surface area platelet at lower fractions. However, eventually, the platelets begin to interact across the matrix and that interaction will impact yielding behavior. Platelet-platelet bonding is much weaker than platelet-matrix bonds. In this case, we started to see more pronounced evidence of this interaction above 10% volume fraction platelets.

Nanocomposites Microstructure and Application of Micromechanical Models

Micromechanical models based on Hui-Shia formulae have closely predicted the nanocomposite properties compared to Halpin-Tsai. In the beginning they were developed to model the properties of semi-crystalline polymers, by considering the crystalline domains as a reinforcement phase in an amorphous matrix. These micromechanical models were later adapted to model micro-composites. Key assumptions for the abovementioned models are: uniform interface between the polymer and reinforcement, oriented in the loading direction, and uniform aspect ratio of the reinforcement. Nevertheless, nanoplatelets dispersed in the nanocomposites are not completely oriented along the loading axis (i.e., the injection direction), as observed from nanotomography illustrated in FIGS. 62 and 63(*b*). For instance, in nanocomposite tensile bars, GNP orientation due to flow stresses was witnessed only to a 200 μm depth from surface, and in the case of tensile tubes, this was even less (15 μm depth from surface). This shows that the bulk core of the nanocomposite has more randomly oriented nanoplatelets. Increases in the injection molding speed and the cooling rate has resulted in limited nanoplatelet orientation.

During injection molding, polymer melt flowing through the mold channels experiences shear forces. This shearing action is due to the temperature gradient induced by the low temperature mold walls. As the polymer melt starts solidifying (in thickness), increasing shear forces produce a layered structure along the thickness, with highly oriented layers on the outer surface. Some have speculated that this layer would be 0.1 mm thick. The rate of cooling determines the thickness of the oriented layers. Nanotomography allowed quantifying the thickness of the skin layers and this is a first of its kind observation of this layer. As observed with the tensile tube, the difference in the oriented layer thickness is likely due to the more effective cooling rate from the curvature of the surface and the mold design. Comparing the tensile tube data with the tensile bar data shows that the thickness of the oriented surface layer is higher in the tensile bar. This is consistent with the slower cooling and injection speed compared to the tensile tube.

One of the observations from nanotomography was that the aspect ratio of platelets was not uniform for the nanocomposite. The aspect ratio of the nanoplatelets from rheological measurements and transmission electron microscopy were determined to be 40 and 18.75. Taking these as limits on the aspect ratios, moduli of the nanocomposites are predicted. Comparing the experimental data with predicted modulus trends for different aspect ratios, as shown in FIG. 67, has highlighted that the nanocomposites indeed have different average aspect ratios and increased with increase in GNP weight fraction.

Graphene nanoplatelets used in this work are of an average diameter (length) 5 μm. As will be appreciated, this dimension is much lower than the size of 30 μm for pristine graphene, which has been estimated to effectively reinforce polymethyl methacrylate (PMMA). It will be further appreciated that it has been indicated that graphene with reduced stiffness (drop in modulus from 1000 GPa to 100 GPa) will be less effective in reinforcing glassy polymers (e.g. PET) as compared to elastomers. As mentioned earlier, graphene with more than 10 layers can have reduced stiffness. Aforementioned factors reinforce the need to have detailed information on the microstructure of nanocomposites for the application of micromechanical models to predict properties.

Effect of Graphene Nanoplatelets on PET Properties and Molecular Chain Mobility

The nanocomposite tensile bars from oil cooled molding exhibited around 20% crystallinity. Using a high-speed injection molding system with a faster cooling rate, nanocomposite tensile tubes were prepared with better control on the crystallization of PET during injection molding. Through this process, nanocomposites with GNP weight fractions from 2% to 0.5% were prepared and tested. Comparing the modulus of nanocomposites with 2% GNP, indicated in FIGS. 31 and 33, from both the processes (water cooled and oil cooled injection molding), shows an improvement in modulus with the change in process. For the tensile tubes with 2% GNP, the modulus increased from 2.5 GPa (amorphous modulus of PET) to 3.1 GPa (7% higher than tensile bars). Another important observation was that the presence of voids in the 2% nanocomposite has little effect on its modulus. On the other hand, the presence of voids (from processing) resulted in premature failure and a reduction of strength. As observed from the SEM micrographs of nanocomposite fracture surfaces, shown in FIGS. 40 and 41, the voids acted as stress concentration points and led to failure. The strength of the nanocomposite tensile tubes at low GNP weight fractions displayed a minimal increase, as shown in FIG. 33.

In general, the addition of GNPs to PET did not affect strength. This is expected since the weight fraction is low and the matrix will dominate flow behavior typical for yielding. It is also helpful to realize that the lack of chemical linkage (bonding) between PET and GNP reduces the GNP influence on yield and toughness. As discussed in earlier sections, interfacial interactions between PET and GNPs are favorable for initial stress transfer. With increase in strain, interfacial sliding starts between PET and GNPs, this precludes GNPs from sharing the failure load. As strength of the material depends on the weakest element, the nanocomposite strength remained similar to PET.

It is inferred from rheology and thermal analysis data that the presence of graphene nanoplatelets at higher weight fractions influences the mobility of PET molecular chain. Higher GNP weight fractions will result in the development of a continuous network, as represented in FIG. 69, that will change the deformation behavior of PET. As observed from mechanical testing that up to 2% GNP weight fraction nanocomposites are tougher than PET, with increased failure strain. As PET failure takes place as a result of the through thickness propagation of surface crazes, the presence of graphene nanoplatelets in PET matrix can act against it through crack deflection. Nanoplatelets extending out of the fracture surface, as observed from the SEM micrographs in FIG. 42, support the above observation. On the other hand, nanocomposites above 2% GNP weight fraction exhibited brittle failure. The graphene nanoplatelets weight fraction at which this transition was observed agrees with the percolation limit from Rheology measurements.

Using Raman spectroscopy, it has been shown that an increase in graphene concentration restricts the mobility of PET chains. The Raman spectrum shown in FIG. 5, did not show change in peak width, as the nanocomposites from injection molding exhibited highly oriented amorphous surface layer. Oriented PET chains will limit the number of chain configurations possible, thereby restricting the rotation of C=O isomers which cause peak broadening.

Thermal analysis of the nanocomposites showed that the addition of GNPs affected PET crystallization. Graphene nanoplatelets can act as nucleation sites and promote crystallization, with an increase in the crystallization temperature. Nevertheless, reduced PET chain mobility with an increase in the nanoplatelet fraction (confinement effect), counters the nucleation effect. A combination of these opposing effects led to the increase in crystallization half-time and decreased the amount of crystallinity, as indicated in FIG. 45. As the interparticle distance became smaller with an increase in the GNP weight fraction, chain mobility becomes more restricted. This elucidates the change in the failure type of PET nanocomposites, as discussed earlier for higher GNP weight fractions (above 2%). Similar observations have been reported with PET and high aspect ratio graphene at less than 2% weight fractions, wherein it was found that crystallization half-time decreased until graphene loading less than 2% and started increasing at 2%.

Effect of Ultrasound Treatment on PET-Graphene Nanocomposites

Comparing the properties of nanocomposites prepared from twin-screw and ultrasound-assisted compounding, presented in FIG. 38, helps in identifying the best mixing approach. It was observed that the ultrasound amplitudes of 5 μm and 7.5 μm showed the maximum improvement in terms of modulus. However, this improvement in modulus is not significantly different compared to nanocomposites from twin-screw compounded material. This indicates that the ultrasound treatment did not provide an advantage in improving the dispersion of graphene nanoplatelets. Molecular weight data for 5% graphene nanocomposite pellets from both the process indicate a similar drop in the PET average molecular weight, as shown in FIG. 26. Additionally, it is observed that the presence of graphene increased the drop in molecular weight from extrusion process. This could be due to the high thermal conductivity of graphene nanoplatelets, which allows faster heating of PET and cause chain damage under regular heating conditions.

Rheology of the ultrasound treated nanocomposites showed similar behavior as observed in ultrasound treated PET, illustrated in FIGS. 53 and 54. The decrease in the shear modulus at high frequency is due to the damage of the polymer chains (molecular weight) and the increase in the shear modulus at lower frequency could be from an increase in entanglement from ultrasound treatment as well the presence of dispersed graphene. Higher ultrasound amplitudes show lower shear modulus; this indicates that there is better dispersion at higher amplitudes, which is also evident from mechanical properties. However, for the 7.5 µm ultrasound amplitude, the drop in molecular weight is higher compared to other amplitudes. Ultrasound-assisted dispersion of graphene has shown a difference in the thermal properties of the nanocomposites compared to regular twin-screw injection (for the same graphene weight fraction). Evaluating the glass transition temperature, crystallization half-time, and percent crystallinity, shown in FIGS. 47 and 49, point to better graphene dispersion at 7.5 µm ultrasound amplitude over other amplitudes. The crystallization half-time of PET decreases with a decrease in the molecular weight; however dispersed graphene could be the reason for the increase in half-time at 7.5 µm amplitude. These observations along with the melt rheology data, shown in FIGS. 53 and 54, suggest that an ultrasound amplitude of 7.5 µm is likely to have improved the dispersion of GNPs. However, this improvement in dispersion observed from thermal analysis did not reflect in the mechanical data.

Figure 72:
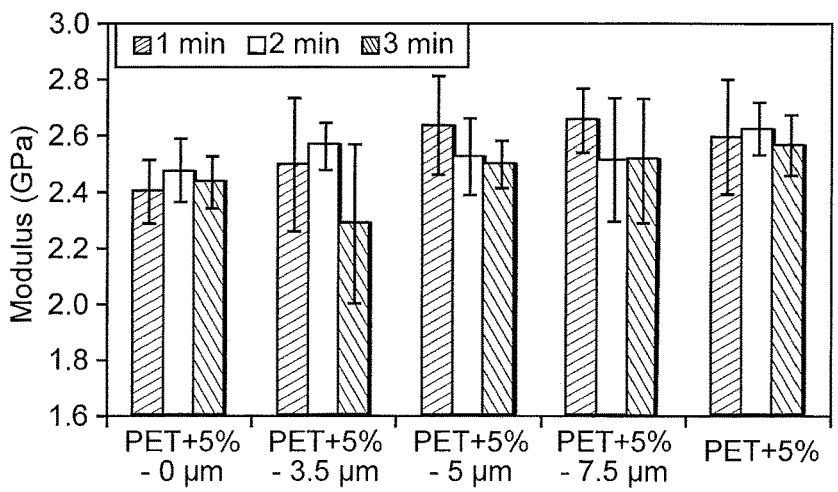
FIG. 72 is a graph illustrating a comparison of Young's modulus for PET-GNP nanocomposites with and without ultrasound treatment in accordance with the present disclosure.

While preparing the tensile bars of ultrasound treated nanocomposites on the micro injection molding system, the effect of mixing time on the mechanical properties was investigated. Nanocomposite samples were injection molded for each of the following process times: 1 min, 2 min and 3 min. Modulus data, shown in FIG. 72, indicate that longer mixing times resulted in a decrease in the nanocomposite modulus. This could be due to the damage of polymer with longer residence times.

Effect of Graphene Surface Area on PET Nanocomposite Properties.

In-situ polymerized PET nanocomposites suggest that the surface area of the graphene nanoplatelets can be a basis for the difference in the crystallization behavior of PET. Coming to the mechanical properties of the nanocomposites, their difference is not significant enough to make a conclusion. Nanoplatelets dispersed through sonication will contain platelets of different dimensions, giving rise to a broad distribution of nanoplatelet aspect ratios, changing the average surface area available. The application of a size selective approach, through centrifugation can help in understanding the effect of the nanoplatelet surface area.

As mentioned herein, one drawback for in-situ polymerization is achieving similar molecular weight polymer between different batches. This indicates that polymerization process is not alone sufficient for the producing nanocomposites; application of secondary techniques such as solid state polymerization can help in addressing the disparity in molecular weights.

Effectiveness of Graphene as Reinforcement

The mechanical behavior of PET is dependent on the type of crystallinity: spherulitic and stretch crystallization. The modulus of a PET crystal was calculated to be 146 GPa, based on the deformation of the covalent bonds. One approach in improving the properties of PET is to increase its crystallinity from processing methods. PET film samples obtained through biaxial stretching show 5.4 GPa at 45% crystallinity Comparing that with the nanocomposites, the modulus for only 10% GNP weight fraction was 5.3 GPa. With a reinforcement that is 5.5 times stiffer than a PET crystal, the improvement with GNP addition is comparable to that of self-reinforced (stretch crystalized) PET. For the same biaxial stretched sample, when tested along the maximum molecular orientation the direction showed about a 9.1 GPa modulus. This indicates that inducing orientation to graphene nanoplatelets during the processing of nanocomposites could improve the properties further.

CONCLUSIONS

Poly(ethylene terephthalate)-graphene nanoplatelet (PET-GNP) nanocomposites have been demonstrated by way of injection molding. As described herein, the PET-GNP nanocomposites were evaluated for dispersion, mechanical, and thermal properties. Accordingly, the PET-GNP nanocomposites show an exponential improvement in Young's modulus, ranging between 8% for 0.5% GNP weight fraction and 224% for 15% GNP weight fraction, without affecting the strength of the PET. An addition of graphene nanoplatelets above 2% weight fraction was found to affect the failure strain of PET. Further, the particular molding system utilized plays a significant role in influencing the final properties of the nanocomposite. In particular, nanocomposites made by way of high speed injection molding yield a relatively improved modulus.

As described herein, the master-batch method effectively disperses the nanoplatelets within the PET, with a lower GNP content yielding better dispersion than higher GNP content master-batches. Ultrasound treatment of PET generally increases its toughness, while providing a minimal effect on molecular weight and no effect on Young's modulus. Twin-screw compounding and ultrasound-assisted twin-screw compounding lead to similar improvements in Young's modulus. Moreover, PET-GNP nanocomposites obtained by way of twin-screw compounding exhibit a GNP interparticle distance which decreases with increasing concentration. In particular, a 15% nanocomposite exhibits an average GNP interparticle distance of substantially 520 nm.

PET-GNP nanocomposites prepared by way of injection molding exhibit a preferential orientation of the GNPs in a flow direction to a depth of substantially 200 µm below the mold surface. The depth of the preferential orientation is dependent on a cooling rate of the PET-GNP nanocomposite. Further, a presence of GNPs affects crystallization behavior of PET, wherein crystallization temperature increases with additional nucleation from graphene, and crystallization half-time ($t_{1/2}$) increases with increasing GNP content. The crystallinity of PET generally is influenced by the rate of cooling, as well as an amount of stretching. Strain-induced crystallization is effective in improving mechanical properties of PET as compared to thermally-induced crystallization. It will be appreciated, therefore, that graphene reinforcement may be optimized by increasing the nanoplatelet effective surface area and increasing the orientation of nanoplatelets along the flow direction.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

The invention claimed is:

1. A method of preparing graphene nanoplatelets reinforced polyethylene terephthalate nanocomposites, comprising:
    compounding polyethylene terephthalate with dispersed graphene nanoplatelets with an ultrasound-assisted co-rotating twin-screw extrusion microcompounder equipped with an ultrasound horn operating at 40 kHz to form a master-batch, and
    forming polyethylene terephthalate-graphene nanoplatelet nanocomposites by injection molding of the master-batch using one or more injection molding presses comprising any one of an oil cooled molder, a water cooled molder and a micro injection molder, wherein the polyethylene terephthalate-graphene nanoplatelet nanocomposites comprises the graphene nanoplatelets at weight fractions ranging between 0.5% and 15%.

2. The method of claim 1, wherein the ultrasound-assisted twin-screw extrusion microcompounder involves applying ultrasound waves to the polyethylene terephthalate-graphene nanoplatelets, wherein the ultrasound waves comprise ultrasound amplitudes of 5 µm.

3. The method of claim 1, wherein the ultrasound-assisted twin-screw extrusion microcompounder involves applying ultrasound waves to the polyethylene terephthalate-graphene nanoplatelets, wherein the ultrasound waves comprise ultrasound amplitudes of 7.5 µm.

4. The method of claim 1, wherein the weight fractions of the graphene nanoplatelets result in an improvement in Young's modulus of the polyethylene terephthalate-graphene nanoplatelets nanocomposites, while not affecting the strength of the polyethylene terephthalate.

5. The method of claim 1, wherein the ultrasound-assisted twin-screw extrusion increases toughness of the polyethylene terephthalate with no effect on Young's modulus of the polyethylene terephthalate-graphene nanoplatelets nanocomposites.

* * * * *